United States Patent [19]
Aoki et al.

[11] Patent Number: 5,896,833
[45] Date of Patent: Apr. 27, 1999

[54] COOLING WATER CIRCUIT SYSTEM AND COOLING WATER CONTROL VALVE

[75] Inventors: Shinji Aoki, Kariya; Toshio Morikawa, Toyota; Yoshimitsu Inoue, Chiryu; Hikaru Sugi, Nagoya; Kazutaka Suzuki, Kariya; Hiroyuki Fukunaga, Nishio, all of Japan

[73] Assignees: Denso Corporation, Kariya; Nippon Soken, Inc., Nishio, both of Japan

[21] Appl. No.: 08/924,043

[22] Filed: Aug. 28, 1997

[30] Foreign Application Priority Data

| Aug. 30, 1996 | [JP] | Japan | 8-230938 |
| Aug. 30, 1996 | [JP] | Japan | 8-230939 |
| Aug. 30, 1996 | [JP] | Japan | 8-230940 |
| Aug. 30, 1996 | [JP] | Japan | 8-230944 |
| Aug. 30, 1996 | [JP] | Japan | 8-230947 |

[51] Int. Cl.$^6$ ........................... F01P 11/02
[52] U.S. Cl. ............... 123/41.14; 123/41.29; 123/41.33
[58] Field of Search ............... 123/41.14, 41.29, 123/41.33

[56] References Cited

U.S. PATENT DOCUMENTS

| 5,730,089 | 3/1998 | Morikawa et al. | 123/41.14 |
| 5,749,330 | 5/1998 | Inque et al. | 123/41.14 |
| 5,765,511 | 6/1998 | Schatz | 123/41.14 |

FOREIGN PATENT DOCUMENTS

| A-1-172015 | 7/1989 | Japan . |
| A-2-120119 | 5/1990 | Japan . |
| A-2-120120 | 5/1990 | Japan . |

OTHER PUBLICATIONS

SAE Technical Paper Series 950994, "Insulated Expansion Tank (IET) and Thermal Storage for Engine Cold Start", International Congress & Exposition, Detroit, Michigan, Feb. 27–Mar. 2, 1995.

*Primary Examiner*—John Kwon
*Attorney, Agent, or Firm*—Harness, Dickey & Pierce, PLC

[57] ABSTRACT

According to the present invention, in a cooling water circuit having a water-cooled internal combustion engine for a vehicle, a pump for pumping cooling water, and a heat-accumulating tank for thermally insulating and storing the cooling water having flowed out of the engine, at least one of an inflow cooling water passage for introducing the cooling water having flowed out of the engine into the heat-accumulating tank and an outflow cooling water passage for introducing the cooling water having flowed out of the heat-accumulating tank into the engine is closed while the engine is stopped. In this way, the convection between the cooling water in the heat-accumulating tank and the cooling water in the other portions than the heat-accumulating tank can be prevented, and the heat insulating capacity of the heat-accumulating tank can be improved.

2 Claims, 48 Drawing Sheets

FIG. I

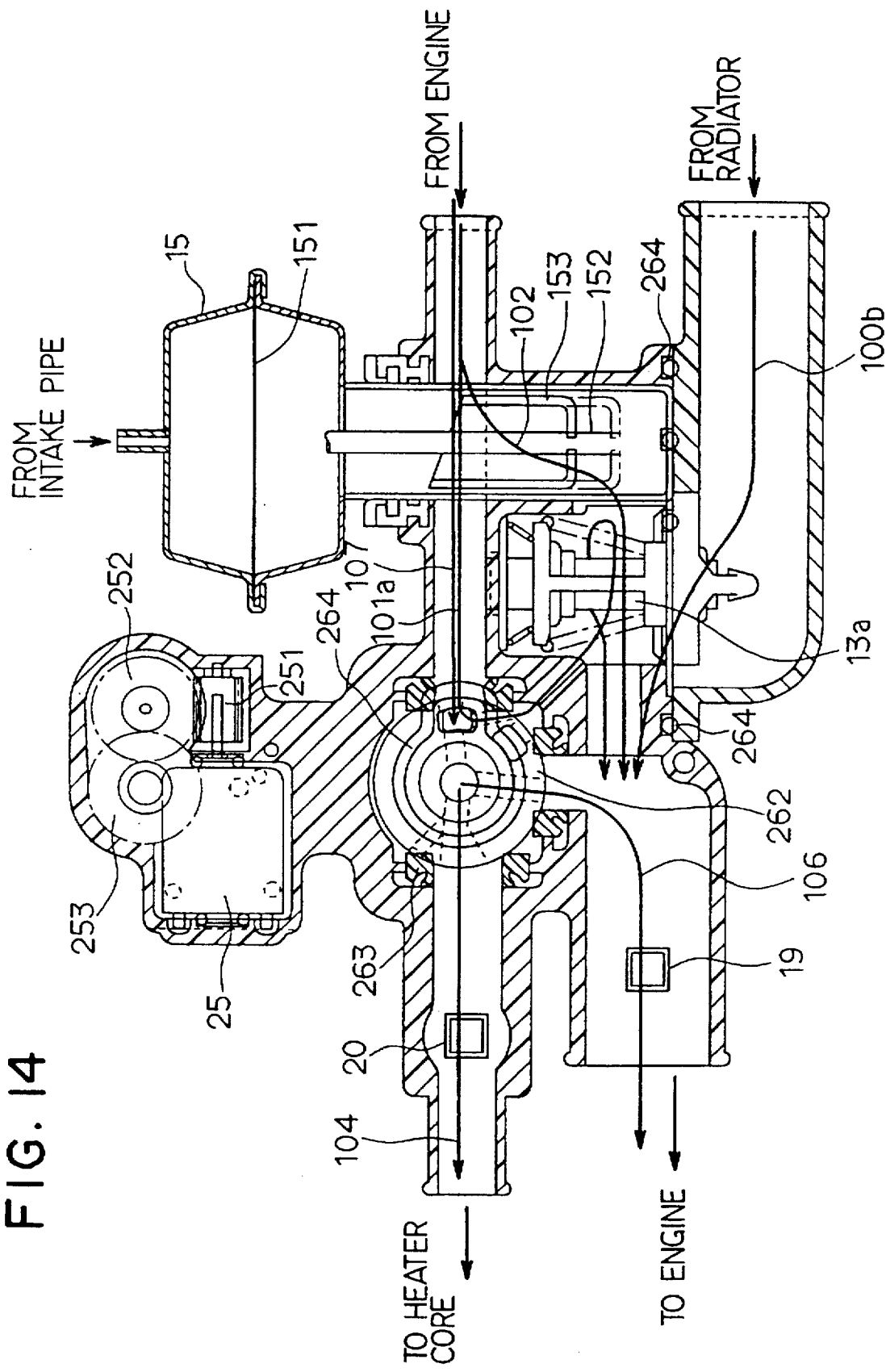

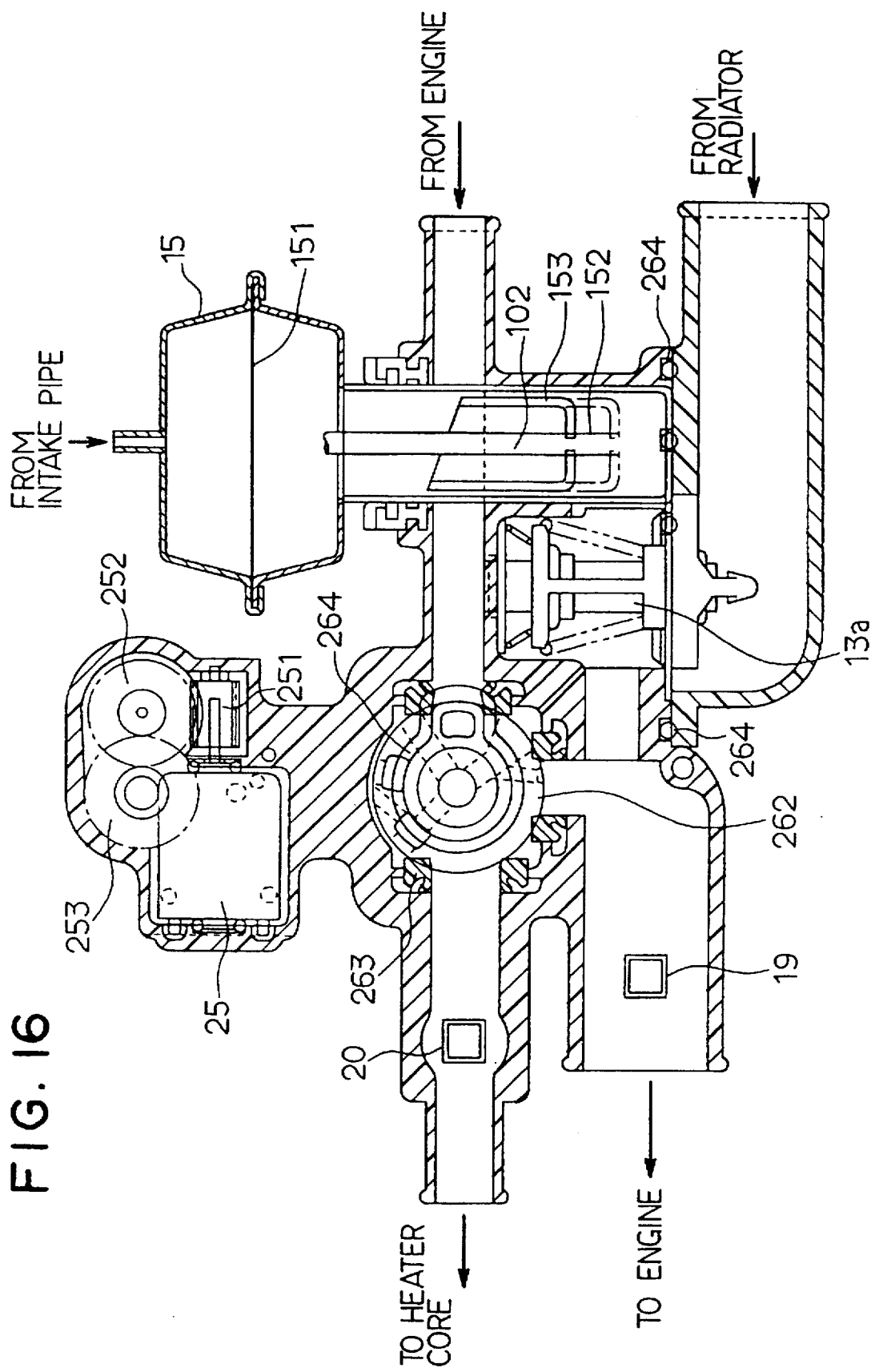

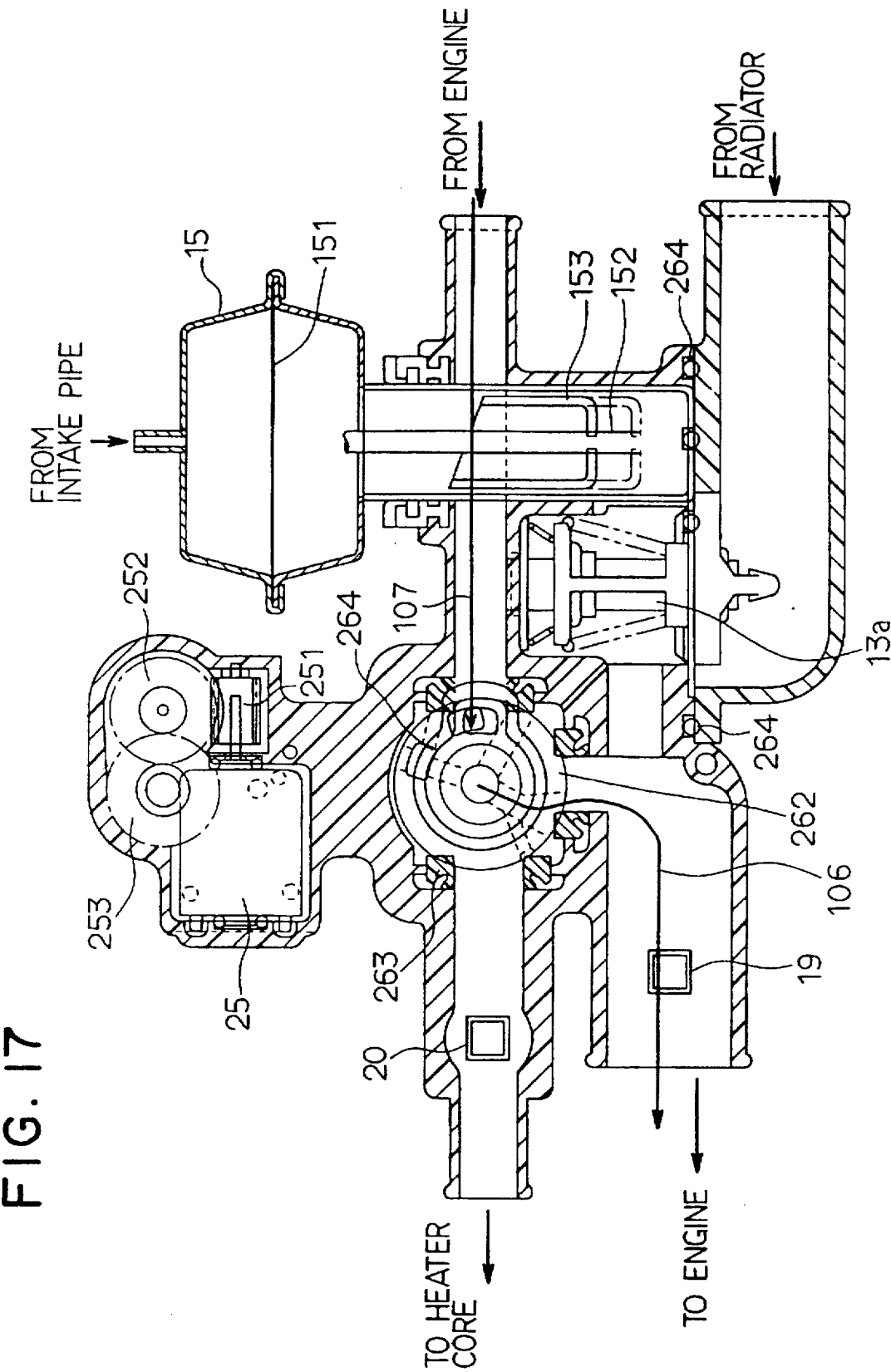

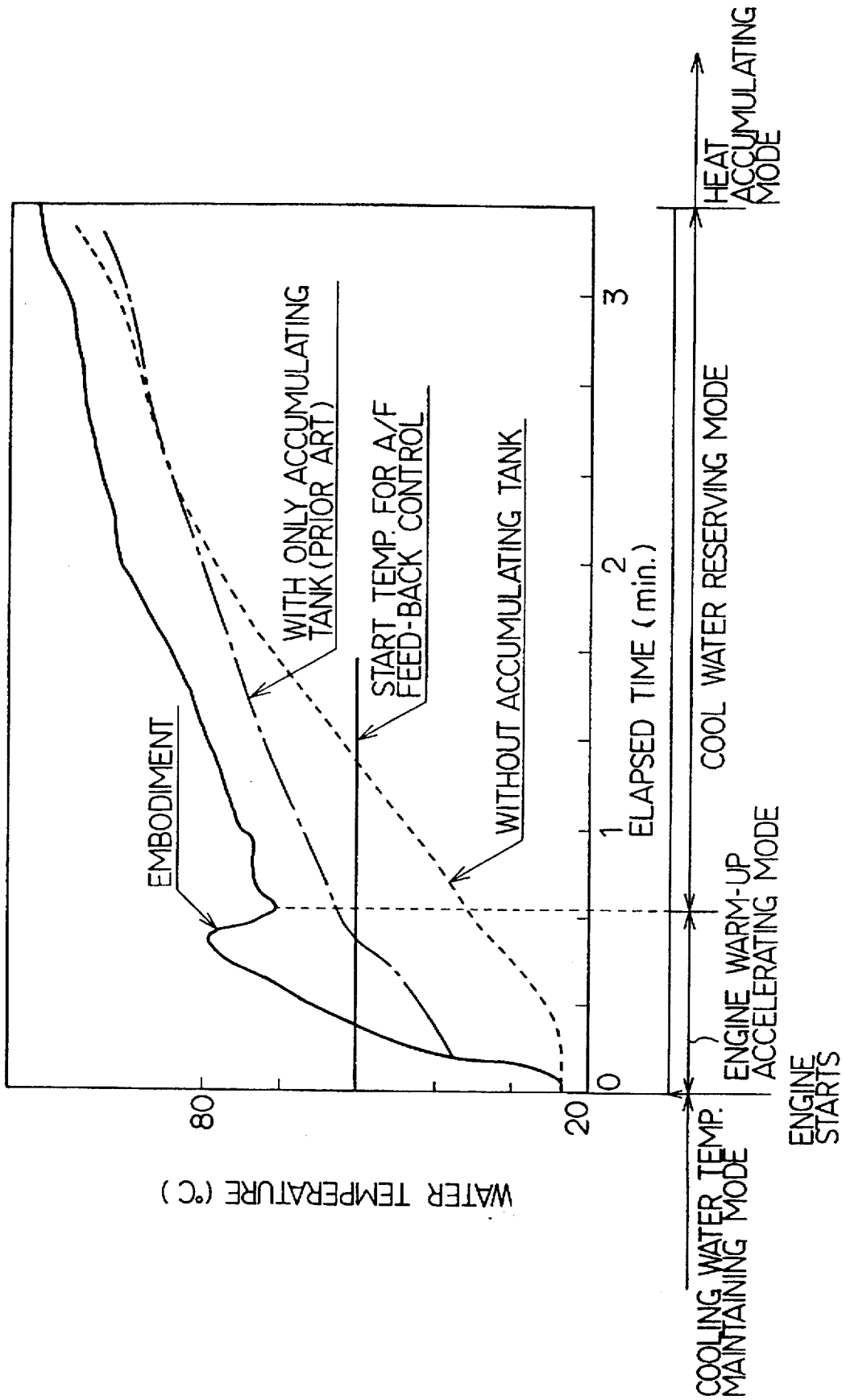

| PATTERN | A | B | C | D |
|---|---|---|---|---|
| OPERATION STATE | | | | |
| THERMOSTAT | CLOSED | OPEN | OPEN | OPEN |
| CONTROL VALVE 37 | CLOSED | CLOSED | OPEN (MIDDLE) | OPEN (FULL) |
| BYPASS FLOW AMOUNT | NO | NO | SMALL | LARGE |

COOLING WATER CIRCUIT SYSTEM AND COOLING WATER CONTROL VALVE

CROSS REFERENCE TO THE RELATED APPLICATIONS

This application is based on and claims priority of Japanese Patent Applications of Nos. Hei. 8-230947 filed on Aug. 30, 1996, Hei. 8-230940 filed on Aug. 30, 1996, Hei. 8-230939 filed on Aug. 30, 1996, Hei. 8-230938 filed on Aug. 30, 1996, and Hei. 8-230944 filed on Aug. 30, 1996, the contents of which are incorporated herein by reference.

BACKGROUND OF THE INVENTION

1. Field of the Invention

The present invention relates to a cooling water circuit system of a water-cooled engine (hereinafter referred to as "engine").

Conventionally, there has been proposed an apparatus in which a heat-accumulating tank for thermally insulating and reserving cooling water for cooling the engine is disposed in a cooling water circuit and an acceleration of a warm-up operation of the engine and a quick heating operation are performed by using the high-temperature cooling water accumulated in the heat-accumulating tank when a temperature of the cooling water is low after the engine has been just started.

However, in the above-described apparatus, since the acceleration of the warm-up operation of the engine and the quick heating operation are performed by using the high-temperature cooling water accumulated in the heat-accumulating tank, the heat-insulating capacity of the heat-accumulating tank has a great influence on the effects of the acceleration of the warm-up of the engine and the quick heating operation.

The inventors have experimentally produced a cooling water circuit including various kinds of heat-accumulating tank, and found out that the following points relate to the improvements of the heat-insulating capacity of the heat-accumulating tank greatly.

That is, to the heat-accumulating tank, there are connected an inflow cooling water passage for introducing the cooling water discharged from the engine to the heat-accumulating tank and an outflow cooling water passage for introducing the cooling water discharged from the heat-accumulating tank to the engine.

Therefore, when the other portions (e.g., a pipe connected to the heat-accumulating tank) than the heat-accumulating tank is communicated with the heat-accumulating tank through both passages while the engine stops, the cooling water in the other portions than the heat-accumulating tank and the cooling water in the heat-accumulating tank may be mixed by natural convection.

Further, because the other portions than the heat-accumulating tank do not have a heat insulating structure, the cooling water in the other portions than the heat-accumulating tank may be cooled earlier than the cooling water in the heat-accumulating tank. Therefore, a temperature difference between the cooling water in the other portions than the heat-accumulating tank and the cooling water in the heat-accumulating tank becomes larger, with the result that the mixture by the natural convection may be accelerated. Further, the heat-insulating capacity of the heat-accumulating tank may be deteriorated.

SUMMARY OF THE INVENTION

In light of the above-described problems, the present invention has an object of preventing a mixture of the cooling water in the other portions than the heat-accumulating tank and the cooling water in the heat-accumulating tank to improve the heat-insulating capacity of the heat-accumulating tank.

According to the present invention, while the engine is stopped, at least one of an inflow cooling water passage for introducing the cooling water having flowed out of an engine into a heat-accumulating tank and an outflow cooling water passage for introducing the cooling water having flowed out of the heat-accumulating tank into the engine is closed.

In this way, it is possible to prevent a convection between the cooling water in the heat-accumulating tank and the cooling water in the other portions than the heat-accumulating tank while the engine is stopped. Therefore, since the mixture of the cooling water in the heat-accumulating tank and the cooling water in the other portions than the heat-accumulating tank can be prevented, the heat insulating capacity of the heat-accumulating tank can be improved.

There may be provided an opening and closing valve for opening and closing at least one of an inflow cooling water passage for introducing the cooling water having flowed out of an engine into a heat-accumulating tank and an outflow cooling water passage for introducing the cooling water having flowed out of the heat-accumulating tank into the engine, at a position adjacent to an opening portion of the heat-accumulating tank.

In this way, it is possible to certainly prevent the mixture of the cooling water in the heat-accumulating tank and the cooling water in the other portions than the heat-accumulating tank. Therefore, the heat insulating capacity of the heat-accumulating tank can be further improved.

Further, the opening and closing valve may be closed when it is determined that the engine is stopped by operating state detecting means for detecting an operation of the engine.

Still further, the opening and closing valve may be opened when a temperature of the cooling water flowing through the outflow cooling water passage exceeds a predetermined temperature during a warm-up operation of the engine and may be closed when the temperature of the cooling water flowing through the outflow cooling water passage lower than the predetermined temperature during the warm-up operation of the engine.

During the warm-up operation of the engine, the low-temperature cooling water stored in the engine flows into the heat-accumulating tank after the engine starts, and the high-temperature cooling water accumulated in the heat-accumulating tank flows into the engine. If all of the high-temperature cooling water accumulated in the heat-accumulating tank flows out, the low-temperature cooling water flowed out of the engine 1 immediately after the engine starts may circulate into the engine, and the temperature of the cooling water in the engine lowers, with the result that the warm-up operation may be delayed.

In contrast, according to the present invention, when the temperature of the cooling water flowing out of the heat-accumulating tank becomes lower than a predetermined temperature, the opening and closing valve may be closed. In this way, the low-temperature cooling water flowed out of the engine 1 immediately after the engine starts is reserved in the heat-accumulating tank and can be prevented from circulating into the engine.

Therefore, the delay of the warm-up operation can be prevented, so that the amount of the harmful material released to the atmosphere during the warm-up operation can be reduced and the fuel consumption can be improved.

BRIEF DESCRIPTION OF THE DRAWINGS

Additional objects and advantages of the present invention will be more readily apparent from the following detailed description of preferred embodiments thereof when taken together with the accompanying drawings in which:

FIG. 14 is a cross sectional view, which corresponds to the cross section taken along IV—IV of FIG. 3, for showing the switching valve in a heat accumulating mode in the fourth embodiment;

FIG. 16 is a cross sectional view, which corresponds to the cross section taken along IV—IV of FIG. 3, for showing the switching valve in a cooling water temperature maintaining mode in the fourth embodiment;

FIG. 17 is a cross sectional view, which corresponds to the cross section taken along IV—IV of FIG. 3, for showing the switching valve in an engine warm-up accelerating mode in the fourth embodiment;

FIG. 27 a graph of test results showing warm-up acceleration effect in the fourth embodiment;

DETAILED DESCRIPTION OF THE PREFERRED EMBODIMENTS

Embodiments according to the present invention are hereinafter described with reference to the accompanying drawings.

A first embodiment of the present invention will be described.

Figure 1:
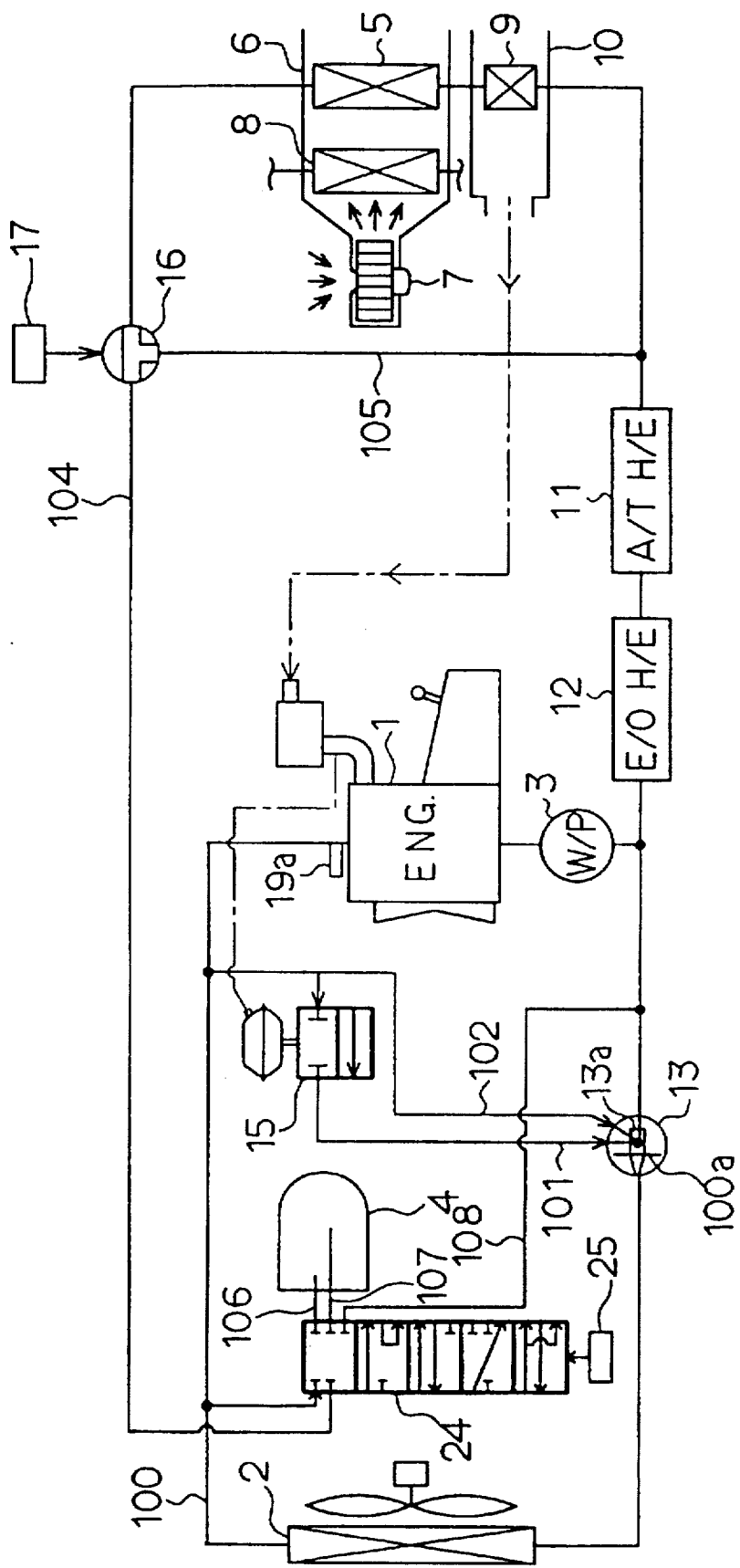
FIG. 1 shows a flow of cooling water in a cooling water circuit in a cooling water temperature maintaining mode according to a first embodiment of the present invention.

FIG. 1 shows a cooling water circuit of a water-cooled internal combustion engine (hereinafter referred to as "engine") for a vehicle and a cooling water circuit of an air conditioning apparatus, for heating a passenger compartment of a vehicle by using the cooling water of the engine 1 as heat source. A radiator 2 is for cooling the cooling water having flowed out of the engine 1, and a water pump 3 is for sucking the cooling water having flowed out of the engine 1 and pumping the cooling water toward the engine 1 while receiving a driving force from the engine 1.

A heat-accumulating tank 4 has a double tank structure. The heat-accumulating tank 4 is disposed at a lower position in the gravitational direction in view of limited space in an engine compartment. A heater core 5 is for heating air by using the cooling water as heat source, and is disposed in an air conditioning casing 6 forming an air passage for blowing air into the passenger compartment. A blower 7 is disposed at an upstream side of the air conditioning casing 6. An evaporator 8 is disposed between the blower 7 and the heater core 5 to cool air flowing therethrough. In this embodiment, there is employed an air conditioning apparatus (so-called re-heat type) in which a temperature of air to be blown into the passenger compartment is adjusted by an amount of the cooling water flowing in the heater core 5, an amount of blown-air, and the like.

An intake air heat exchanger 9 is for performing heat-exchange between air to be sucked into the engine 1 and the cooling water. The intake air heat exchanger 9 is disposed in a surge tank 10 for removing a pulsation of intake air. An A/T heat exchanger (oil heat exchanger) 11 is for performing heat-exchange between the cooling water having flowed out of the engine and mission oil of an automatic transmission for a vehicle. An E/O heat exchanger 12 is for performing heat-exchange between the cooling water having flowed out of the engine and the engine oil.

The cooling water having flowed out of the engine 1 circulates in a radiator water passage 100 while passing through the radiator 2 to the engine 1. The cooling water having flowed out of the engine 1 circulates in first and second bypass water passages 101 and 102 while bypassing the radiator to the engine 1. Both of the bypass water passages 101 and 102 join to the radiator water passage 100 at an outlet side of the radiator 2. At the joining portion 100a, there is provided a thermostat for opening and closing a valve element thereof according to the temperature of the cooling water.

Since the valve element of the thermostat 13 is disposed at the side of the radiator 2 from the joining portion 100a to open and close the radiator water passage 100, even when the thermostat 13 is closed, both of the bypass water passages 101 and 102 can be communicated with each other.

Figure 4:
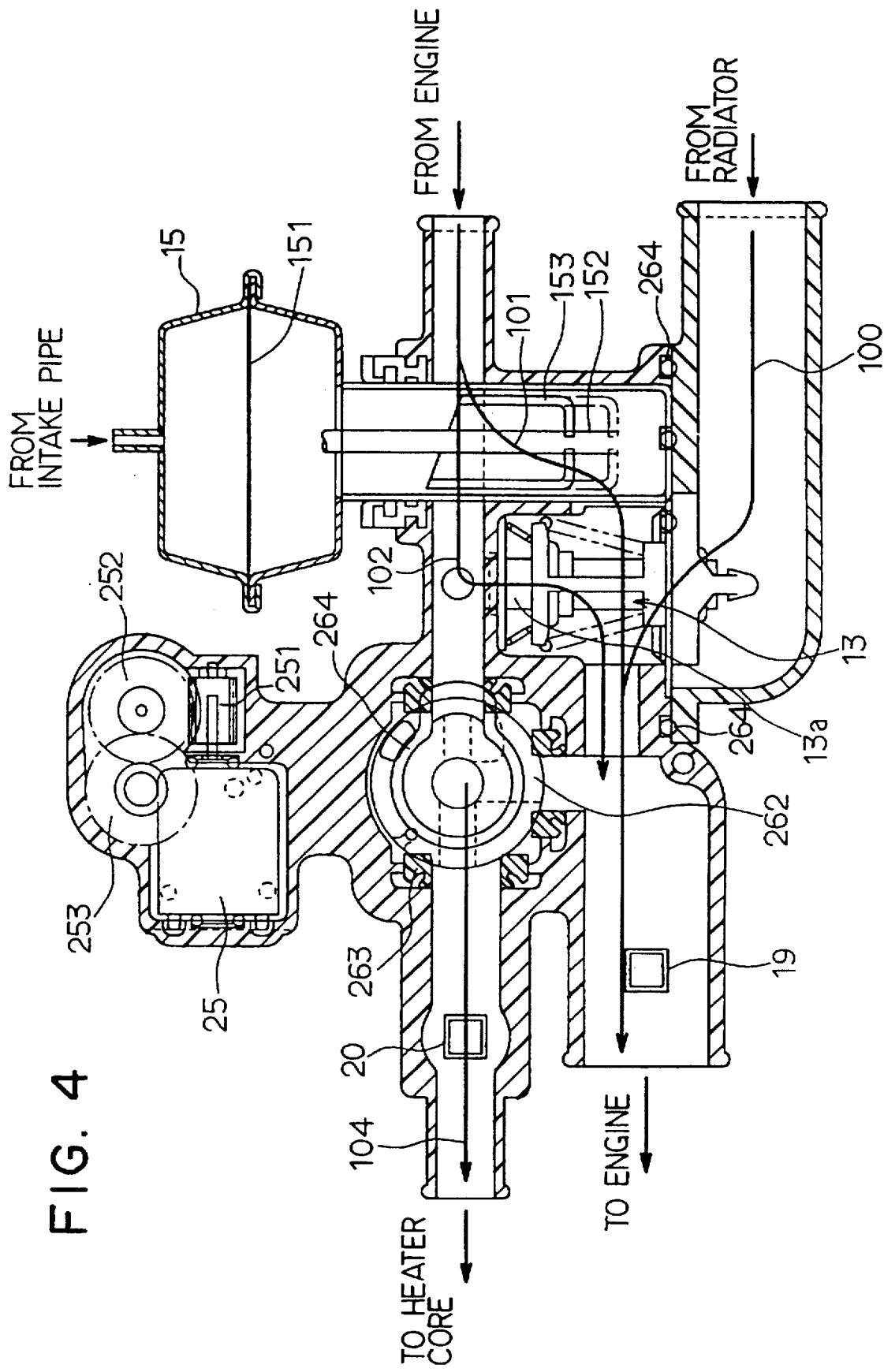
FIG. 4 is a cross sectional view taken along IV—IV of FIG. 3, for showing the switching valve in the cooling water temperature maintaining mode in the first embodiment.

A load responding valve 15 is for opening and closing the bypass water passage 101, and operates an valve element thereof by detecting an intake negative pressure as a load of the engine. More specifically, as shown in FIG. 4, a variation of the negative pressure is detected mechanically by a diaphragm 151, and a displacement of the diaphragm 151 is transmitted to the valve element 153 to open and close the bypass water passage 101.

An amount the cooling water flowing through the first bypass water passage 101 is set to be larger than that through the second bypass water passage 102. The first bypass water passage 101 is connected to the joining portion 100a at a downstream side of a temperature sensing portion (a wax-box filled with wax material) 13a of the thermostat in such a manner that the cooling water flowing through the first bypass passage collides with a predetermined position (hereinafter referred to as "first temperature sensing portion") of the temperature sensing portion 13a.

On the other hand, the second bypass water passage 102 is connected to the joining portion 100a at a downstream side of the temperature sensing portion 13a in such a manner that the cooling water flowing through the second bypass passage collides with the other predetermined position (hereinafter referred to as "second temperature sensing portion") of the temperature sensing portion 13a than the first temperature sensing portion. In this embodiment, the first temperature sensing portion corresponds to a side surface of the cylindrical temperature sensing portion 13a, and the second temperature sensing portion corresponds to an end portion of the temperature sensing portion 13a in the axial direction.

Therefore, when the cooling water flows through both bypass water passages 101 and 102, heat amount given to the temperature sensing portion 13a of the thermostat 13 per unit time becomes large as compared with when the cooling water flows only through the second bypass water passage 102, so that an opening valve operation of the thermostat can be sensitive. Accordingly, when the cooling water flows through both bypass water passages 101 and 102, an average temperature of the cooling water can be maintained low as compared with when the cooling water flows only through the second bypass water passage 102.

In this embodiment, the thermostat 13 and both bypass water passages 101 and 102 are set such that the average temperature of the cooling water is set to approximately 80 when the cooling water flows through both bypass water passages 101 and 102 and further the average temperature of the cooling water is set to approximately 100 when the cooling water flows only through the second bypass water passage 102.

In FIG. 1, the cooling water having flowed out of the heat-accumulating tank 4 circulates in a heater water passage 104 while passing through the heater core 5, the intake air heat exchanger 9, the A/T heat exchanger 11, and the E/O heat exchanger 12 to the engine 1. Further, the cooling water having flowed out of the heat-accumulating tank 4 circulates in the heater bypass water passage 105 while bypassing the heater core 5 and the intake air heat exchanger 9. At a branch portion between the heat accumulating tank 4 and the heater bypass water passage 105, there is provided a flow control valve for controlling an amount of the cooling water flowing into the heater core 5.

Figure 2:
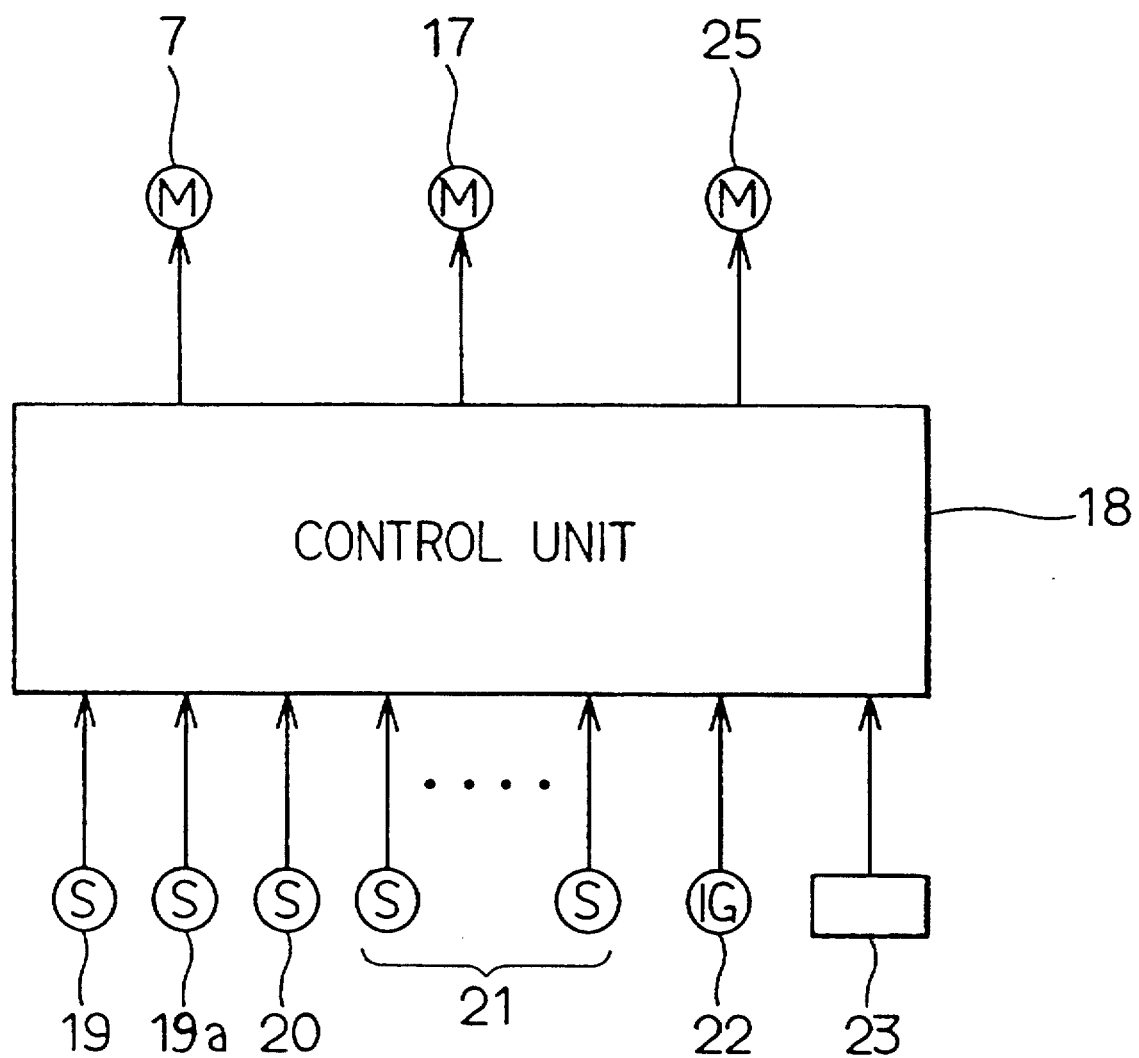
FIG. 2 is a block diagram of a control system in the first embodiment.

The flow control valve 16 is actuated by an actuator 17 such as a servomotor. As shown in FIG. 2, the actuator 17 is controlled by a control unit 18. To the control unit 18, there are input signals from a water temperature sensor 19 for detecting a temperature of the cooling water circulating into the engine 1, a water temperature sensor 20 for detecting a temperature of the cooling water flowing into the heater water passage 104, a water temperature sensor 19a for detecting a temperature of the cooling water having just flowed out of the engine 1 (or a temperature of the cooling water in the engine 1), an air conditioning sensor 21 for detecting information required for controlling the air conditioning apparatus, which includes an outside air temperature for detecting a temperature of the air outside the passenger compartment, an inside air temperature for detecting a temperature of the air in the passenger compartment, and the like, and an ignition switch 22 for detecting an operating state of the engine 1. The control unit 18 controls the actuator 17, the air conditioning means such as the blower 7, and an actuator 25 (described later) according to a program pre-stored based on signals from the water temperature sensor 20 and the air conditioning sensor 21.

Each of the water temperature sensors 19, 19a and 20 is of a thermistor type which is superior in responsibility (time constant thereof is approximately 1–2 sec.).

A quick heating switch 23 is for instructing a heating operation in which high-temperature cooling water in the heat-accumulating tank 4 is introduced into the heater core 5 when the temperature of the cooling water is too low to perform a heating operation, such as at the time of just starting the engine. The quick heating switch 23 is turned on by a manual operation of the passenger.

A switching (opening-closing) valve 24 is for switching cooling water circuits according to a temperature of the cooling water and an operating state of the engine 1. The switching valve 24 is actuated by the actuator 25 such a servomotor. Similar to the flow control valve 16, the actuator 25 is controlled by the control unit 18 (see FIG. 2).

Figure 3:
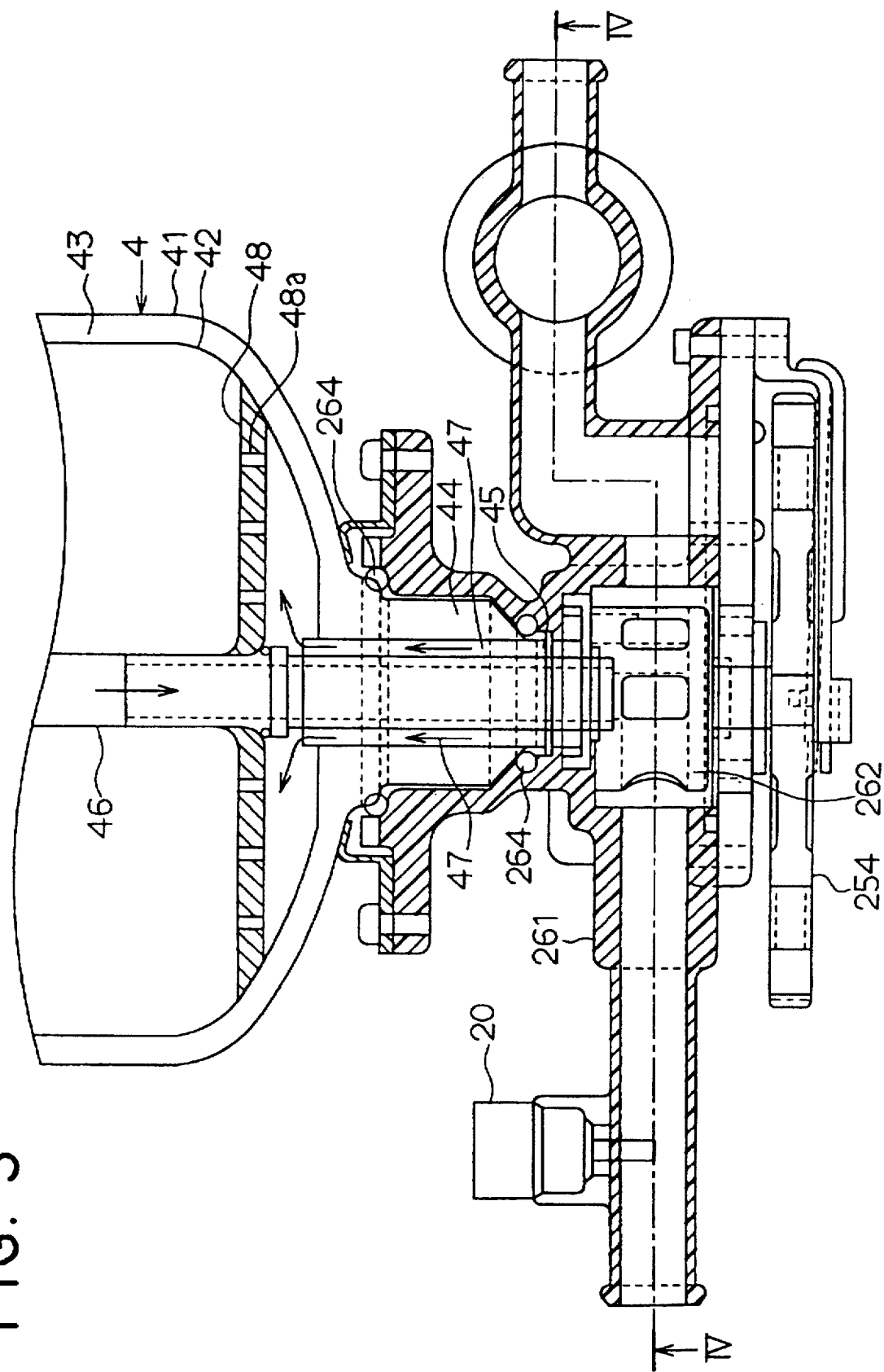
FIG. 3 is a cross sectional view showing a switching valve assembled into a heat-accumulating tank in the first embodiment.

FIG. 3 is a cross sectional view showing the switching valve 24 assembled into the heat-accumulating tank 4. The heat-accumulating tank 4 is, as shown in FIG. 3, constructed by an outside tank 41 and an inside tank 42, each of which is made of a material which is superior in corrosion resistance, such as stainless. Between both tanks 41 and 42, there is formed a heat insulating layer 43 having substantially vacuum to improve heat insulating performance. In FIG. 3, because each thickness of the inside tank 41 and the outside tank 42 is thin, hatching for showing the cross section is omitted.

On a bottom portion of the heat-accumulating tank 4 in the gravitational direction, there is formed a tubular protruding portion 44 protruding in the gravitational direction. In a bottom end portion of the tubular protruding portion 44, there is formed an opening passage 45 through which the cooling water flows in and out. In the opening passage 45, there is disposed coaxially with the opening passage 45 an inlet pipe 46 having a water inlet (not shown) within the heat-accumulating tank 4 at an upper side in the gravitational direction. A space between the inlet pipe 46 and the opening passage 45 forms an inflow passage 47 for introducing the cooling water having been discharged from the engine 1 into the heat-accumulating tank 4.

A housing 261 of the switching valve 24 is made of resin which is superior in forming performance and heat insulating performance, such as nylon 66. The housing 261 covers entirely the tubular protrusion 44 of the heat-accumulating tank 4 from the outside to prevent heat radiation from the tubular protrusion 44.

A control valve element 262 of the switching valve 24 is of the rotary type. As shown in FIG. 4, the control valve element 262 is rotated with a center of the opening passage 45 as its rotating center, by an actuator 25 through a speed reduction mechanism composed of a worm 251, a worm wheel 252, a spur gear 253, and a fan-shaped gear 254. As shown in FIG. 3, the valve element 262 is disposed adjacent to the opening passage 45 to selectively open and close the opening water passage 45.

A sealing member 263 is made of resin fluoride and seals a clearance between the control valve element 262 and the housing 261. An O-ring 264 is made of a nitrile rubber. Further, a mixture preventing plate 48 is formed in a disc shape in which a plurality of through-holes 48a are formed, and is for preventing a mixture of the cooling water flowing into the heat-accumulating tank 4 and the cooling water staying in the heat-accumulating tank 4.

Next, an operation of the embodiment will be described.

(1) Cooling water heat temperature maintaining mode (while the engine 1 is stopped)

When it is determined that the engine 1 is stopped by a signal from the ignition switch 22, the inflow cooling water passage 106 extending from the engine 1 to the heat-accumulating tank 4 and the outflow cooling water passage 107 extending from the heat-accumulating tank 4 to the engine 1 are closed (see FIG. 1). In this way, the cooling water accumulated in the heat-accumulating tank 4 is reserved.

Irrespective of the temperature of the cooling water and the ON or OFF state of the quick heating switch 23, when the engine 1 is stopped, the control unit 18 controls the switching valve 24 to switch the cooling water circuit to this mode.

(2) Engine warm-up accelerating mode

Figure 5:
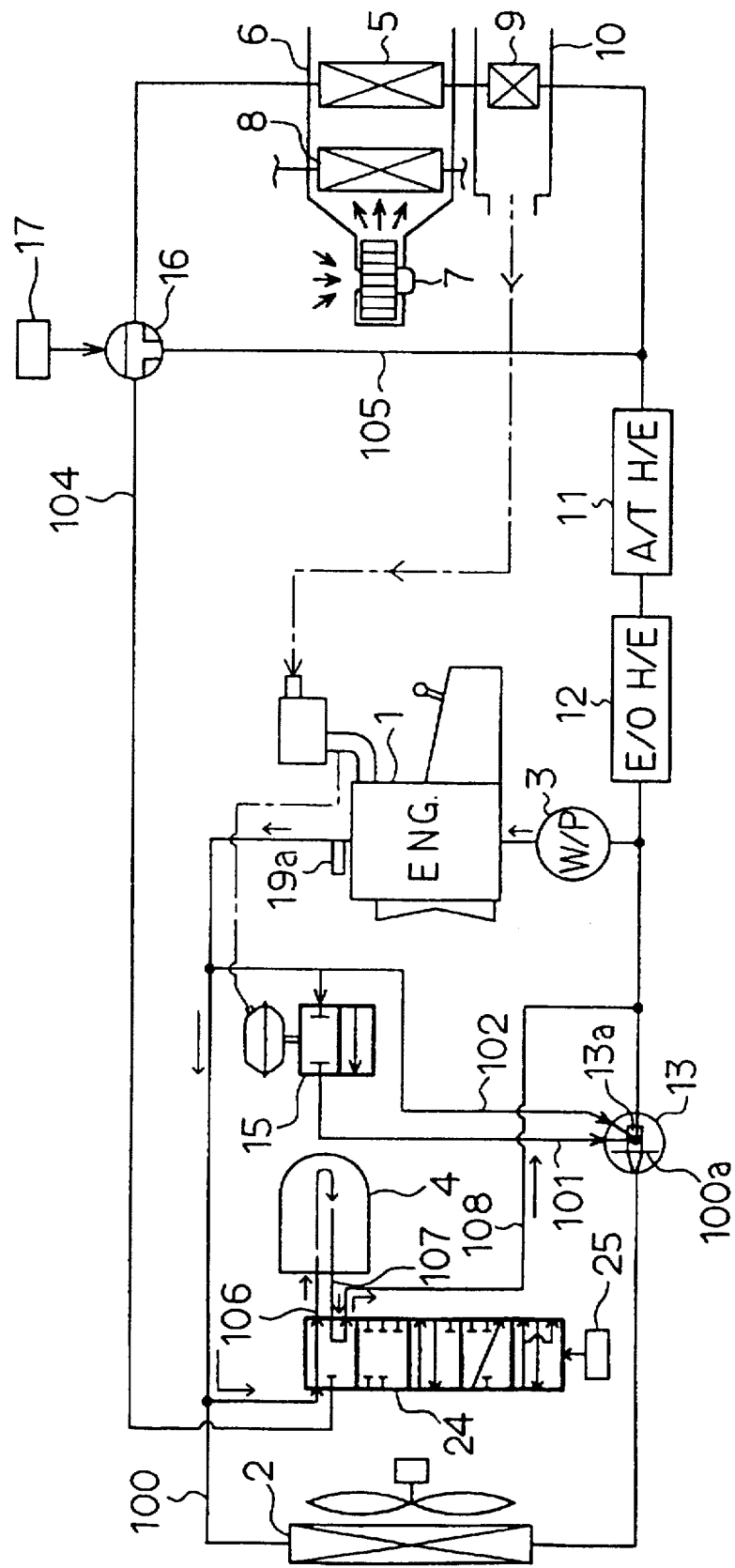
FIG. 5 shows a flow of cooling water in the cooling water circuit in an engine warm-up accelerating mode in the first embodiment.

When the engine 1 starts, the inflow cooling water passage 106 and the outflow cooling water passage 107 are opened and the heater water passage 104 is closed. In this way, all of the high-temperature cooling water accumulated in the heat-accumulating tank 4 circulates into the engine 1 through a warm-up accelerating water passage 108 to accelerate the warm-up operation of the engine 1 (see FIG. 5).

(3) Quick heating mode

Figure 6:
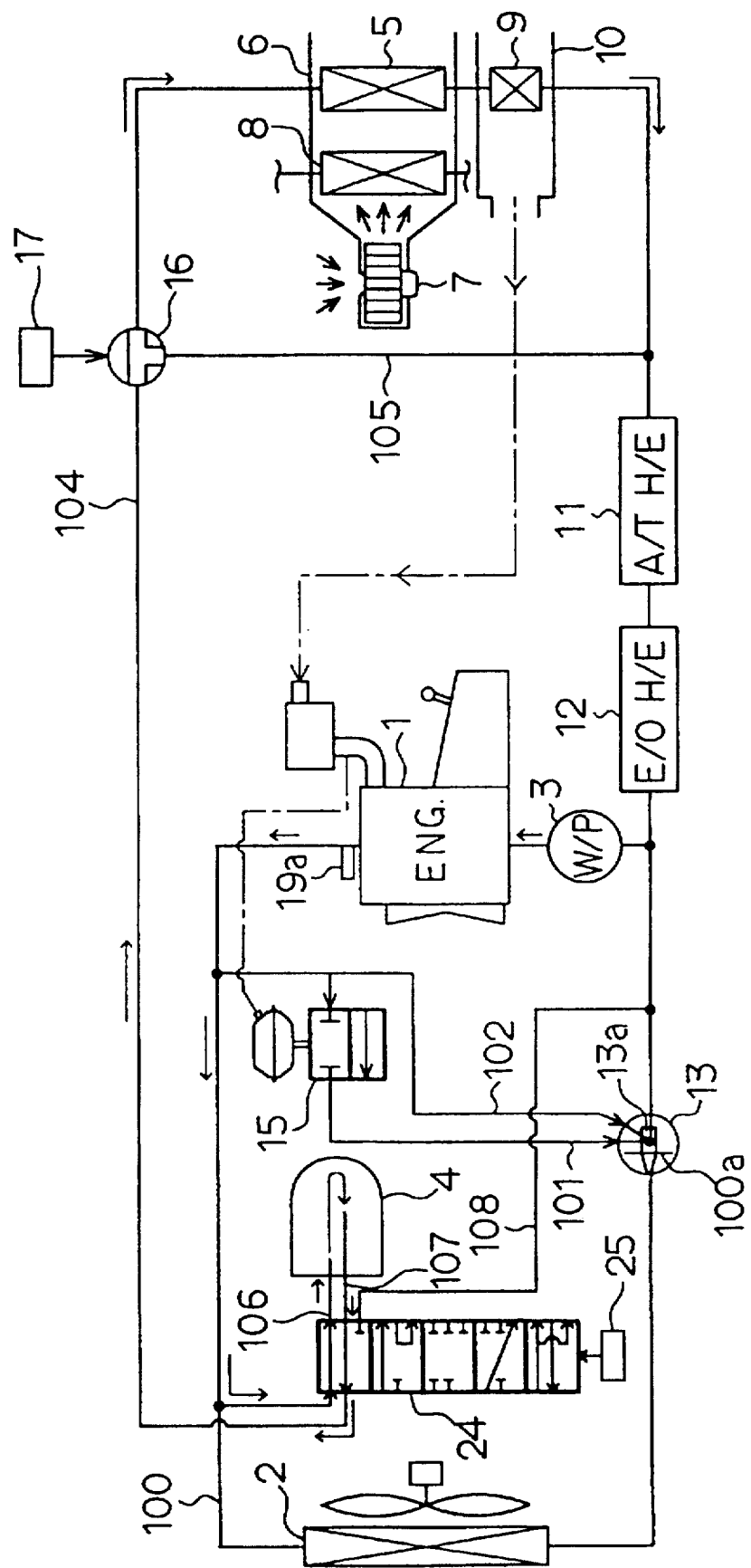
FIG. 6 shows a flow of cooling water in the cooling water circuit in a quick heating mode in the first embodiment.

After the engine 1 starts, when the quick heating switch 23 is turned on, the inflow cooling water passage 106, the heater water passage 104, and the outflow cooling water passage 107 are opened, and the warm-up accelerating water passage 108 is closed. In this way, all of the cooling water accumulated in the heat-accumulating tank 4 passes toward the heater core 5 through the heater water passage 104 to improve the quick heating operation (see FIG. 6).

(4) Cool water reserving mode

Figure 7:
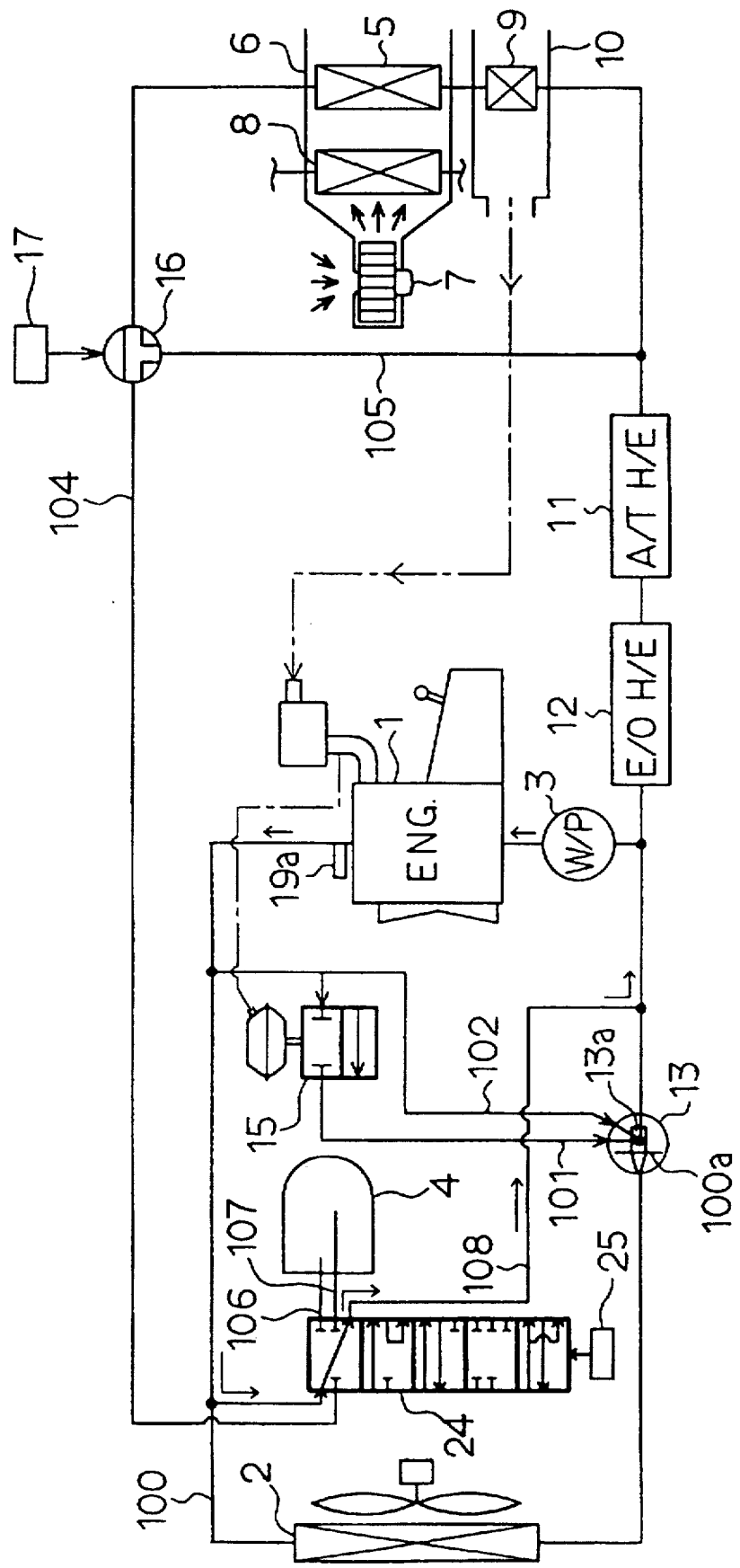
FIG. 7 shows a flow of cooling water in the cooling water circuit in a cool water reserving mode in the first embodiment.

During the engine warm-up accelerating mode, when the temperature $Tw_1$ of the cooling water having flowed out of the heat-accumulating tank 4 (the detection valve of the water temperature sensor 19) is lower than a first predetermined temperature, the cooling water having flowed out of the engine 1 circulates directly into the engine 1 to bypass the heat-accumulating tank 4 (see FIG. 7).

(5) Heat accumulating mode

Figure 8:
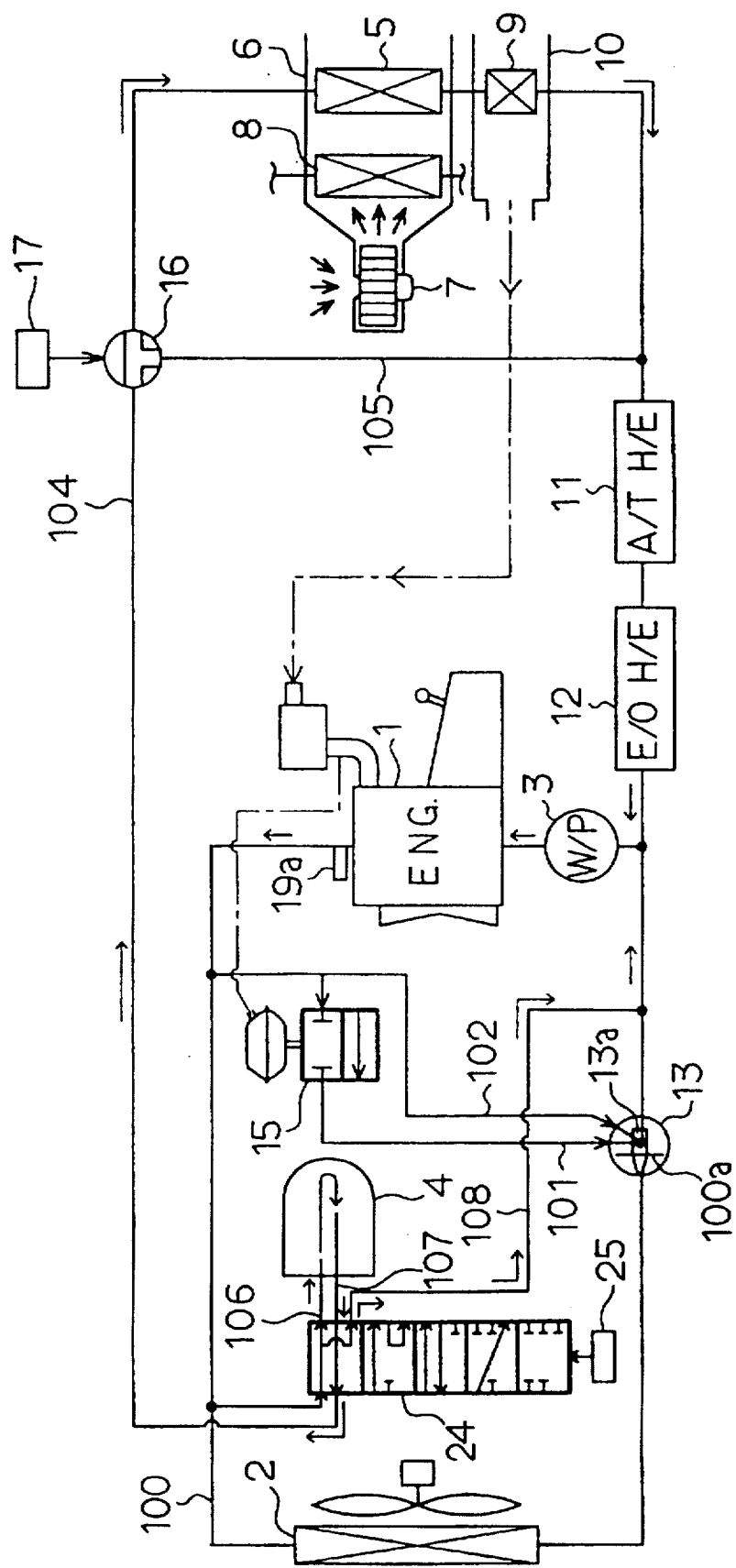
FIG. 8 shows a flow of cooling water in the cooling water circuit in a heat accumulating mode in the first embodiment.

During the cool water reserving mode, when the temperature $Tw_2$ of the cooling water having flowed out of the heat-accumulating tank 4 (the detection valve of the water temperature sensor 19) reaches a second predetermined temperature (in this embodiment, 80), the heating operation is regarded as finished, and the inflow cooling water passage 106, the outflow cooling water passage 107, the heater water passage 104, and the warm-up accelerating water passage 108 are opened. In this way, the cooling water having flowed out of the engine 1 passes through both of the heater core 5 and the heat-accumulating tank 4. Therefore, high-temperature cooling water is accumulated in the heat-accumulating tank 4 (see FIG. 8).

The first predetermined is appropriately determined based on the heat insulating capacity of the heat-accumulating tank 4, the minimum outside air temperature and the like. In this embodiment, the first predetermined temperature is set to approximately 30° C.

Figure 9:
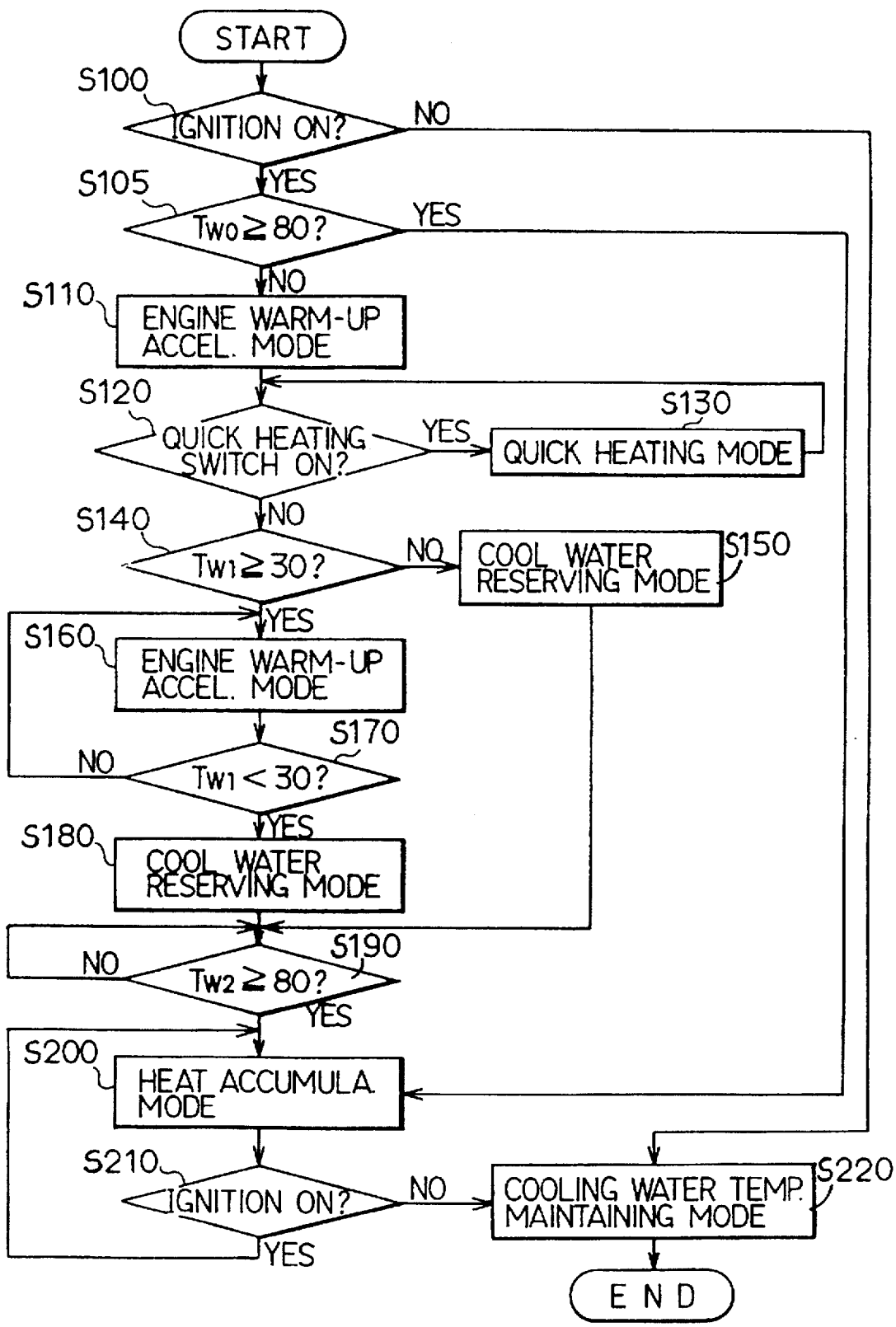
FIG. 9 is a flow chart showing an operation of the switching valve according to each operation mode in the first embodiment.

FIG. 9 shows a flow chart for an operation of the switching valve 24 according to each operation mode. The operation of the switching valve 24 will be described with reference to the flow chart.

It is determined whether or not the engine 1 is operating by the ignition switch 22 at step S100. When it is determined that the engine is operating, it is determined whether or not the temperature $Tw_0$ of the cooling water having flowed out of the engine 1, detected by the water temperature sensor 19a, is equal to or higher than 80° C. at step S105. On the other hand, when it is determined that the engine 1 stops, the switching valve 24 is set to the cooling water temperature maintaining mode at step S220.

When it is determined that the temperature $Tw_0$ is equal to or higher than 80° C., the switching valve 24 is set to the heat accumulating mode at step S200. When it is determined that the temperature $Tw_0$ is lower than 80° C., the switching valve 24 is set to the engine warm-up accelerating mode at step S110.

Next, it is determined whether or not the quick heating switch 23 is set on at step S120. When it is determined that the quick heating switch 23 is set on, the switching valve 24 is set to the quick heating mode at step S130. On the other hand, when it is determined that the quick heating switch 23 is not set on, it is determined whether or not the temperature $Tw_1$ of the cooling water is equal to or higher than 30° C. at step S140. When it is determined that the temperature $Tw_1$ of the cooling water is lower than 30° C., the switching valve 24 is set to the cool water reserving mode at step S150. On the other hand, when it is determined that the temperature $Tw_1$ of the cooling water is equal to or higher than 30° C., the switching valve 24 is maintained to the engine warm-up accelerating mode until the temperature $Tw_1$ of the cooling water becomes lower than 30° C. at steps S160 and S170.

When it is determined that the temperature $Tw_1$ of the cooling water is lower than 30° C., the switching valve 24 is set to the cool water reserving mode until the temperature $Tw_2$ of the cooling water becomes higher than 80° C. at step S180 and S190. When the temperature $Tw_2$ of the cooling water becomes higher than 80° C., the switching valve 24 is set to the heat-accumulating mode at step S200.

Next, the switching valve 24 is maintained to the heat accumulating mode until the engine 1 is stopped at step S210. When the engine 1 stops, the switching valve 24 is set to the cooling water temperature maintaining mode at step S220.

Next, features of this embodiment will be described.

According to this embodiment, the heat-accumulating tank 4 is positioned in the cooling water circuit at a lower position in the gravitational direction, if the inflow cooling water passage 106 and the outflow cooling water passage 107 are left opened without being closed, when a predetermined time has elapsed since the engine is stopped, the temperature of the cooling water in the heat-accumulating tank at a lower position in the gravitational direction is maintained high for a while. On the other hand, the temperature the cooling water in the portions (e.g., the pipe connected to the heat-accumulating tank 4) which are positioned higher than the heat-accumulating tank 4 in the gravitational direction becomes lower because of the heat exchange with the outside air, and a difference of the specific gravity occurs, with the result that warm cooling water in the heat-accumulating tank 4 flows out of the heat-accumulating tank 4 by natural convection.

However, in this embodiment, because the inflow cooling water passage 106 and the outflow cooling water passage 107 are closed while the engine 1 is stopped, the above-described problem can be overcome, and the heat insulating capacity of the heat-accumulating tank 4 can be improved.

Further, because the valve element 262 of the switching valve 24 for closing the inflow cooling water passage 106 and the outflow cooling water passage 107 is positioned adjacent to the opening passage 45 of the heat-accumulating tank 4, it is possible to certainly prevent the mixture of the cooling water in the other portions than the heat-accumulating tank 4 and the cooling water in the heat-accumulating tank 4. Therefore, it is possible to further improve the heat insulating capacity of the heat-accumulating tank 4.

Figure 10A:
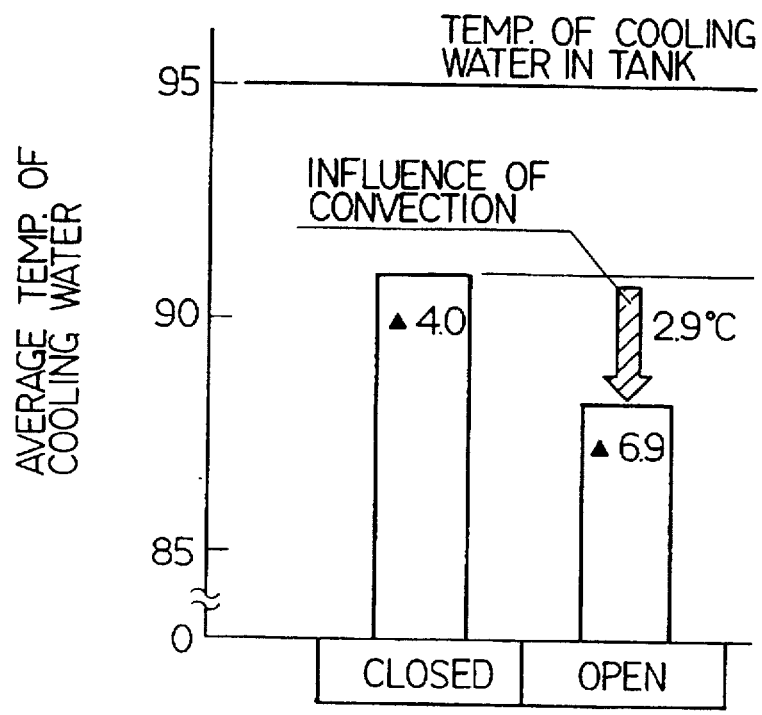
FIGS. 10A and 10B are graphs showing test results of the heat insulating capacity in the first embodiment.
Figure 10B:
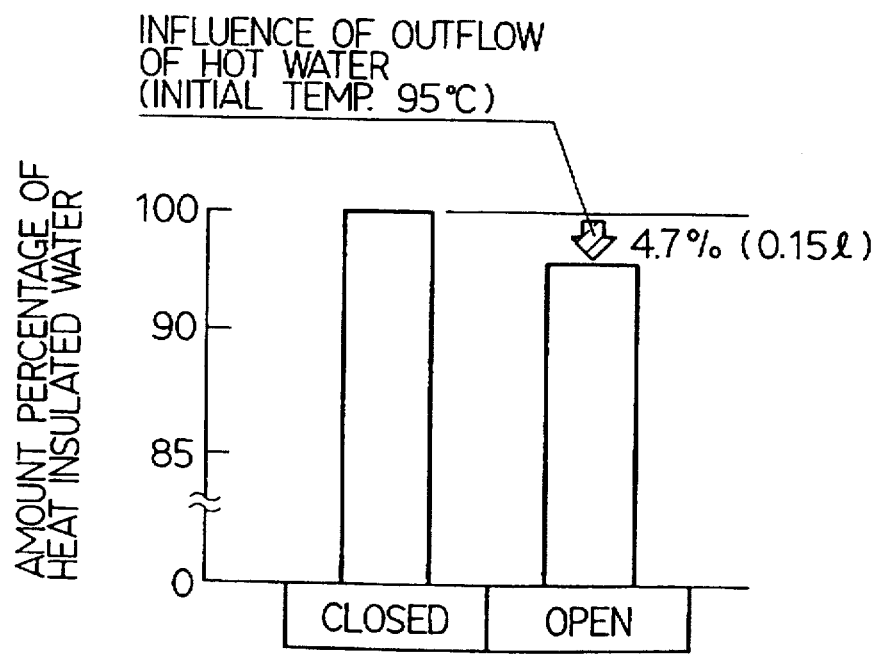

FIGS. 10A and 10B show test results showing when both cooling water passages 106 and 107 are closed and when both cooling water passages 106 and 107 are opened. FIG. 10A shows a variation of the temperature of the cooling water in the heat-accumulating tank 4, and FIG. 10B shows a variation of the amount of the cooling water in the heat-accumulating tank 4 by constriction of the cooling water.

As being understood from FIGS. 10A and 10B, when both cooling water passages 106 and 107 are closed, the temperature of the cooling water is lowered by 2.9 and the amount of the cooing water is lowered by 4.7% (150 cc), as compared with when both cooling water passages 106 and 107 are opened. Therefore, it has been confirmed that the heat insulating capacity as much as approximately 1821 J (435 cal) which is converted into heat amount accumulated in the heat-accumulating tank 4 can be improved.

The tests were performed under conditions that the volume of the heat-accumulating tank 4 was 30° C. 00 cc, the initial temperature of the cooling water was 95, the atmospheric temperature was 0, and the heat-accumulating tank 4 was left for 12 hours while both cooling water passages 106 and 107 were closed.

In the above-described first embodiment, the cooling water flowing out of the heat-accumulating tank 4 circulates directly into the engine 1 in the engine warm-up accelerating mode; however, the cooling water flowing out of the heat-accumulating tank 4 may circulate into the engine 1 after passing through the heater core 5, the intake air heat exchanger 9, the A/T heat exchanger 11, and the E/O heat exchanger 12. In this way, the intake air, the mission oil, and the engine oil can be heated by heat accumulated in the heat-accumulating tank 4 so that the warm-up of the engine 1 can be accelerated. At this time, if the blower 7 is stopped to suppress the radiation of the cooling water in the heater core 5, the warm-up accelerating effect can be further enhanced. After the warm-up operation is finished, if the flow control valve 16 is controlled such that the cooling water flowing out of the heat-accumulating tank 4 circulates into the engine 1 while bypassing the intake air heat exchanger 9, the intake air can be prevented form being heated excessively after the warm-up operation is finished.

A second embodiment of the present invention will be described with reference to FIG. 11.

Figure 11:
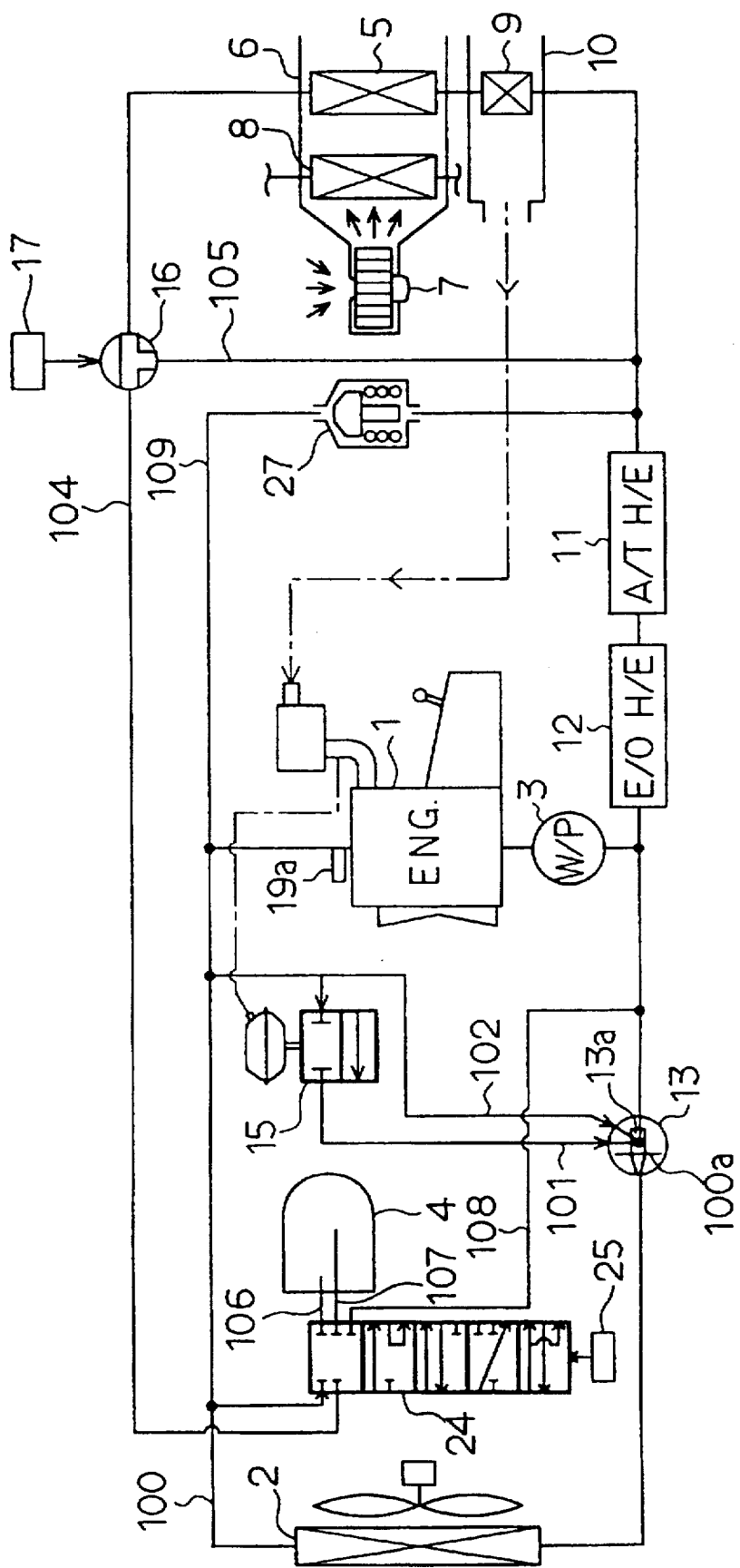
FIG. 11 shows a flow of cooling water in the cooling water circuit according to a second embodiment of the present invention.

In the second embodiment, the cooling water circuit in the first embodiment is replaced with cooling water circuit shown in FIG. 11.

In FIG. 11, there are newly provided a cooling water passage 109 for introducing the cooling water from the engine 1 to directly into the A/T heat exchanger 11 and the E/O heat exchanger 12 and a differential valve 27 disposed in the cooling water circuit 109, for restricting the cooling water passage 109 according to a decrease of dynamical pressure of the cooling water.

A third embodiment of the present invention will be described with reference to FIG. 12.

Figure 12:
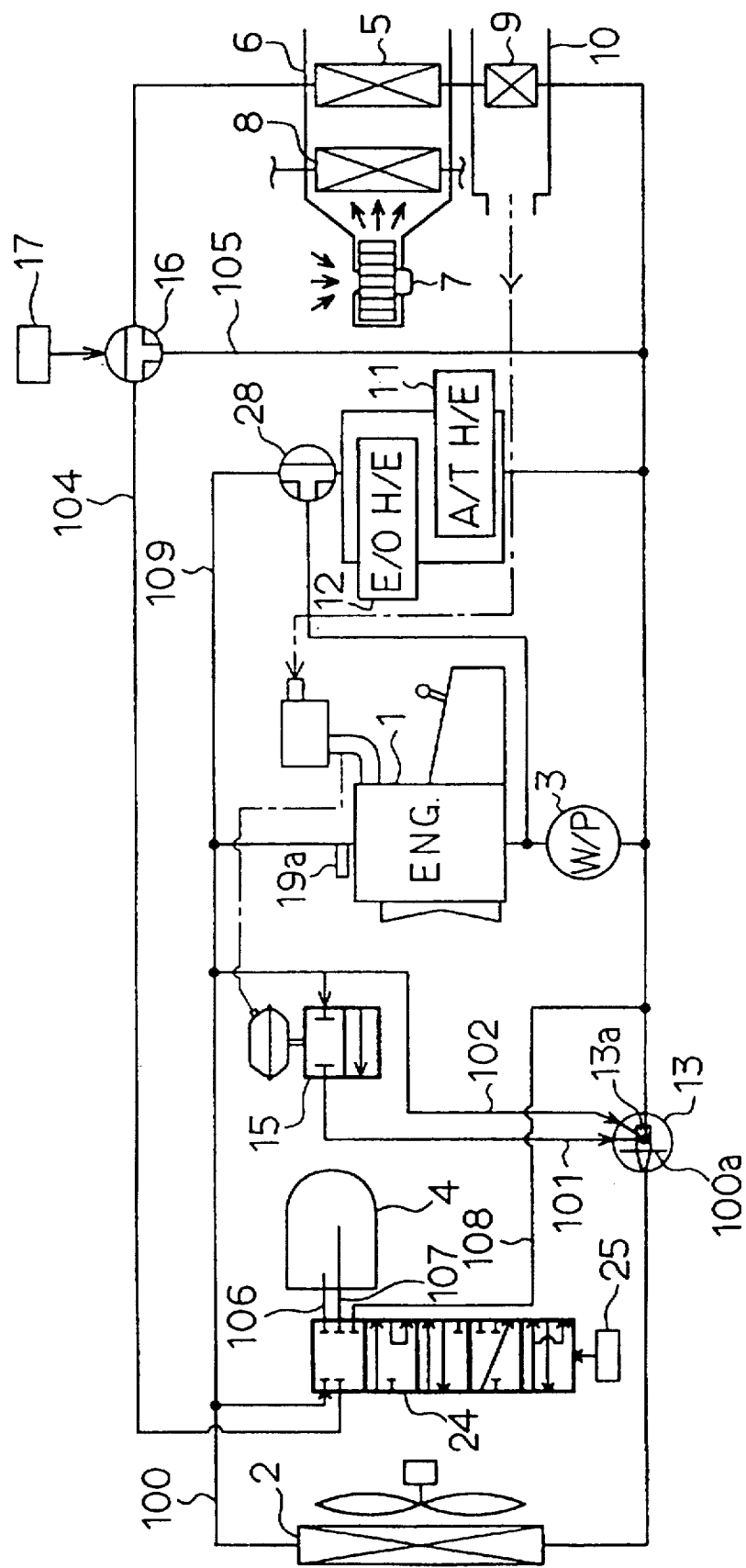
FIG. 12 shows a flow of cooling water in the cooling water circuit according to a third embodiment of the present invention.

In the third embodiment, the cooling water circuit in the first embodiment is replaced with cooling water circuit shown in FIG. 12.

In FIG. 12, there is disposed a three-way valve 28 in the cooling water passage 109, and in the engine warm-up operation mode, it is prevented that the cooling water circulates through the A/T heat exchanger 11 and the E/O heat exchanger 12.

In the above-described embodiment, when the engine 1 is stopped, both of the inflow cooling water passage 106 and the outflow cooling water passage 107 are closed; however, at least one of the water passages may be closed.

Next, a fourth embodiment of the present invention will be described with reference to FIGS. 13 to 27.

This fourth embodiment differs from the first embodiment slightly in the construction of the cooling water circuit. Hereinafter, only the different portions will be described, and the explanation of the portions similar to those in the first embodiment is omitted. The control system is similar to that shown in FIG. 2, and the switching valve 24 is assembled in the similar manner as shown in FIG.3.

Figure 13:
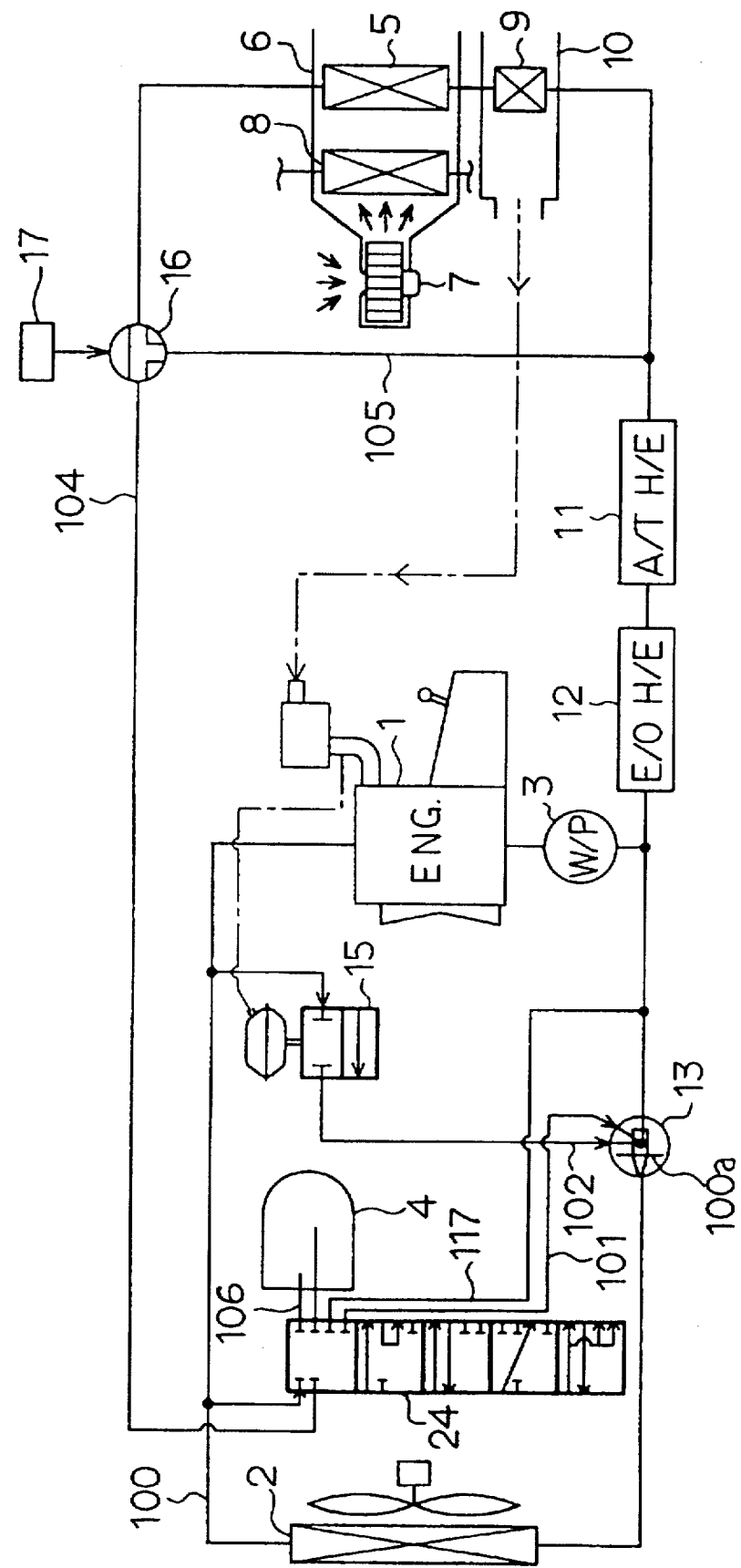
FIG. 13 shows a flow of cooling water in the cooling water circuit according to a fourth embodiment of the present invention.

In FIG. 13, the second bypass water passage 102 is connected to the joining portion 100a at a downstream side of the temperature sensing portion (the wax-box filled with wax material) 13a in such a manner that the cooling water flowing through the second bypass passage collides with a predetermined position (hereinafter referred to as "second temperature sensing portion") of the temperature sensing portion 13a.

On the other hand, the first bypass water passage 101 is connected to the joining portion 100a at a downstream side of the temperature sensing portion 13a of the thermostat in such a manner that the cooling water flowing through the first bypass passage collides with the other predetermined position (hereinafter referred to as "first temperature sensing portion") of the temperature sensing portion 13a than the second temperature sensing portion. In this embodiment, the first temperature sensing portion corresponds to an end portion of the temperature sensing portion 13a in the axial direction, and the second temperature sensing portion corresponds to a side surface of the cylindrical temperature sensing portion 13a (see FIG. 14).

Therefore, when the cooling water flows through both bypass water passages 101 and 102, heat amount given to the temperature sensing portion 13a of the thermostat 13 per unit time becomes large as compared with when the cooling water flows only through the first bypass water passage 101, so that an opening valve operation of the thermostat can be sensitive. Accordingly, when the cooling water flows through both bypass water passages 101 and 102, an average temperature of the cooling water can be maintained low as compared with when the cooling water flows only through the first bypass water passage 101.

In this embodiment, the thermostat 13 and both bypass water passages 101 and 102 are set such that the average temperature of the cooling water is set to approximately 80° C. when the cooling water flows through both bypass water passages 101 and 102 and further the average temperature of the cooling water is set to approximately 100 when the cooling water flows only through the first bypass water passage 101.

A load responding valve 15 is for opening and closing the second bypass water passage 102.

As shown in FIG. 15, one end of a part 100b of the radiator water passage 100 is connected to the cooling water outlet side of the radiator, and the other end thereof is connected to the cooling water inlet side of the engine 1. Further, one end of a part 101a of the first bypass water passage 101 is connected to the cooling water outlet side of the engine 1, and the other end thereof is connected to the cooling water inlet side of the engine 1 through the temperature sensing portion 13a. Further, as shown in FIGS. 13 and 14, a warm-up water passage 117 is for introducing the cooling water having flowed out of the heat-accumulating tank 4 to the engine 1, and a tank water passage 106 is for introducing the cooling water having flowed out of the engine 1 to the heat-accumulating tank 4.

Figure 15A:
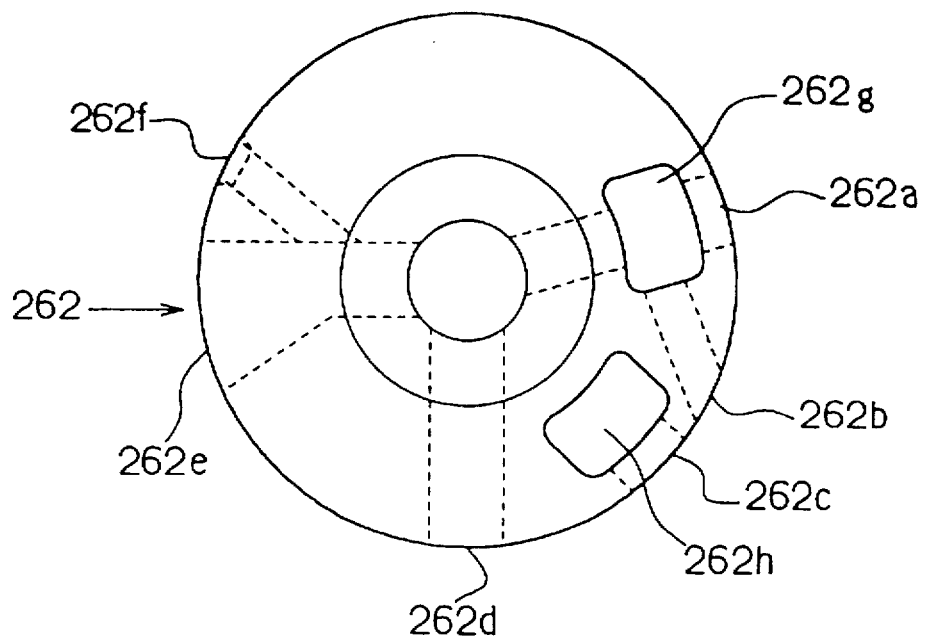
FIG. 15A is a top enlarged view showing a control valve element.
Figure 15B:
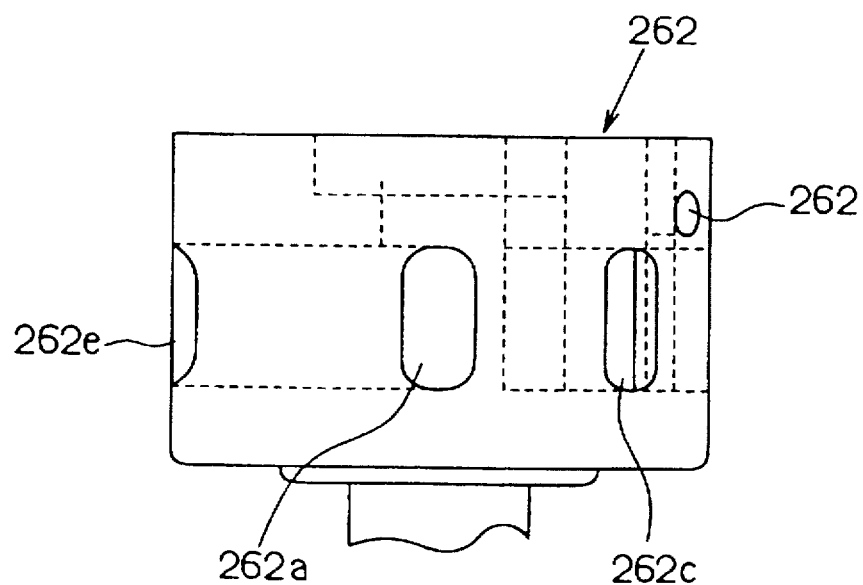
FIG. 15B is a side enlarged view showing a control valve element in the fourth embodiment.
Figure 18:
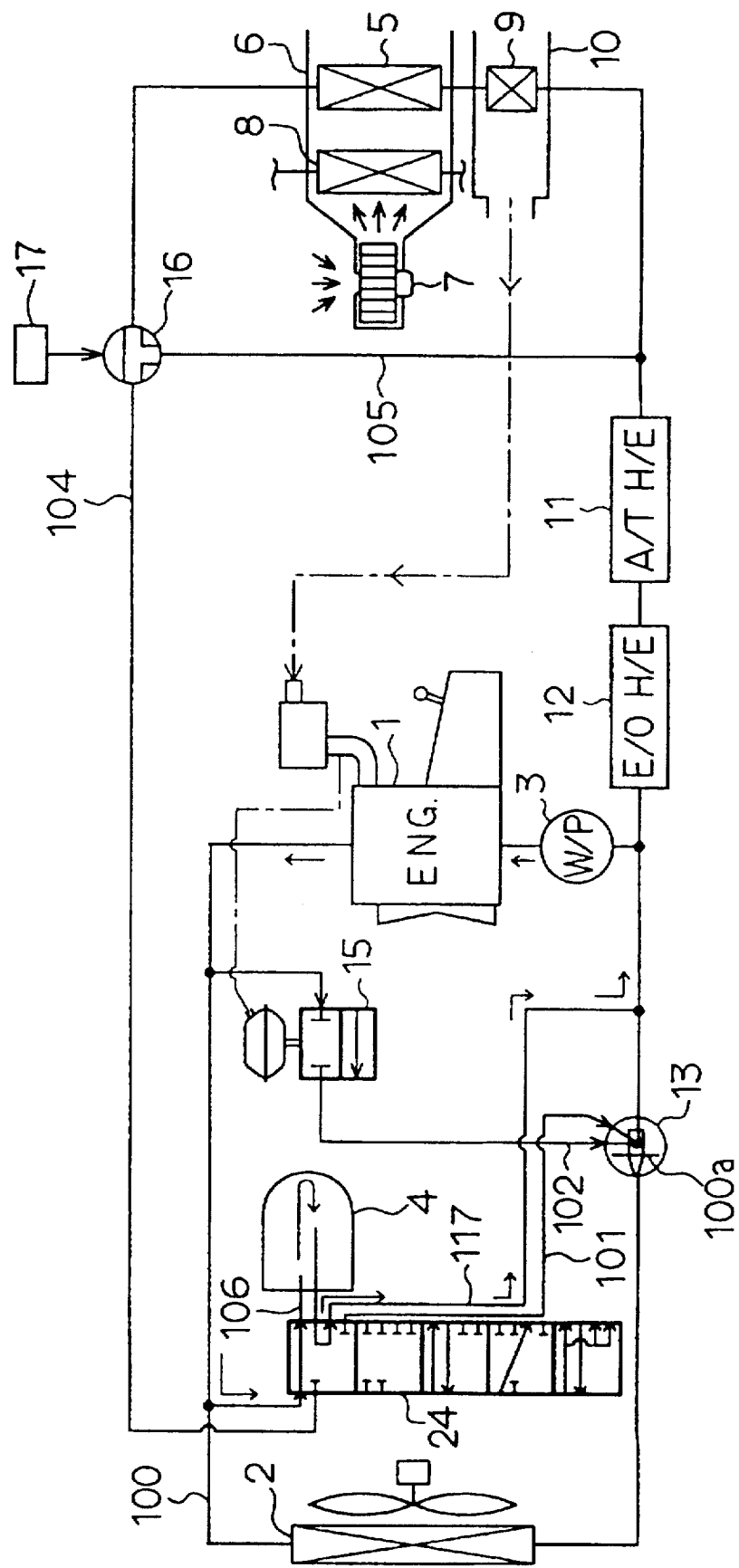
FIG. 18 shows a flow of cooling water in the cooling water circuit in the engine warm-up accelerating mode according to the fourth embodiment of the present invention.
Figure 19:
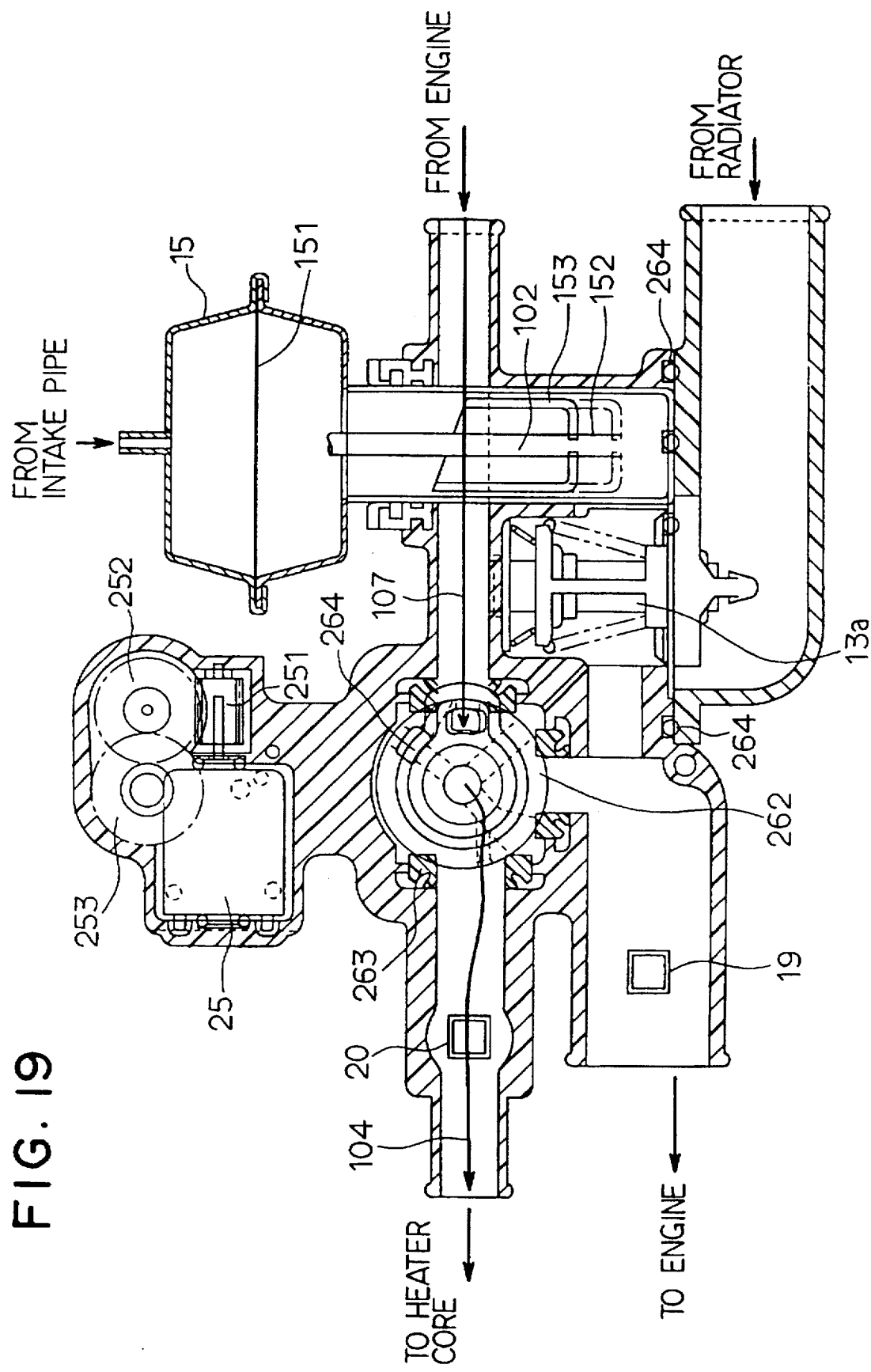
FIG. 19 is a cross sectional view, which corresponds to the cross section taken along IV—IV of FIG. 3, for showing the switching valve in a quick heating mode in the fourth embodiment.
Figure 20:
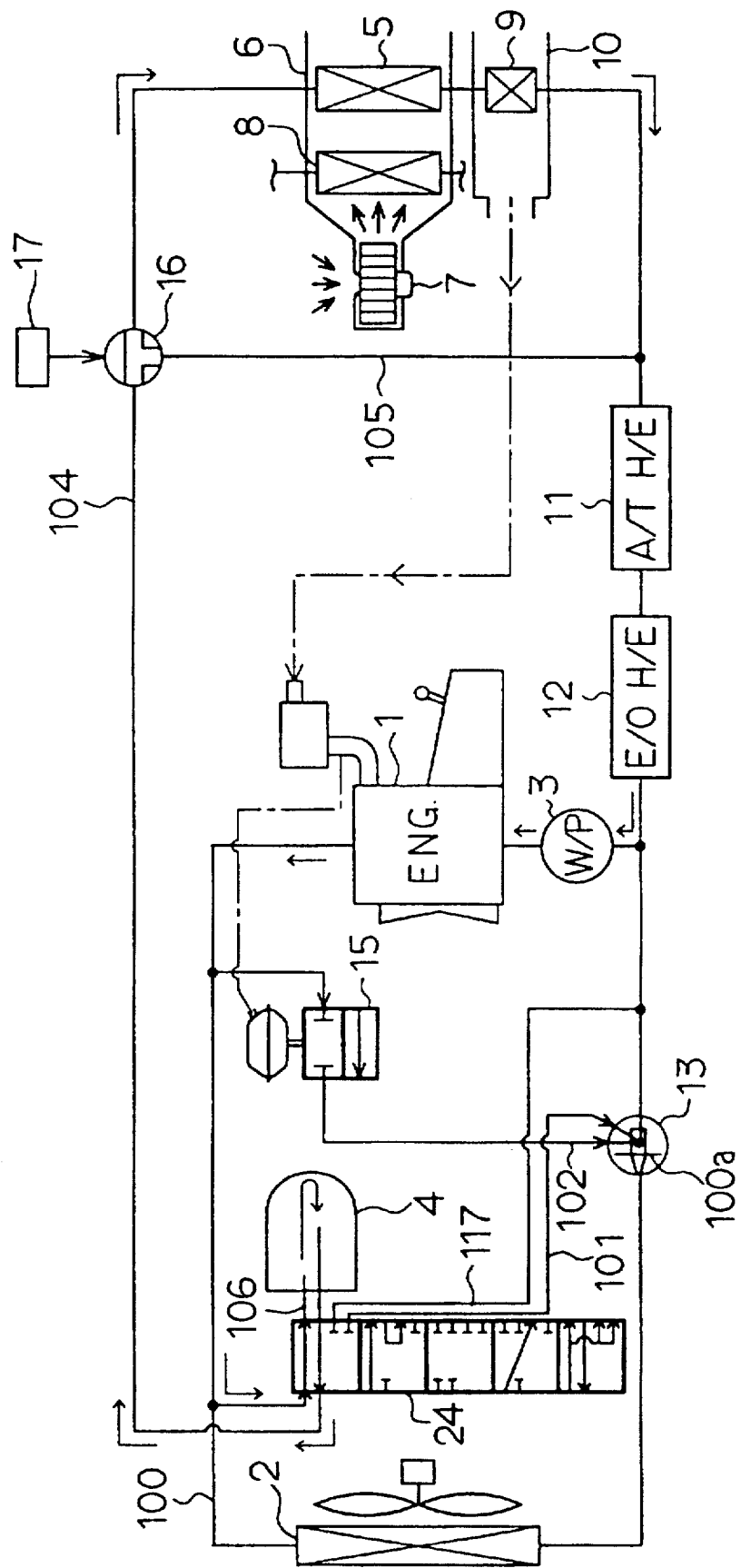
FIG. 20 shows a flow of cooling water in the cooling water circuit in the quick heating mode according to the fourth embodiment of the present invention.
Figure 21:
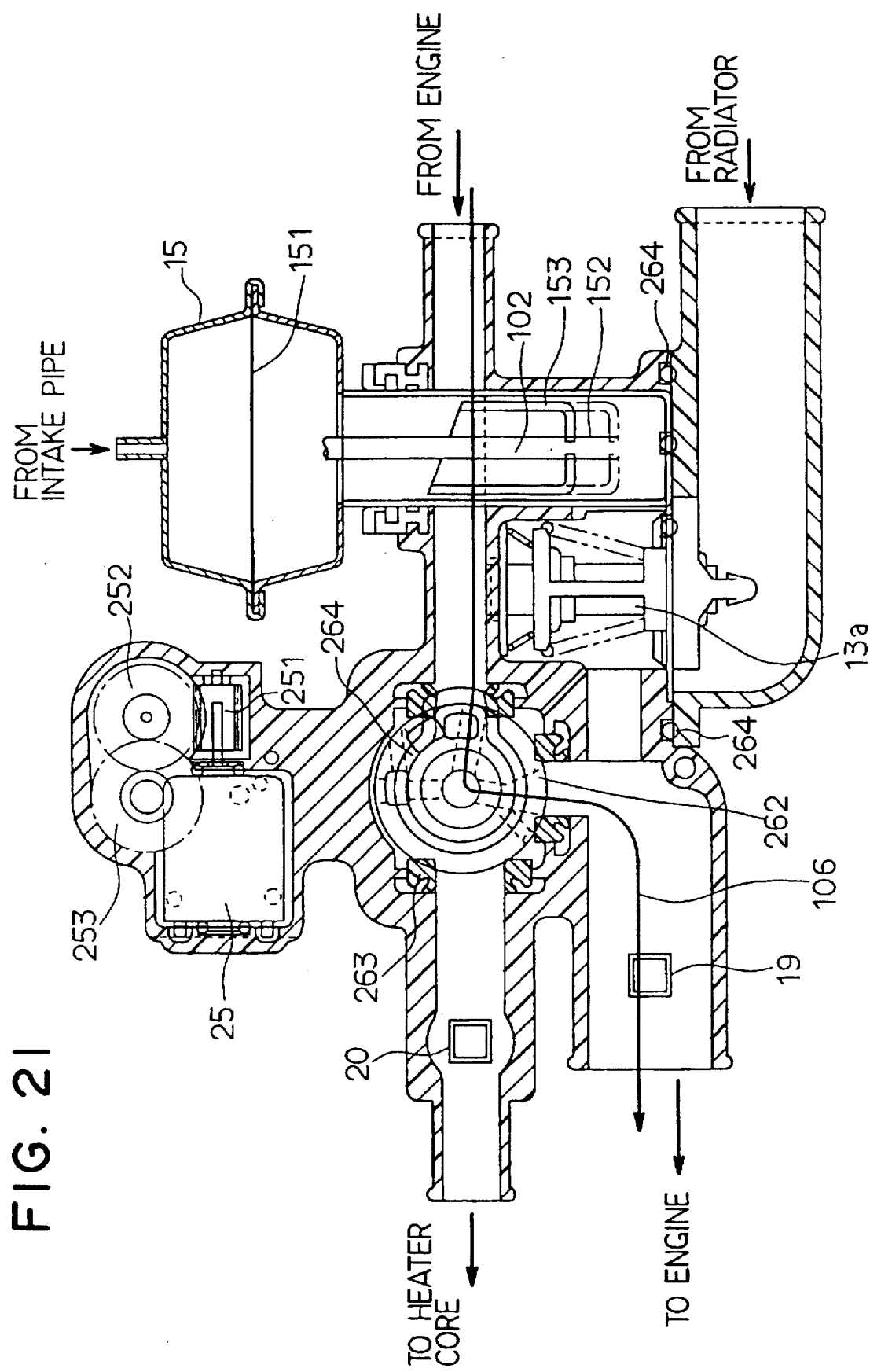
FIG. 21 is a cross sectional view, which corresponds to the cross section taken along IV—IV of FIG. 3, for showing the switching valve in a cool water reserving mode in the fourth embodiment.
Figure 22:
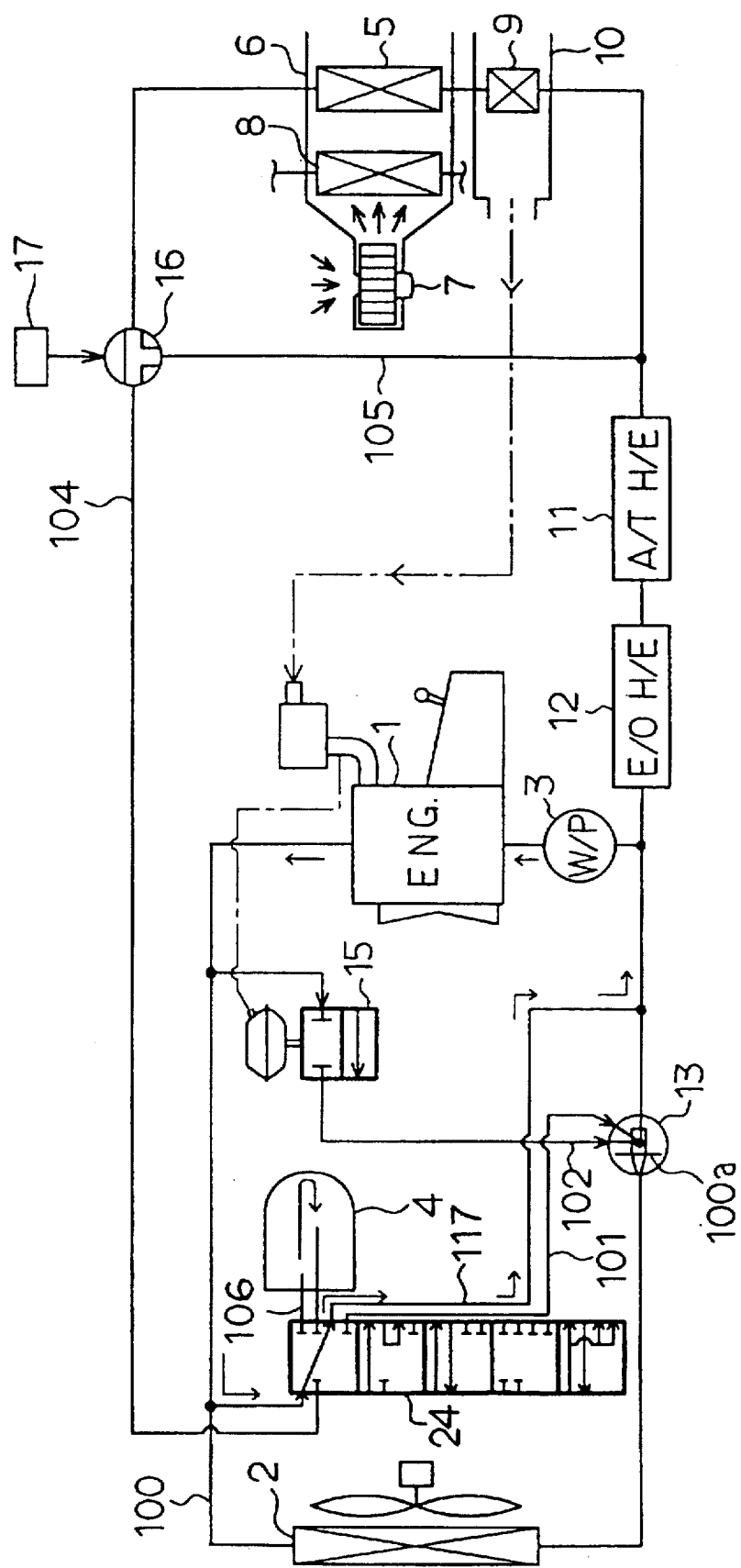
FIG. 22 shows a flow of cooling water in the cooling water circuit in the cool water reserving mode according to the fourth embodiment of the present invention.
Figure 23:
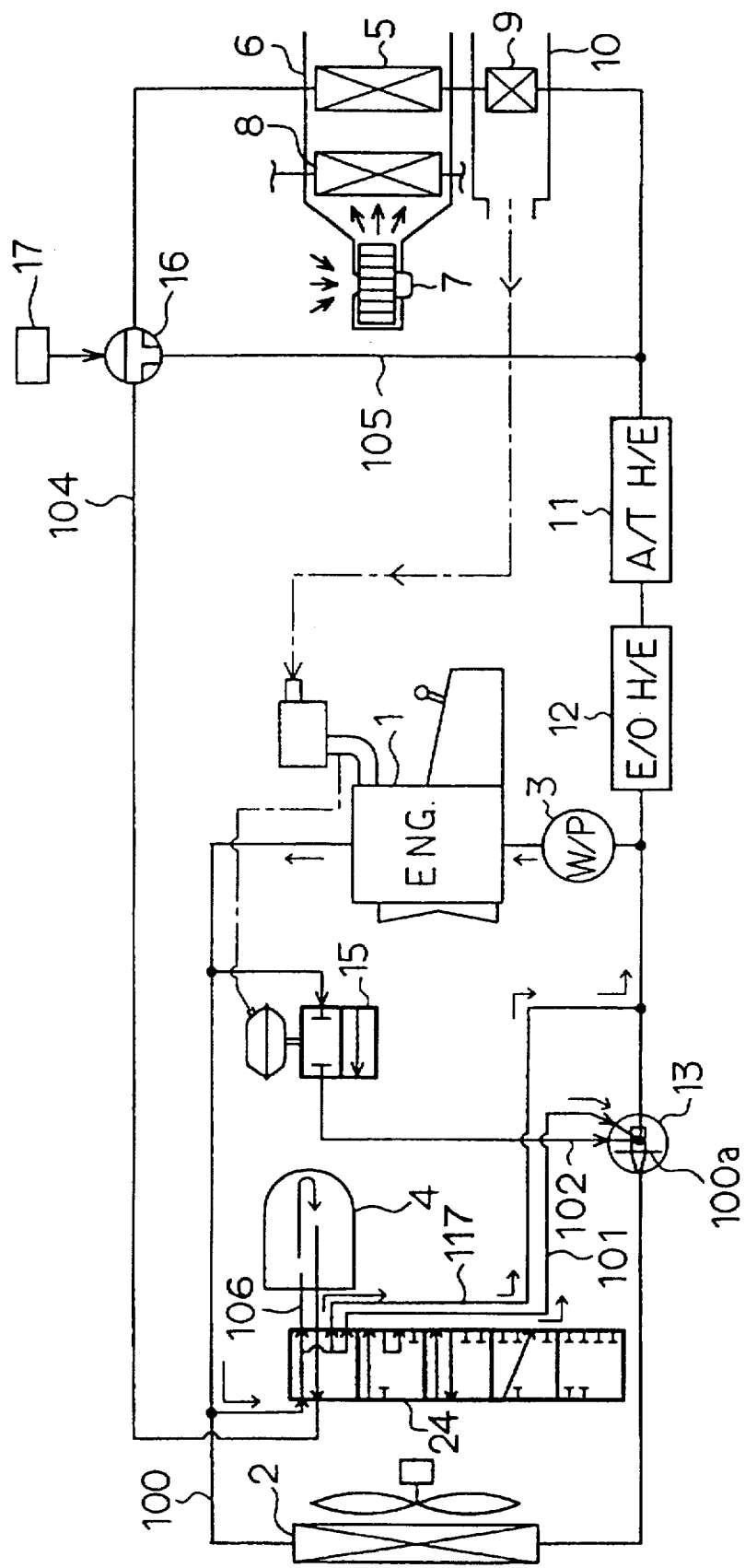
FIG. 23 shows a flow of cooling water in the cooling water circuit in a heat accumulating mode according to the fourth embodiment of the present invention.

In the control valve element 262, as shown in FIGS. 15A and 15B, the columnar side surface is formed with communication ports 262a–262f for opening and closing each water passage 100b, the warm-up water passage 117, and the like. In the axial end portion, there are formed communication ports 262g and 262h for opening and closing the opening passage 45.

An operation of this embodiment will be described.

In this embodiment, similar to the first embodiment, five modes (the cooling water temperature maintaining mode, the engine warm-up accelerating mode, the quick heating mode, the cooling water reserving mode, and the heat accumulating mode) can be set. The object and operation in each operation mode are same as in the first embodiment. Therefore, a cross sectional view corresponding to line IV—IV of FIG. 3 and a view of the cooling water circuit in each operation mode are simply shown, and the detail explanation thereof is omitted.

Next, the operation of the switching valve 24 will be described with reference to the flow chart shown in FIGS. 24 and 25.

It is determined whether or not the engine 1 is operating by the ignition switch 22 at step S100. When it is determined that the engine is operating, it is determined whether or not the temperature $Tw_0$ of the cooling water having flowed out of the engine 1, detected by the water temperature sensor 19a, is equal to or higher than 80° C. at step S105. On the other hand, when it is determined that the engine 1 stops, the switching valve 24 is set to the cooling water temperature maintaining mode at step S250.

When it is determined that the temperature $Tw_0$ is equal to or higher than 80° C., the switching valve 24 is set to the heat accumulating mode at step S230. When it is determined that the temperature $Tw_0$ is lower than 80° C., the switching valve 24 is set to the engine warm-up accelerating mode at step S110.

Next, it is determined whether or not the quick heating switch 23 is set on at step S120. When it is determined that the quick heating switch 23 is set on, the switching valve 24 is set to the quick heating mode at step S130. On the other hand, when it is determined that the quick heating switch 23 is not set on, it is determined whether or not the temperature $Tw_1$ of the cooling water is equal to or higher than 30° C. at step S140. When it is determined that the temperature $Tw_1$ of the cooling water is lower than 30° C., the switching valve 24 is set to the cool water reserving mode at step S150. On the other hand, when it is determined that the temperature $Tw_1$ of the cooling water is equal to or higher than 30° C., the switching valve 24 is maintained to the engine warm-up accelerating mode until the temperature $Tw_1$ of the cooling water becomes lower than 30° C. at steps S160 and S170.

When it is determined that the temperature $Tw_1$ of the cooling water is lower than 30° C., the switching valve 24 is set to the cool water reserving mode until the temperature $Tw_2$ of the cooling water becomes higher than 80° C. at steps S180 and S190. When the state where the temperature $Tw_2$ of the cooling water is equal to or higher than 80° C. is continued for a predetermined time period (in the embodiment, 3 minutes), the switching valve 24 is set to the heat-accumulating mode at steps S200 to S230.

Next, the switching valve 24 is maintained to the heat accumulating mode until the engine 1 is stopped at step S240. When the engine 1 stops, the switching valve 24 is set to the cooling water temperature maintaining mode at step S250.

Figure 24:
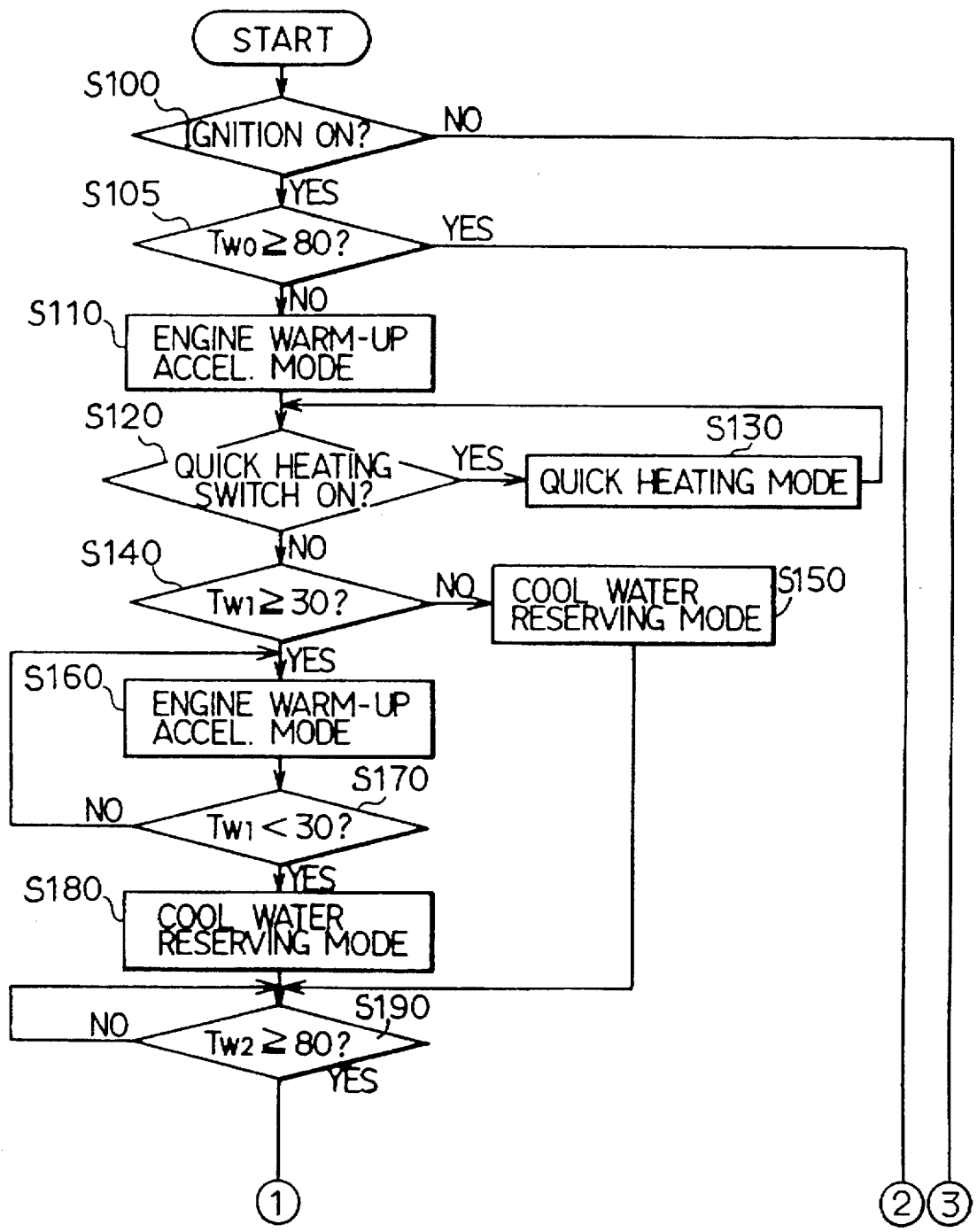
FIG. 24 is a flow chart showing an operation of the switching valve according to each operation mode in the fourth embodiment.
Figure 25:
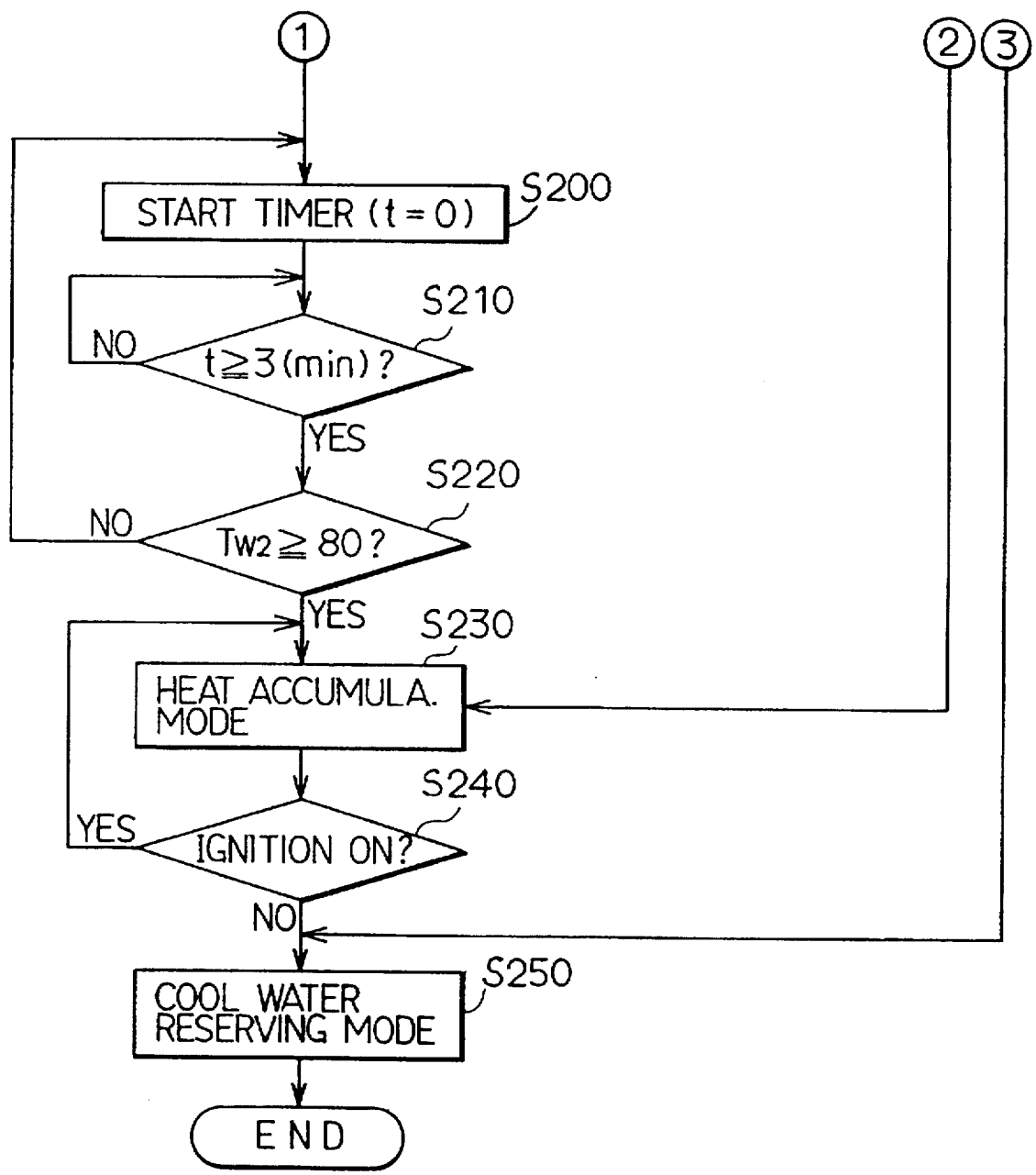
FIG. 25 is another flow chart showing an operation of the switching valve according to each operation mode in the fourth embodiment.

In the flow chart of FIGS. 24 and 25, the temperatures $Tw_0$ and $Tw_1$ are values each indicating a threshold value for determining whether or not the warm-up operation of the engine 1 has been completed (the engine 1 has been warmed up) and are not always limited to 80° C. Therefore, the temperatures $Tw_0$ and $Tw_1$ may be appropriately selected by the type of the engine 1, the portions where the water temperature sensors 19 and 19a are disposed and the like.

Because detecting whether or not the state where the temperature $Tw_2$ of the cooling water is equal to or higher than 80° C. is continued for more than 3 minutes at steps S200 to S220 is a step for determining whether or not the engine 1 has been entirely warmed up, the predetermined time is not limited to 3 minutes but may be appropriately selected while considering the size of the engine 1, total amount of the cooling water, and the like.

Next, features of this embodiment will be described.

According to this embodiment, when the engine 1 is stopped, the warm-up water passage 117 and the tank water passage 106 are closed; and therefore, it is possible to prevent the convection between the cooling water in the other portions (e.g., the pipe connected to the heat-accumulating tank 4) than the heat-accumulating tank 4 and the cooling water in the heat-accumulating tank 4. Therefore, since it is possible to prevent the mixture of the cooling water in the other portions than the heat-accumulating tank 4 and the cooling water in the heat-accumulating tank 4, the heat insulating capacity of the heat-accumulating tank 4 can be improved.

Further, because the valve element 262 of the switching valve 24 for closing the warm-up water passage 117 and the tank water passage 106 is positioned adjacent to the opening passage 45 of the heat-accumulating tank 4, it is possible to certainly prevent the mixture of the cooling water in the other portions than the heat-accumulating tank 4 and the cooling water in the heat-accumulating tank 4. Therefore, it is possible to further improve the heat insulating capacity of the heat-accumulating tank 4.

In the engine warm-up accelerating mode, when the engine 1 starts, the low-temperature cooling water staying in the engine 1 flows into the heat-accumulating tank 4, and the high-temperature cooling water accumulated in the heat-accumulating tank 4 flows into the engine 1. However, if all of the high-temperature cooling water accumulated in the heat-accumulating tank 4 flows out, the low-temperature cooling water flowed out of the engine 1 immediately after the engine 1 starts may circulate into the engine 1, and the temperature of the cooling water in the engine 1 lowers, with the result that the warm-up operation may be delayed.

In contrast, according to this embodiment, because the cooling water having flowed out of the heat-accumulating tank 4 circulates directly into the engine 1 to bypass the heat-accumulating tank 4 when the temperature $Tw_1$ of the cooling water having flowed out of the heat-accumulating tank 4 becomes lower than the first predetermined value, the low-temperature cooling water discharged from the engine 1 immediately after the engine 1 is stopped is reserved in the heat-accumulating tank 4 to prevent the low-temperature cooling water from circulating into the engine 1.

Figure 26:
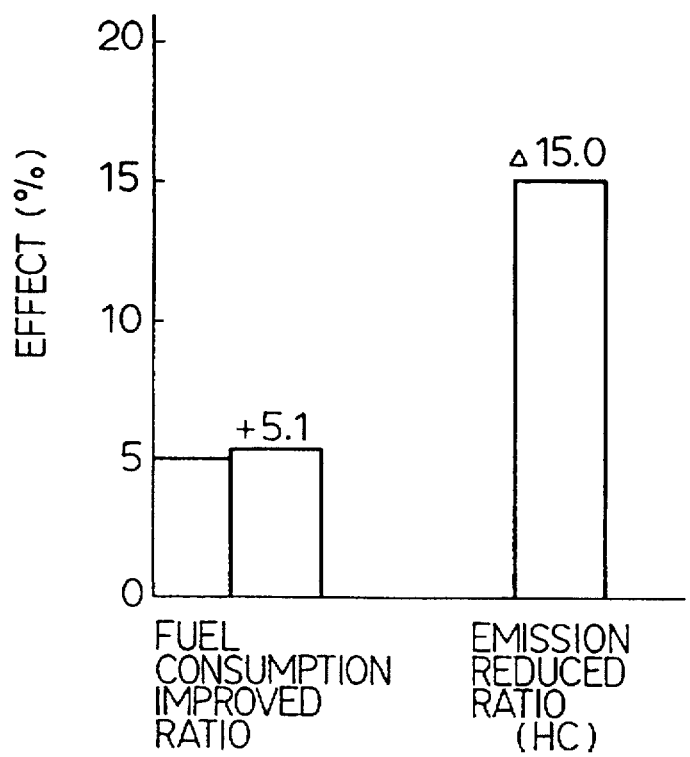
FIG. 26 is a graph of test results showing exhaust gas harmful material reduction effect and fuel consumption improvement effect in the fourth embodiment.

Therefore, since the warm-up operation can be prevented from being delayed, it is possible to reduce an amount of harmful material (exhaust gas emission) to be released to the atmosphere during the warm-up operation and also to improve the fuel consumption. FIG. 26 shows the test search results of the harmful material and the fuel consumption. According to this embodiment, it has been confirmed that the harmful material is reduced by approximately 15% and the fuel consumption is improved by approximately 5.1%.

Further, because the first bypass water passage 101 is closed in the engine warm-up accelerating mode, it is possible to prevent the high temperature cooling water discharged from the engine 1 immediately after the engine 1 starts from flowing into the engine 1. Therefore, it is possible to accelerate the warm-up operation of the engine 1 sufficiently by the high-temperature cooling water accumulated in the heat-accumulating tank 4.

FIG. 27 shows test results for showing the warm-up accelerating effects by the cooling water circuit according to this embodiment. In FIG. 27, the solid line indicates this embodiment, the one-dotted chain line indicates the cooling water circuit of the prior art, and the chain line indicates the normal cooling water circuit without having the heat-accumulating tank 4. As being understood from FIG. 27, according to this embodiment, the temperature of the cooling water can be increased quickly up to an air/fuel feed-back control start temperature in which a feed-back control of an air/fuel ratio of intake air sucked into the engine 1 according to the engine rotational speed, the throttle opening degree, and the like can be performed.

The tests were performed under the conditions that the volume of the exhaust gas was 1600 cc, the temperature of the outside air was 25, and the vehicle running mode is LA#4 (a running mode for measuring the exhaust gas and the fuel consumption, which is employed in U.S.A., Canada, and European countries).

Figure 28:
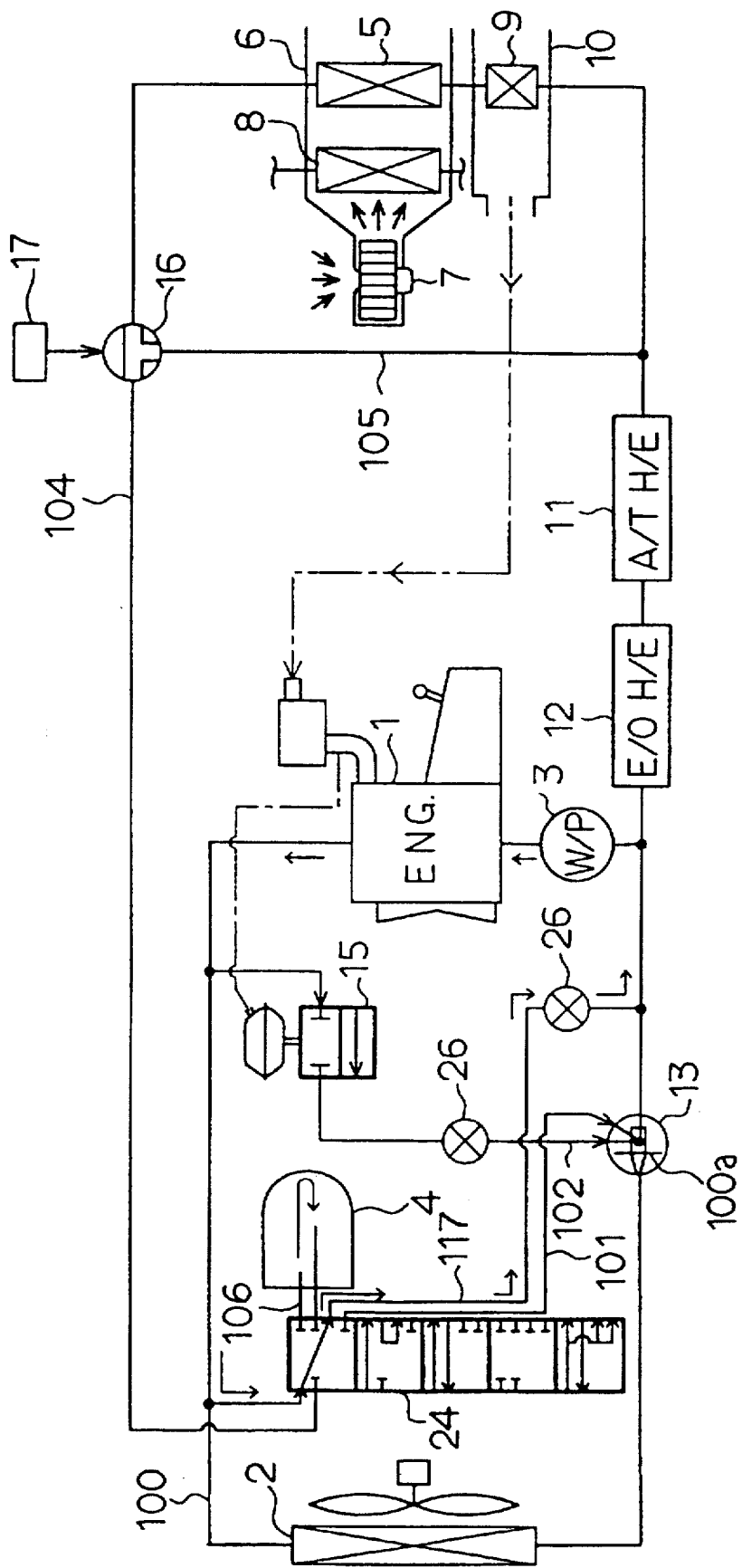
FIG. 28 shows a flow of cooling water in the cooling water circuit in a cool water reserving mode according to a fifth embodiment of the present invention.

A fifth embodiment of the present invention will be described with reference to FIG. 28.

In the fourth embodiment, the cooling water having flowed out of the engine 1 is introduced directly into the engine 1 through the warm-up water passage 117 to bypass the heat-accumulating tank 4; however, in this embodiment, all of the water passages including not only both water passages 101 and 102 but also the warm-up water passage 117, through which the cooling water discharged from the engine 1 to the outside circulates into the engine 1, are closed in the cooling water reserving mode.

More specifically, electromagnetic valves 26 are disposed in the warm-up water passage 117 and the second bypass water passage 102 as valve means for opening and closing each water passage. When the temperature $Tw_1$ of the cooling water becomes lower than the first predetermined temperature, it is regarded that all of the high-temperature cooling water accumulated in the heat-accumulating tank 4 has flowed out, and the electromagnetic valve 26 is closed.

In this way, because the cooling water does not flow out of the engine 1, most of the energy given to the cooling water by the water pump 3 is converted into the heat energy, so that the temperature of the cooling water is increased. Therefore, as compared with when the cooling water circulates between the warm-up water passage 117 and the engine 1, it is possible to further improve the warm-up operation of the engine 1.

Generally, since the water pump 3 of the engine 1 is of the centrifugal type, all of the water passages through which the cooling water discharged from the engine 1 to the outside circulates into the engine 1 may be closed. In this case, a water passage having large water flow resistance may be provided in the engine 1 and the cooling water may circulate in this water passage.

A sixth embodiment of the present invention will be described with reference to FIG. 29 to 35.

Figure 29:
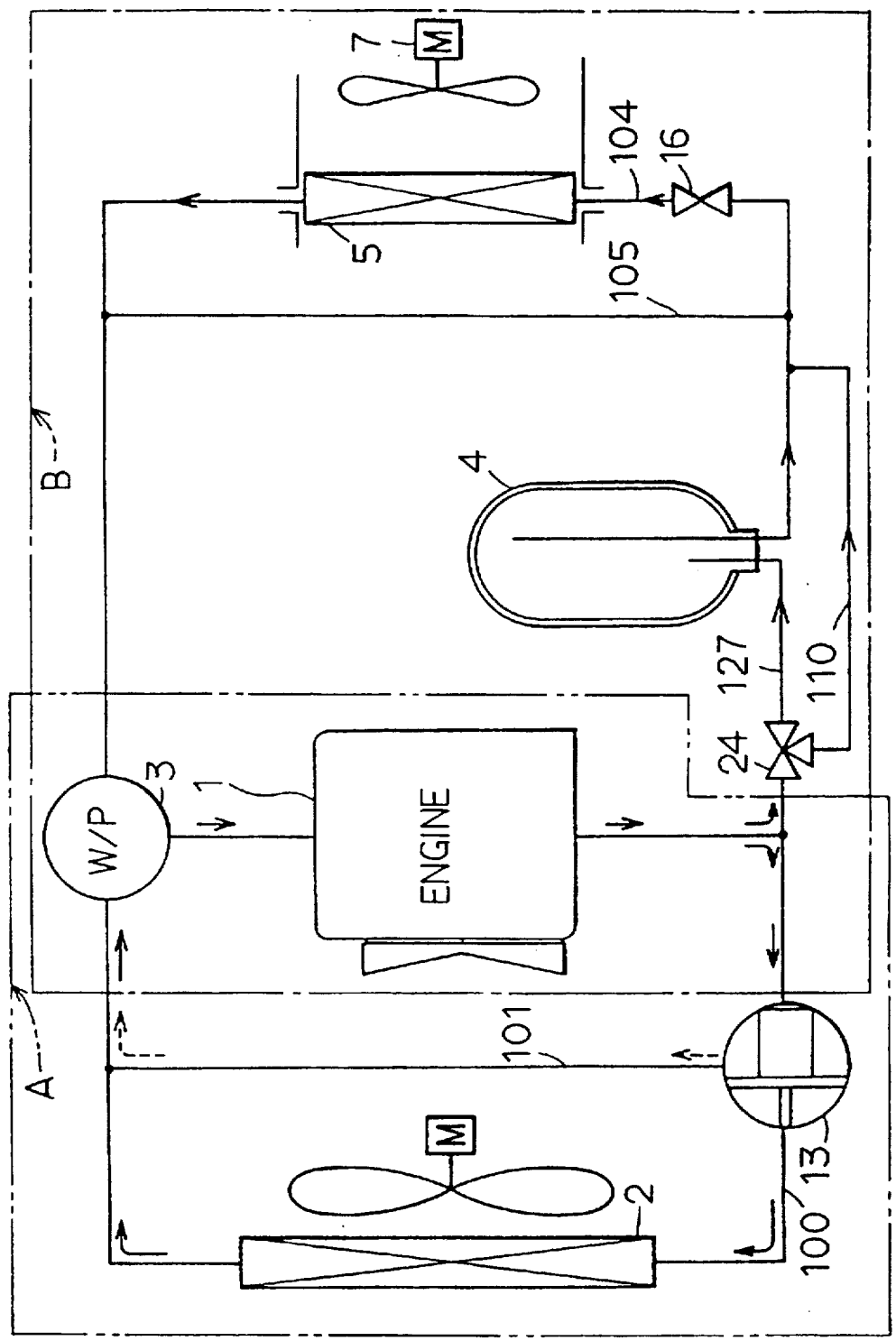
FIG. 29 shows a hot water circuit of a heat-accumulating type heating apparatus for a vehicle and a cooling water circuit of a water-cooled engine according to a sixth embodiment of the present invention.

FIG. 29 shows a cooling water circuit A (the circuit enclosed by a two-dotted chain line) of a water-cooled internal combustion engine (hereinafter referred to as "engine") and a cooling water circuit B of heat accumulating type heating apparatus (the circuit enclosed by an one-dotted chain line).

A water pump 3 is for pumping the cooling water while receiving a driving force from an engine 1 for running the vehicle. A part of the cooling water which has absorbed heat of the engine 1 flows into the cooling water circuit A and the other cooling water flows into the cooling water circuit B of the heat accumulating type heating apparatus for a vehicle.

In the cooling water circuit A of the engine 1, there is disposed a radiator 2 for cooling the cooling water. Further, in the cooling circuit A, there is provided a bypass circuit 101 bypassing the cooling water circuit 100 passing through the radiator 2. These cooling circuits A and B are controlled by a thermostat 13. Generally, when the temperature of the cooling water is higher than 80° C., the cooling water flows into the radiator 2, whereas when the temperature of the cooling water is lower than 80° C., the cooling water flows through the bypass circuit 101.

On the other hand, in the cooling water circuit B of the heat accumulating type heating apparatus for the vehicle, there are provided, on a downstream side of the engine 1 with reference to a flow of the cooling water, a heat-accumulating tank 4, a tank water passage 127 through which the cooling water flows through the heat-accumulating tank 4 and a heater core 5 (described later), and a bypass water passage 101 bypassing the heat-accumulating tank 4. On an upstream side of the heat-accumulating tank 4, at a branch portion between the tank water passage 127 and the bypass water passage 101, there is provided a control valve 24 for controlling each amount of the cooling water flowing into both passages 127 and 101 (for controlling each communication state of both passages 127 and 101). Structures of the heat-accumulating tank 4 and the control valve 24 will be described later.

On an upstream side of the heat-accumulating tank 4, there is provided a heater core 5 for heating air therethrough. On an upstream side of the heater core 5, there is provided a blower 7 for blowing air into a passenger compartment. The air blown by the blower 7 is heated in the heater core 5 and is blown out into the passenger compartment through a duct (not shown). On the cooling inflow side of the heater core 5, there is provided an electromagnetic valve 16 for opening and closing the cooling water circuit 104 through which the cooling water flows into the heater core 5. A control unit 18 (described later) controls the electromagnetic valve 16 to close the cooling water circuit 104 when the heating operation is not performed, such as in summer season, so that heat radiation from the heater core 5 can be suppressed.

On an upstream side of the electromagnetic valve 16, there is provided a bypass circuit 105 bypassing the cooling circuit 104 passing through the heater core 5. Each downstream side of the cooling water circuit 104 and the bypass circuit 105 is connected to the water pump 3 to form the cooling water circuit B of the heat accumulating type heating apparatus for a vehicle.

Figure 30:
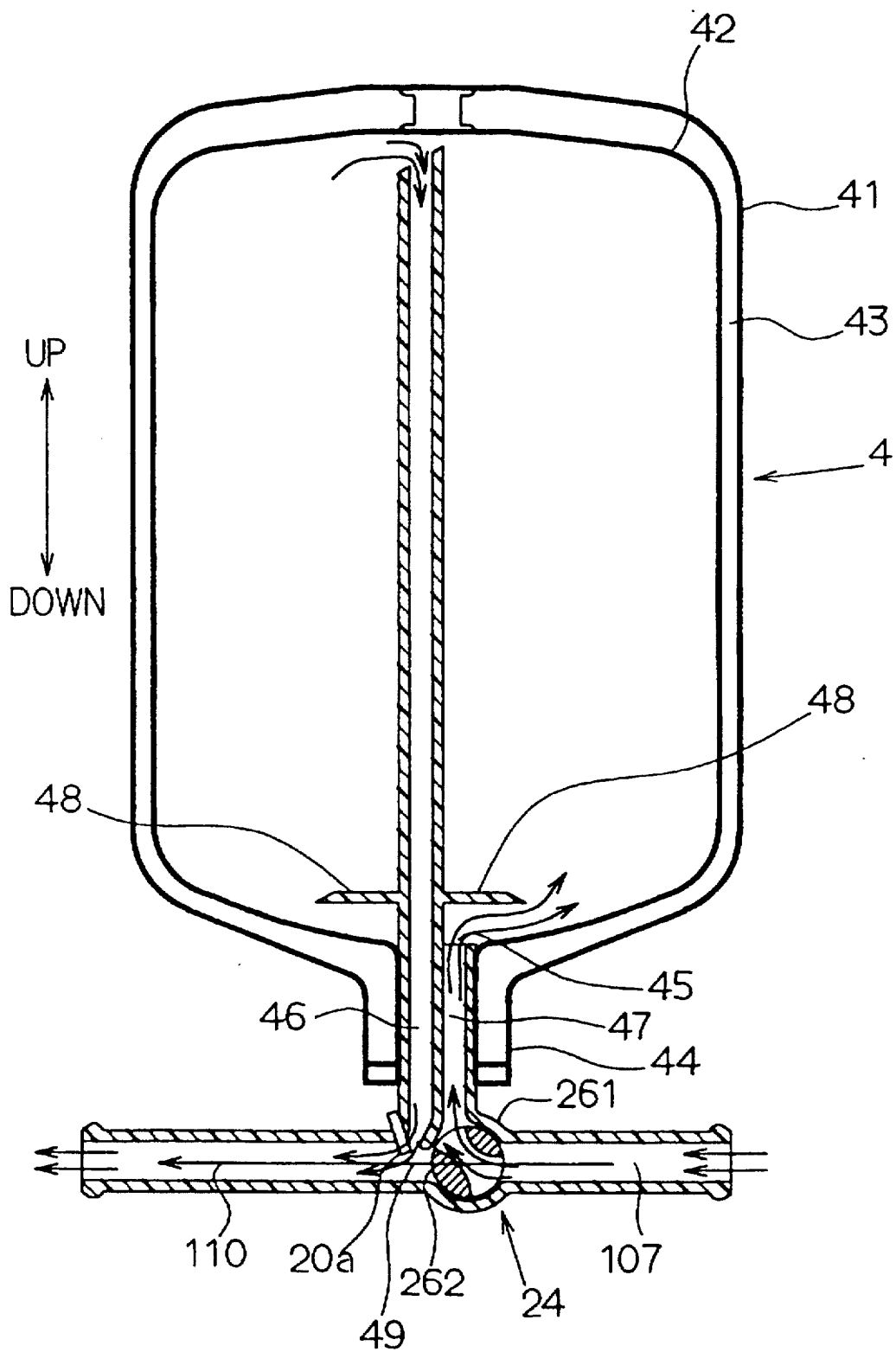
FIG. 30 is a cross sectional view showing a heat-accumulating tank and a control valve in the sixth embodiment.

The heat-accumulating tank 4 has, as shown in FIG. 30° C., a double tank structure composed of an outside tank 41 and an inside tank 42, each of which is made of stainless. Between both tanks 41 and 42, there is formed a heat insulating layer 43 having substantially vacuum to improve heat insulating performance.

Through a tank opening 45, the cooling water flows in and out. The tank opening 45 is formed in a tubular protruding portion 44 protruding in the gravitational direction and is opens downwardly in the gravitational direction. Into the tubular protruding portion 44, a part of a housing 261 of the control valve 24 is inserted. A cooling water inflow passage 47 through which the cooling water flows into the heat-accumulating tank 4 and a cooling water outflow passage 46 through which the cooling water flows out of the heat-accumulating tank 4 are formed by the part of the housing 261.

The cooling water inflow passage 47 communicates with the inside of the heat-accumulating tank 4 at a lower portion of the heat-accumulating tank 4 in the gravitational direction. The cooling water outflow passage 46 communicates with the inside of the heat-accumulating tank 4 at an upper portion of the heat-accumulating tank 4 in the gravitational direction. A mixture preventing plate 48 is for preventing a convection of the cooling water in the heat-accumulating tank 4.

A bypass water passage 110 is formed in the housing 261. At a branch portion between the bypass water passage 101 and the cooling water inflow passage 47, there is provided a valve element 262 of the control valve 24. The valve element 262 is of a rotary type, which is actuated by an actuator 25 such as a servomotor. The actuator 25 is controlled by the control unit 18 based on the temperature of the cooling water, detected by a water temperature sensor 20a disposed at a joining portion 49 of the cooling water outflow passage 46 and the bypass water passage 110 (see FIG. 31).

Figure 31:
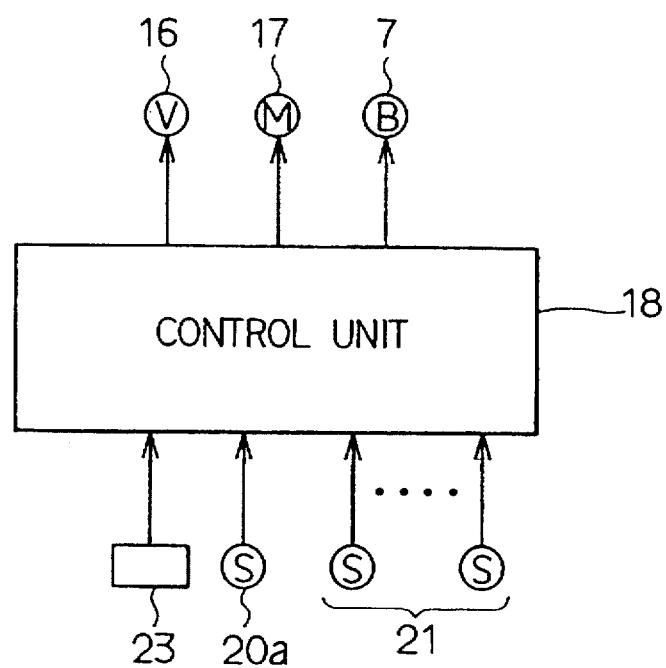
FIG. 31 is a block diagram of a control system of the control valve in the sixth embodiment.

To the control unit 18, as shown in FIG. 31, there are input signals from a water temperature sensor 20a for detecting a temperature of the cooling water flowing into the heater core 5, and an air conditioning sensor 21 for detecting information required for controlling the air conditioning apparatus, which includes an outside air temperature for detecting a temperature of the air outside the passenger compartment, an inside air temperature for detecting a temperature of the air in the passenger compartment. The control unit 18 controls the actuator 17, the air conditioning means such as the blower 7, and the electromagnetic valve 16 according to a program pre-stored based on the above-described signals.

A quick heating switch 23 is for instructing a heating operation in which high-temperature cooling water in the heat-accumulating tank 4 is introduced into the heater core 5 when the temperature of the cooling water is too low to perform a heating operation, such as at the time of just starting the engine. The quick heating switch 23 is turned on by a manual operation of the passenger.

Figure 32:
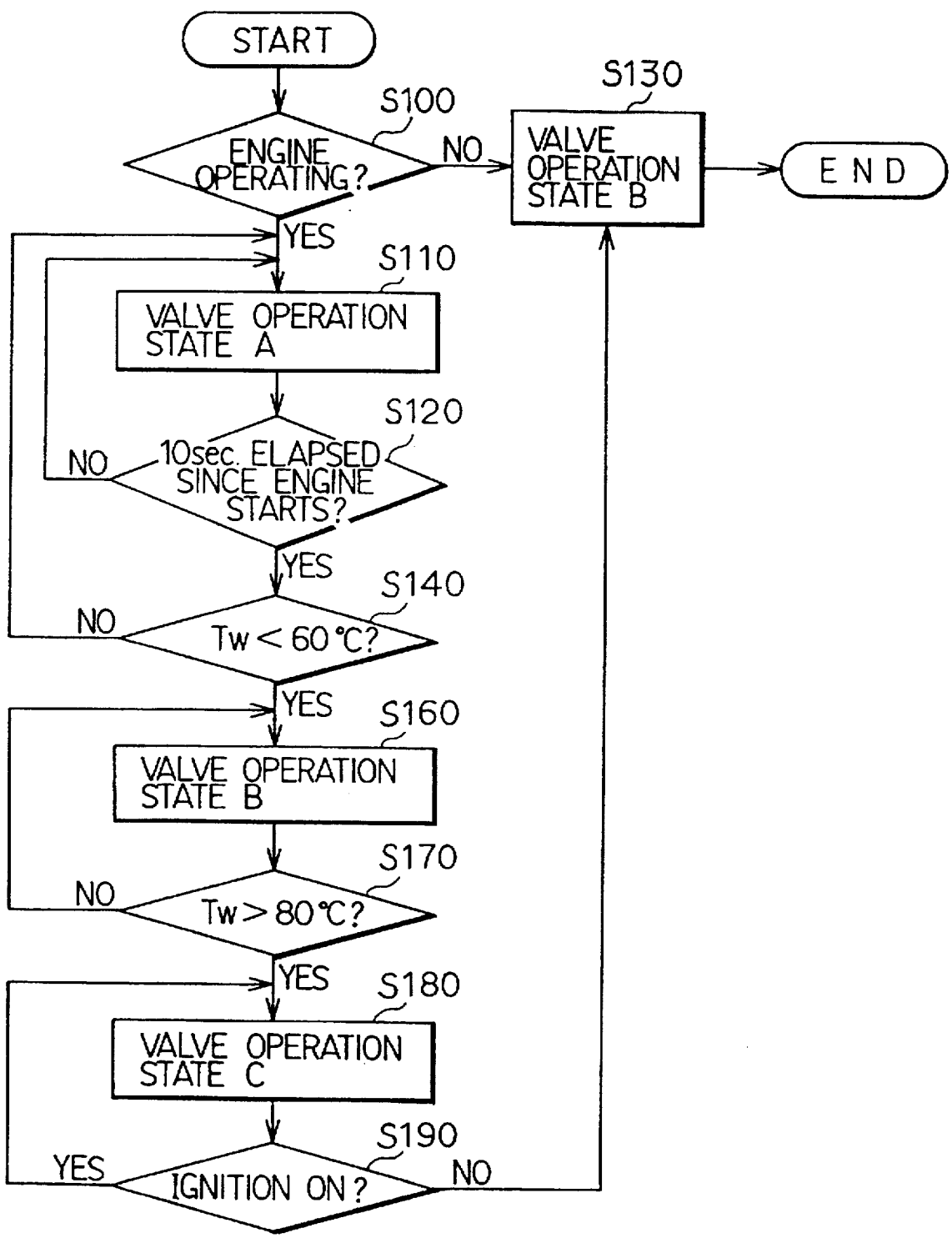
FIG. 32 is a flow chart showing an operation of the control valve in the sixth embodiment.

Next, the operation of the control valve 24 will be described with reference to the flow chart shown in FIG. 32.

It is determined whether or not the engine 1 is operating by a state of an ignition switch (not shown) or a rotational speed of the engine 1 at step S100. When the engine 1 is operating, the cooling water inflow passage 47 is opened and the bypass water passage 110 is closed, for a predetermined time t (10 seconds in this embodiment) after the engine starts at steps S10 and S120.

At this time, as long as the quick heating switch 23 is not turned on, the electromagnetic valve 16 is closed. In this way, the high-temperature cooling water having flowed out of the heat-accumulating tank 4 circulates into the engine 3 through the bypass circuit 105 to accelerate the warm-up operation of the engine 1.

On the other hand, while the engine 1 is stopped, the cooling water inflow passage 47 is maintained closed and the bypass water passage 101 is maintained opened at step S130.

After the predetermined time t has elapsed, it is determined whether or not the temperature Tw of the cooling water, detected by the water temperature sensor 20a, is lower than 60° C. at step S140. When the temperature Tw of the cooling water is higher than 60° C., it is regarded that the high-temperature cooling water accumulated in the heat-accumulating tank 4 remains in the heat-accumulating tank 4, the cooling water inflow passage 47 is maintained opened and the bypass water passage 101 is maintained closed at step S110. Therefore, the cooling water circulates between the heat-accumulating tank 4 and the engine 3.

When the temperature Tw of the cooling water becomes lower than 60, it is regarded that all of the high-temperature cooling water accumulated in the heat-accumulating tank 4 has flowed out of the heat-accumulating tank 4, the cooling water inflow passage 47 is closed and the bypass water passage 101 is opened at step S160.

While the cooling water inflow passage 47 is closed and the bypass water passage 110 is opened, the water temperature sensor 20a can detects the temperature of the cooling water flowing through the bypass water passage 110, i.e., the cooling water flowing out of the engine 1.

Until the temperature Tw of the cooling water becomes higher than 80° C. i.e., until it can be regarded that the warm-up operation has been finished, the cooling water inflow passage 47 is closed and the bypass water passage 110 is maintained opened at step S170.

Next, when the temperature Tw of the cooling water becomes higher than 80° C. and the warm-up operation has been finished, until the engine 1 is stopped, the cooling water inflow passage 47 and the bypass water passage 101 are opened to introduce the high-temperature cooling water flowing out of the engine 1 into the heat-accumulating tank 4.

Figure 33:
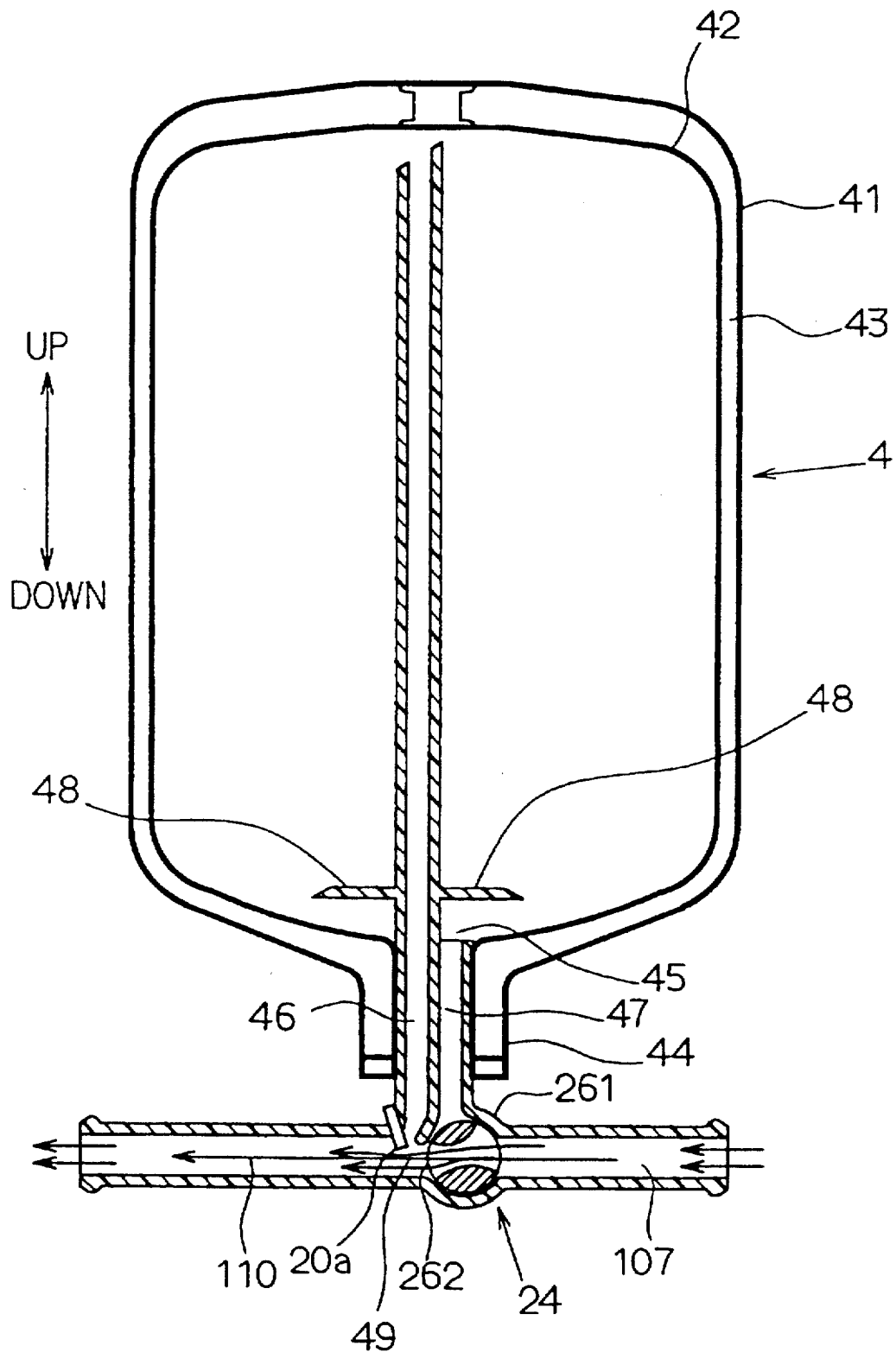
FIG. 33 is a cross sectional view in a valve operation state B in the sixth embodiment.
Figure 34:
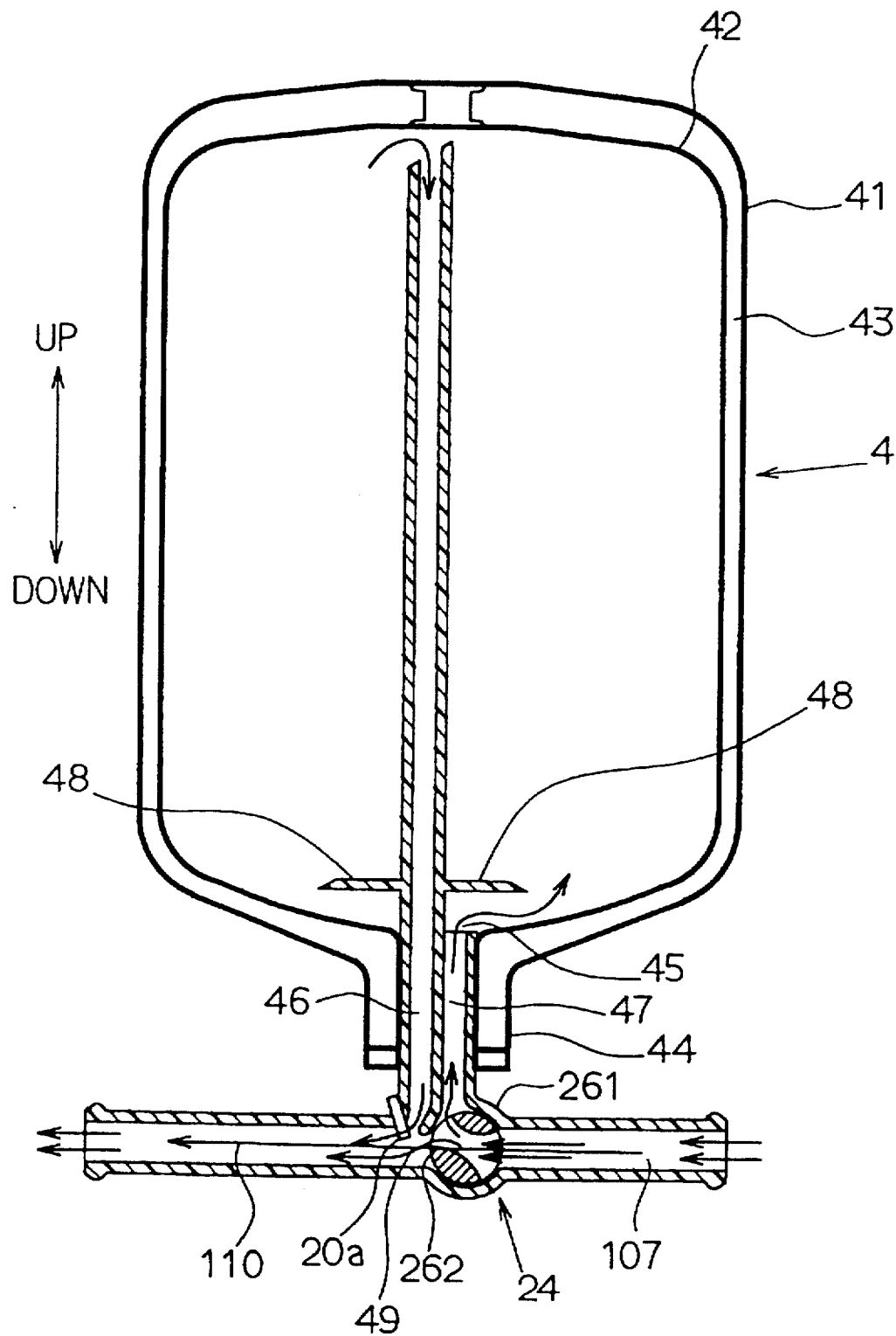
FIG. 34 is a cross sectional view in a valve operation state C in the sixth embodiment.

FIG. 30 shows a valve operation state A in which the cooling water inflow passage 47 is opened and the bypass water passage 110 is closed. FIG. 33 shows a valve operation state B in which the cooling water inflow passage 47 is closed and the bypass water passage 110 is opened. FIG. 34 shows a valve operation state C in which the cooling water inflow passage 47 and the bypass water passage 101 are opened. Further, the operating states of the control valve 24 are shown in the following Table 1.

TABLE 1

| TIMING | TEMP. OF WATER FROM ENGINE 1 | TEMP. OF WATER FROM TANK 4 | VALVE OPERATION STATE |
| --- | --- | --- | --- |
| BEFORE ENGINE 1 STARTS | LOW | LOW | A or B |
| AFTER ENGINE 1 STARTS | LOW | HIGH | A |
| ALL WATER HAS FLOWED FROM TANK 4 | LOW - MIDDLE | LOW | B |
| WHEN WARM-UP IS FINISHED | HIGH | HIGH | C |

Feature of this embodiment will be described.

According to this embodiment, during the warm-up operation of the engine 1, the high-temperature cooling water circulates into the engine 3, so that the warm-up operation can be accelerated. Therefore, it is possible to reduce the harmful material discharged with the exhaust gas and to improve the fuel consumption.

Further, during the warm-up operation of the engine 1, when the temperature of the cooling water flowing out of the heat-accumulating tank 4 becomes lower than the predetermined temperature (60° C.), it is regarded that all of the high-temperature cooling water accumulated in the heat-accumulating tank 4 has flowed out, the cooling water inflow passage 47 is closed and the bypass water passage 110 is opened. Therefore, of the cooling water flowing out of the engine, the low-temperature cooling water immediately after the engine starts can be reserved temporarily. Therefore, it is possible to prevent the low-temperature cooling water immediately after the engine 1 starts from circulating in the engine 1, with the result that the warm-up operation can be further improved.

Figure 35:
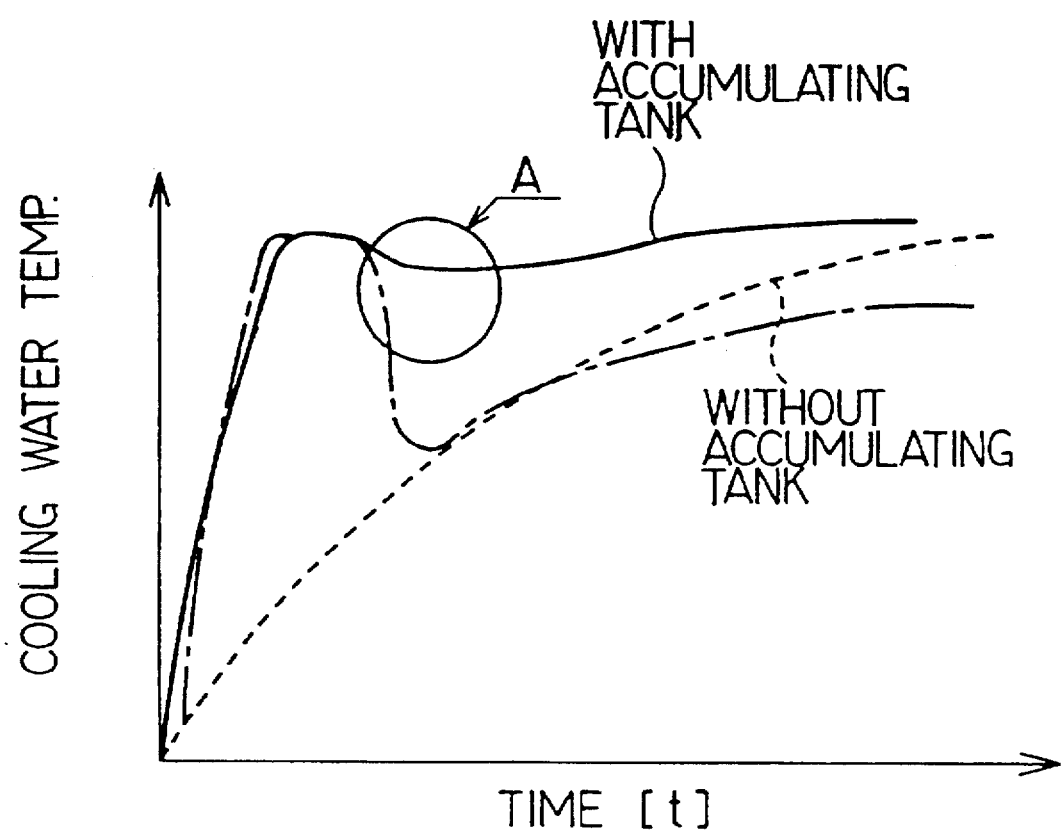
FIG. 35 is a graph showing a relationship between a temperature of the cooling water having flowed out of the engine and time in the sixth embodiment.
Figure 36:
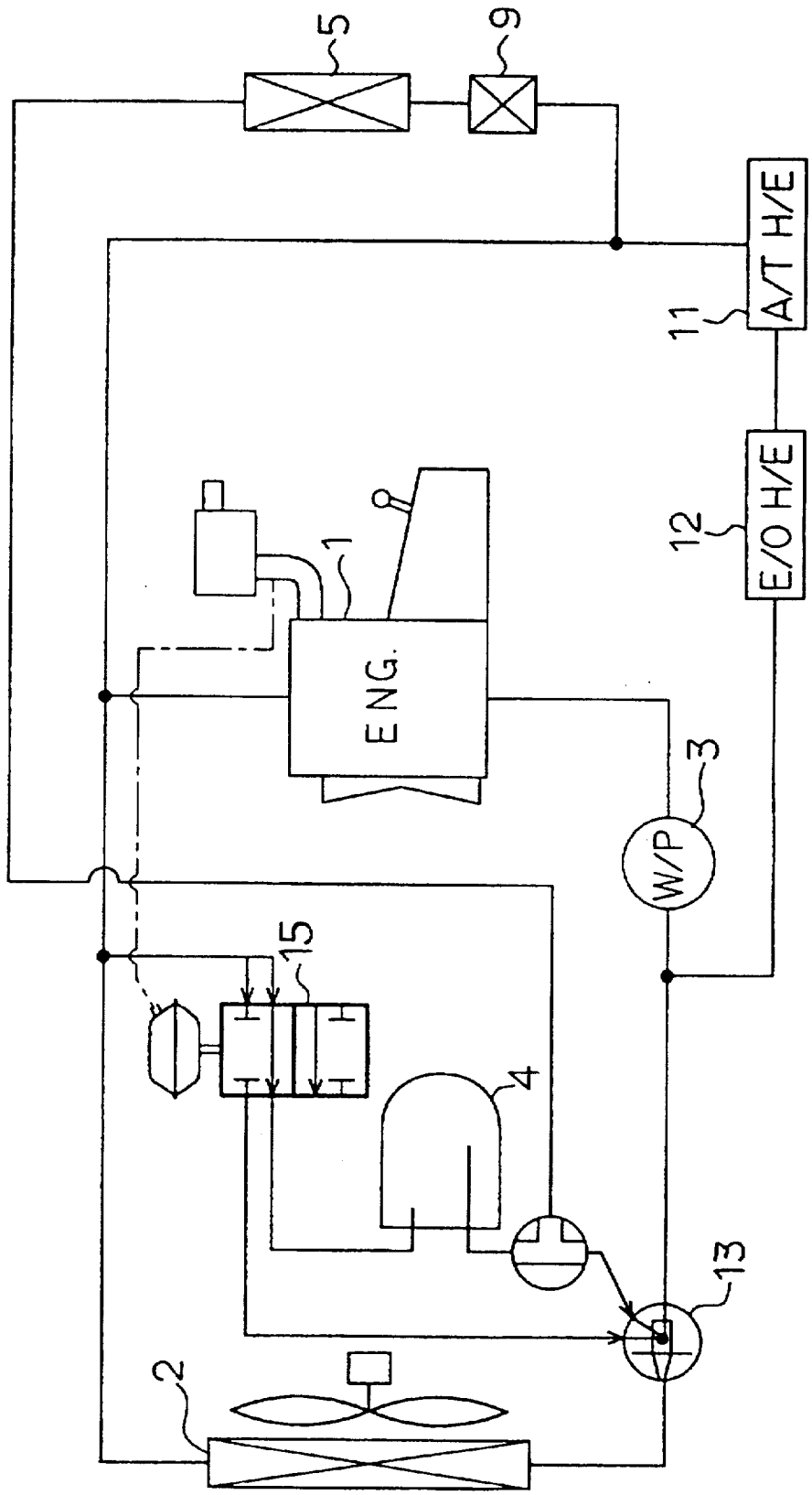
FIG. 36 shows a modification of the cooling water circuit.
Figure 37:
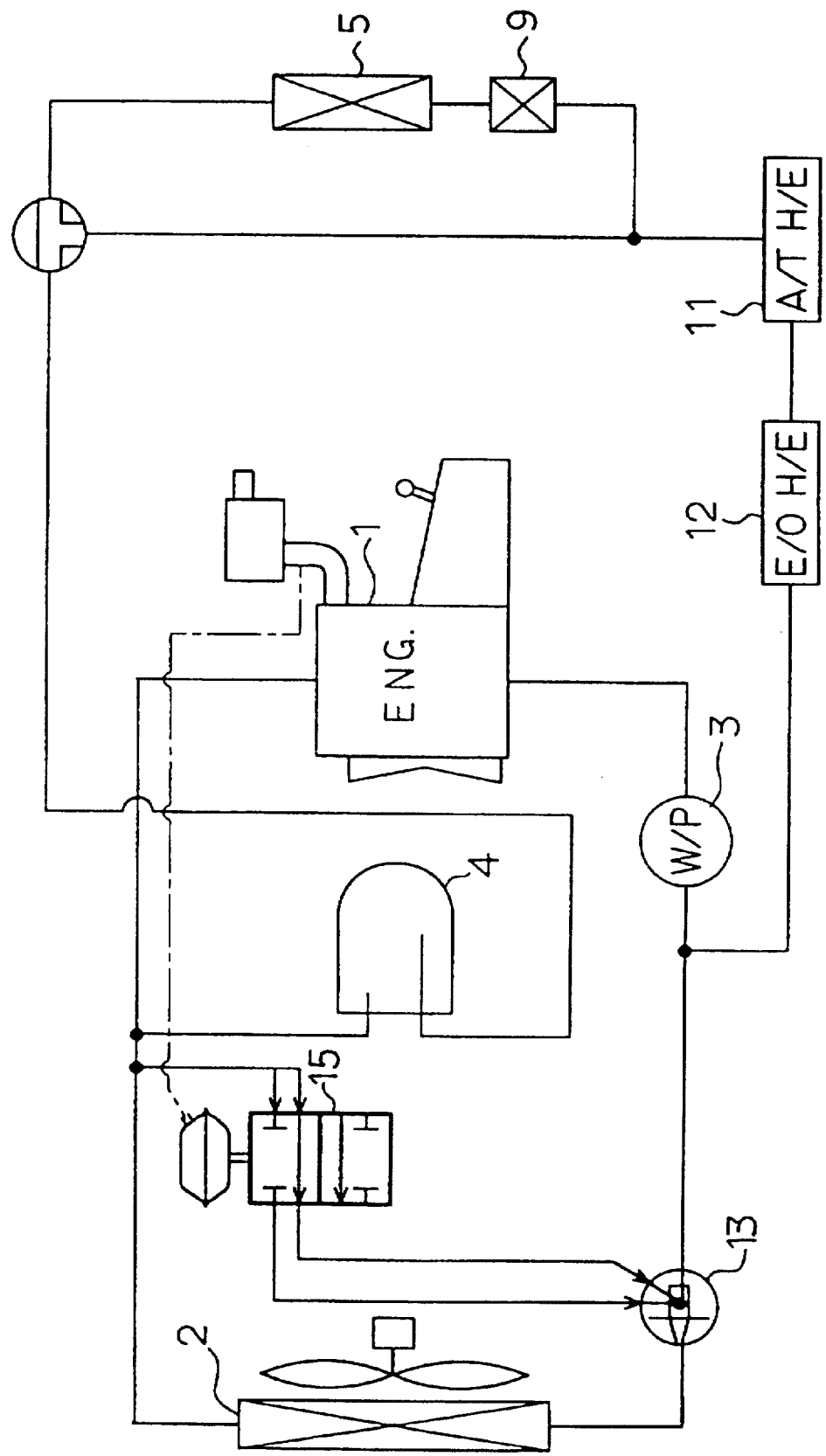
FIG. 37 shows another modification of the cooling water circuit.
Figure 38:
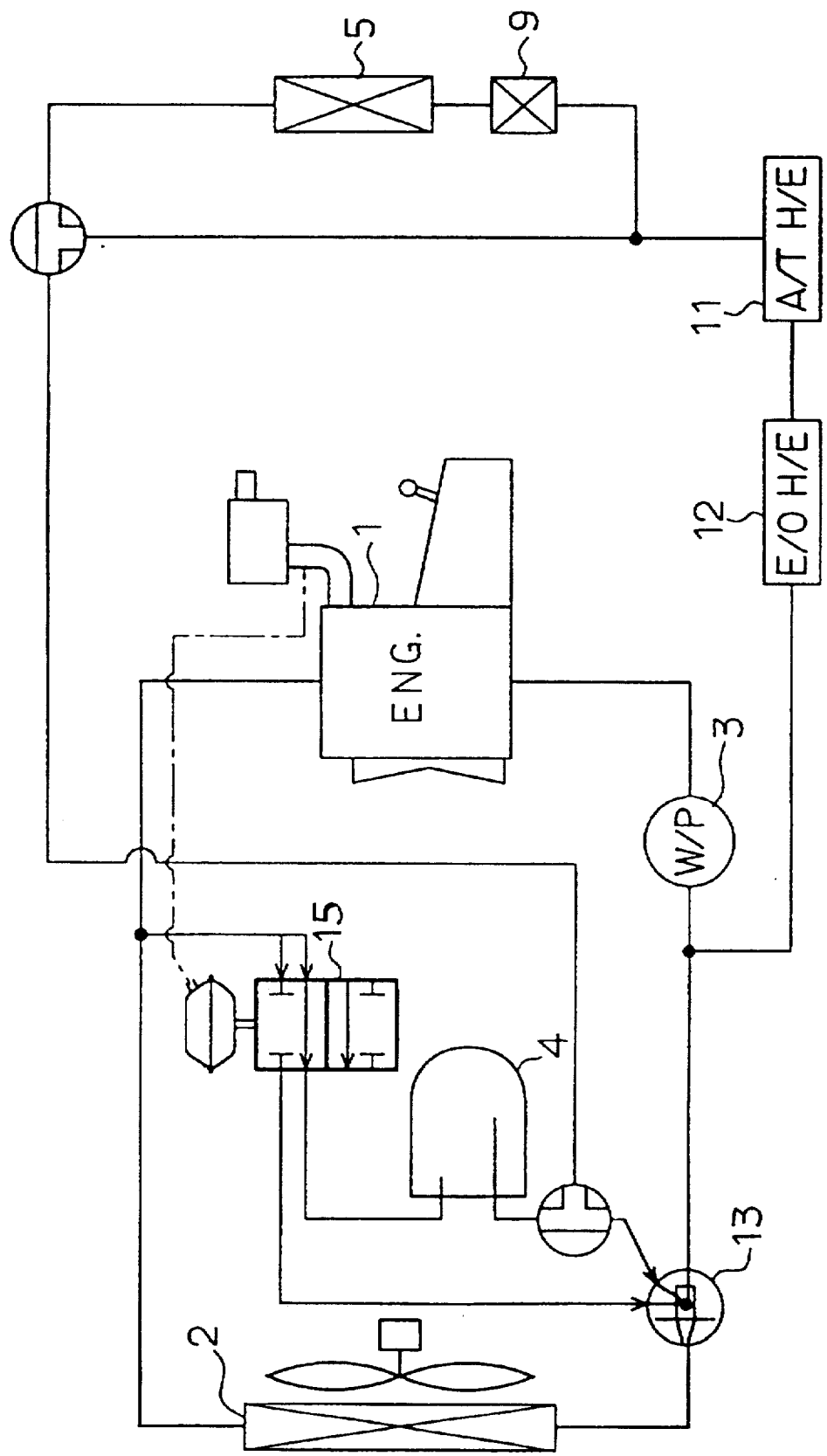
FIG. 38 shows another modification of the cooling water circuit.
Figure 39:
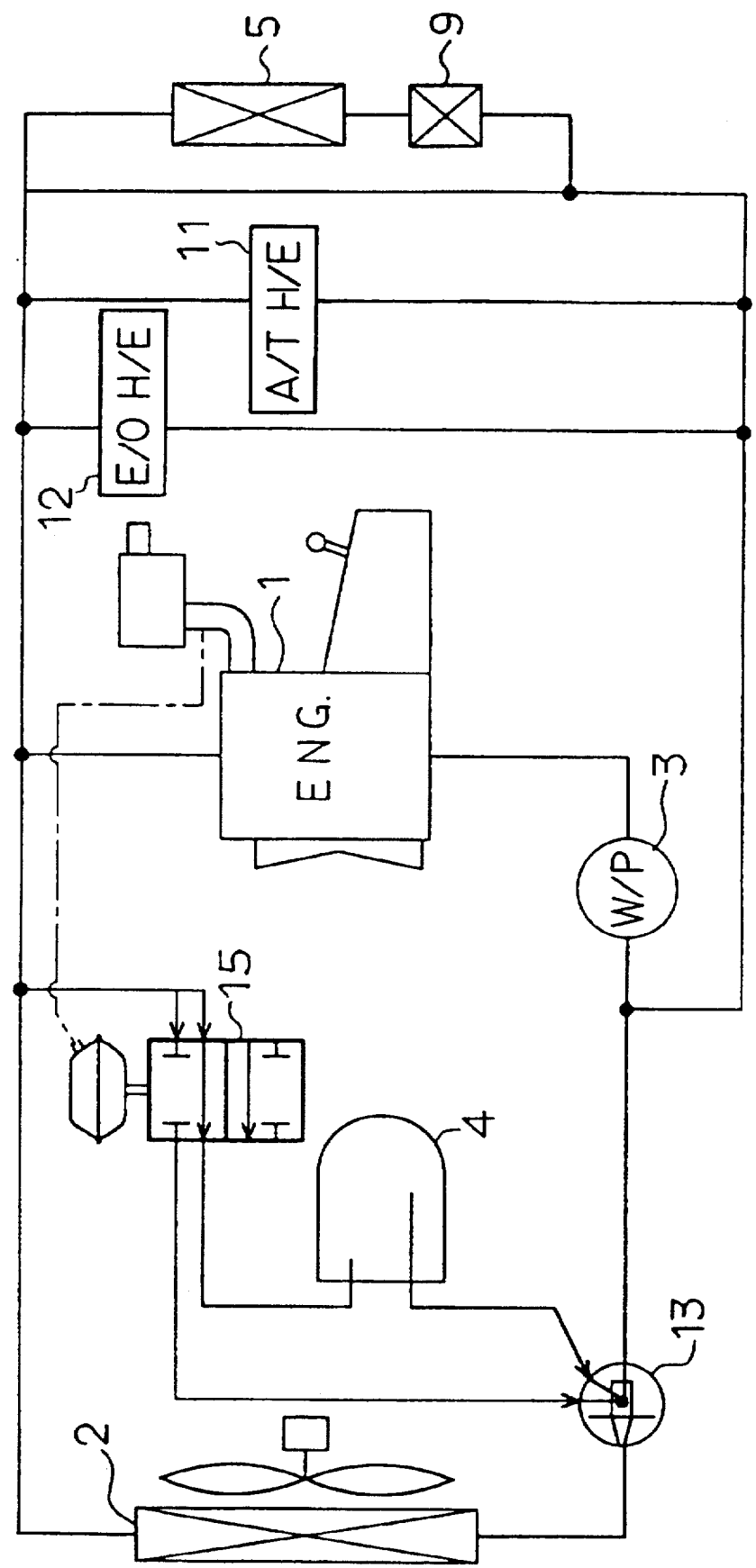
FIG. 39 shows another modification of the cooling water circuit.

FIG. 35 is a graph showing a relationship between a temperature of the cooling water having just flowed out of the engine 1 and an elapsed time t after the engine 1 starts (t=0). In FIG. 35, the chain line shows the cooling water circuit system without having the heat-accumulating tank 4, the one-dotted line shows the conventional cooling water circuit system having the heat-accumulating tank 4, and the solid line shows the cooling water circuit system according to this embodiment. As being obvious therefrom, in the cooling water circuit system according to this embodiment, the low-temperature cooling water immediately after the engine 1 starts is prevented from circulating in the engine 1; and therefore, the decrease (the portion of "A") in the temperature of the cooling water after all of the high-temperature cooling water in the heat-accumulating tank 4 has flowed out is suppressed.

The above-described tests were performed under the conditions that the volume of the exhaust gas was 1600 cc, the volume of the heat-accumulating tank 4 is 3000 cc, the amount of the cooling water in the engine 1 is approximately 1500 cc, and the amount of the cooling water in the radiator and pipes is approximately 2000 cc.

According to this embodiment, since the opening portion 45 of the heat-accumulating tank 4 is formed on the lower side in the gravitational direction, the distance between the opening portion 45 and the upper side portion of the heat-accumulating tank 4 in the gravitational direction, where the high-temperature cooling water is stored, becomes large as compared with the opening portion 45 is formed on the upper side in the gravitational direction. That is, the distance between the opening portion 45 where the heat accumulated in the heat-accumulating tank 4 can be radiated easily and the portion where the high-temperature cooling water is stored becomes large; and therefore, the heat-insulating capacity of the heat-accumulating tank 4 can be improved.

As described above, according to this embodiment, the heat insulating capacity of the heat-accumulating tank 4 can be improved, and the warm-up operation can be accelerated sufficiently.

In the above-described embodiment, while the engine 1 is stopped, the cooling water inflow passage 47 (the tank water passage 127) is closed; however, the cooling water inflow passage 47 may be opened and the bypass water passage 110 may be closed while the engine 1 is stopped.

In the above-described embodiment, there are provided the steps S100 and S190 for determining whether or not the engine 1 is operating; however, there may be performed an interruption control of a subroutine for closing the cooling water inflow passage 47 (the tank water passage 127) every a predetermined time (e.g., 3 seconds).

In the above-described embodiment according to the present invention, during the warm-up operation of the engine 1, when the temperature of the cooling water flowing out of the heat-accumulating tank 4 exceeds 60, the cooling water inflow passage 47 (the tank water passage 127) is opened, whereas when the temperature of the cooling water flowing out of the heat-accumulating tank 4 is equal to or lower than 60, the cooling water inflow passage 47 (the tank water passage 107) is closed; and therefore, the present invention may be employed in each of cooling water circuits shown in FIGS. 36 to 39.

In FIGS. 36 to 39, an intake air heat exchanger 9 is for performing heat-exchange between air sucked into the engine 1 and cooling water and is disposed in a surge tank 10. An A/T heat exchanger 11 is for performing heat-exchange between the cooling water having flowed out of the engine 1 and mission oil of an automatic transmission for a vehicle. An E/O heat exchanger 12 is for performing heat-exchange between the cooling water having flowed out of the engine and the engine oil. A load sensing valve 15 is for switching cooling water circuits according to a load of the engine 1.

Figure 40:
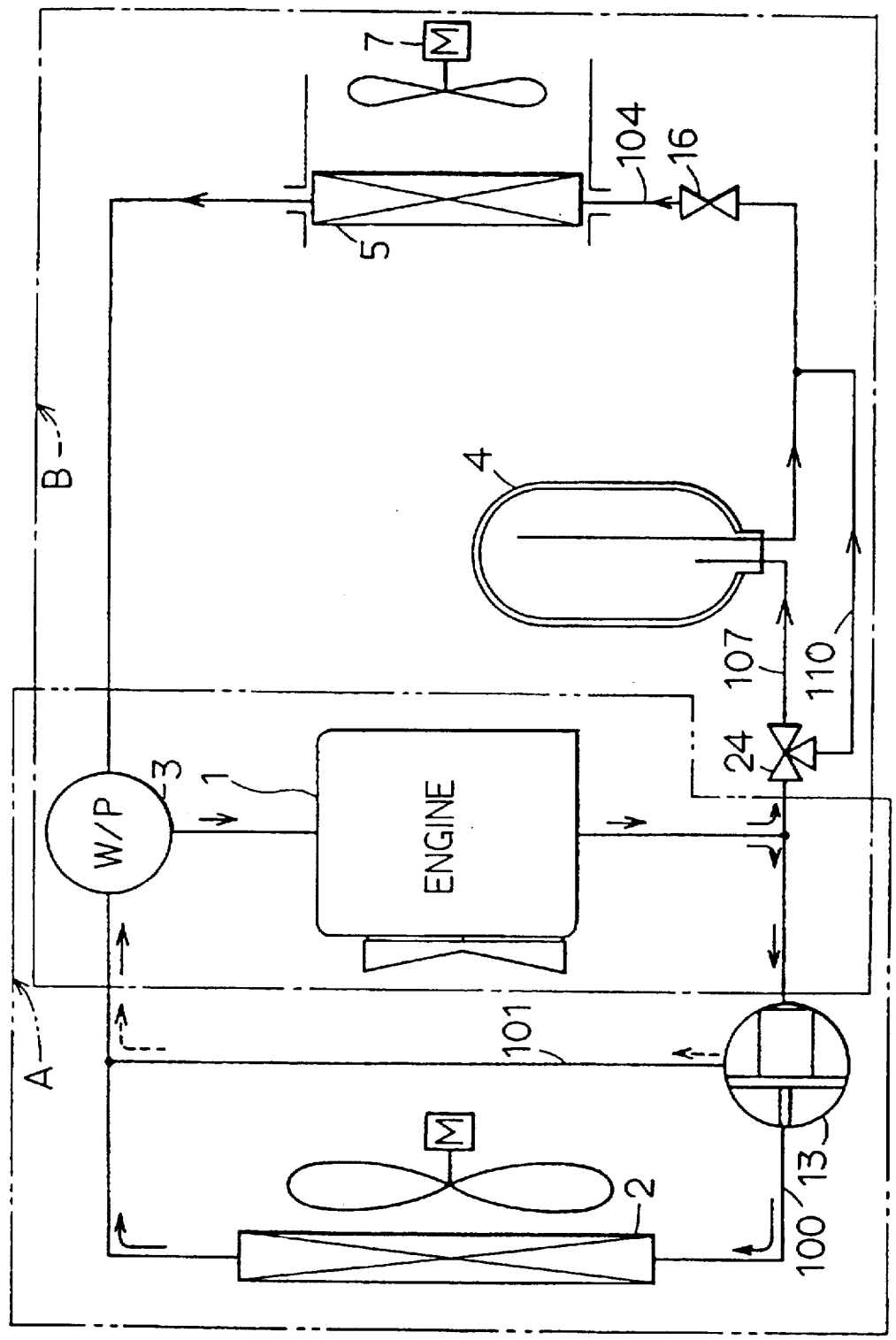
FIG. 40 shows a cooling water circuit in which the bypass circuit is omitted.

Further, as shown In FIG. 40, when the bypass circuit 105 is omitted, the electromagnetic valve 16 may be opened and the blower 7 may be stopped until the warm-up operation of the engine 1 is finished.

In the above-described embodiment, the temperature Tw of the cooling water, being equal to 60, is employed as the determination condition of step S140; however, it is not limited to 60 but may be appropriately determined while considering a size of the engine, a volume of the heat-accumulating tank, a temperature of the cylinder when the a mixture ratio of the intake air changes from the thick state to the normal state or a temperature of the cooling water, and the like.

In the above-described sixth embodiment, the water temperature sensor 20a is disposed in the cooling water outflow passage 46, and when the temperature of the cooling water, detected by the water temperature sensor 20a, is equal to or higher than the predetermined temperature (60° C.), it is determined that the cooling water, a temperature of which is equal to or higher than the predetermined temperature, is remained in the heat-accumulating tank 4; however, the water temperature sensor 20a may be disposed in the heat-accumulating tank 4 to perform the same determination.

A seventh embodiment of the present invention will be described with reference to FIGS. 41 to 44.

In FIGS. 41 to 44, the parts and components similar to those in first embodiment are shown by the identical reference numerals.

A radiator 2 is for performing heat-exchange between air blown by a cooling fan 2a and the cooling water to cool the cooling water.

A first flow control valve 24 is for opening and closing a heater water passage 104 communicating with a heater core 5 and a heater bypass water passage 105 bypassing the heater core 5.

A second flow control valve 16 is for opening and closing an intake air heat exchanger water passage 120, which communicates with an intake air heat exchanger 9, and an oil heat exchanger water passage 111, which communicates with a first oil heat exchanger 12 for performing heat exchange between engine oil circulating in the engine 1 and the cooling water and a second oil heat exchanger 11 for performing heat-exchange between hydraulic oil (A/T oil) of an automatic transmission of the vehicle and the cooling water.

The intake air heat exchanger water passage 120 joins to the oil heat exchanger water passage 111 at the downstream side of the intake air heat exchanger 9 with reference to the flow of the cooling water (At the "A" point in FIG. 41) in such a manner that both of the cooling water having been heat-exchanged in the intake air heat exchanger 9 and the cooling water having passed through the oil heat exchanger water passage 111 into both oil heat exchangers 12 and 11.

Figure 42:
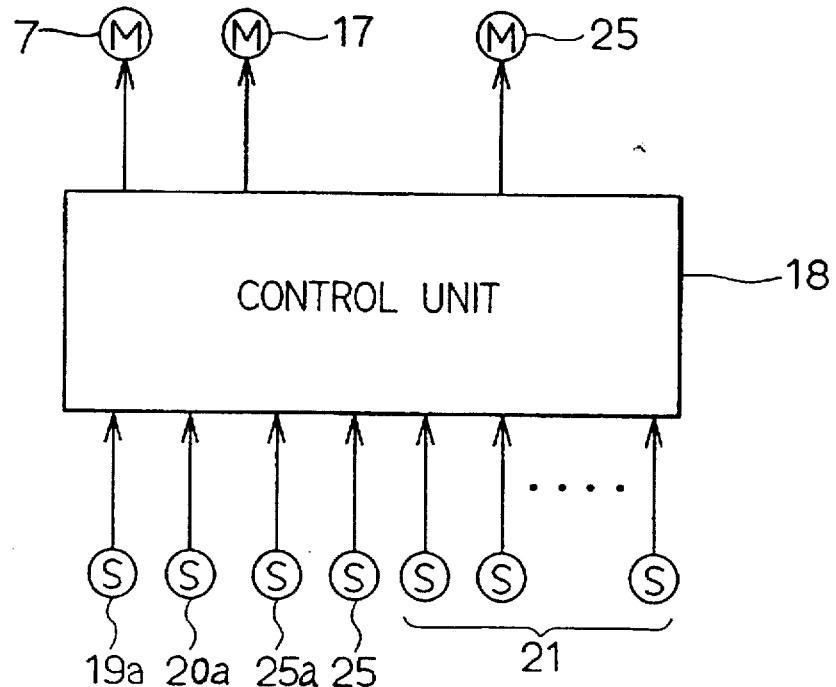
FIG. 42 is a block diagram showing a control system of the cooling apparatus in the seventh embodiment.

The first and second flow control valves 24 and 16 are actuated by actuators 25 and 17 such as servomotors, respectively. As shown in FIG. 42, the actuators 25 and 17 are controlled by a control unit 18. To the control unit 18, there are input each signal from a water temperature sensor 20a disposed between an inlet side of the first flow control valve 24 and an outlet side of the heat-accumulating tank 4, for detecting a temperature of the cooling water, an intake air temperature sensor 25 disposed in the surge tank (not shown) of the engine 1, for detecting a temperature of the intake air, a pressure sensor 25a for detecting an intake negative pressure of the engine 1, a water temperature sensor 19a for detecting a temperature of the cooling water having just flowed out of the engine 1, and an air conditioning sensor 21 including an inside air temperature sensor for detecting a temperature in the passenger compartment, an outside air temperature sensor for detecting a temperature of the air outside the passenger compartment, a sunlight sensor for detecting an amount of the sunlight, an evaporator temperature sensor for detecting a temperature of the evaporator, and the like.

The control unit 18 automatically controls an operation of air-conditioning equipment including an inside air/outside air switching door (not shown), an air outlet switching door (not shown), the blower 7, and the like, based on a pre-stored program.

Figure 45:
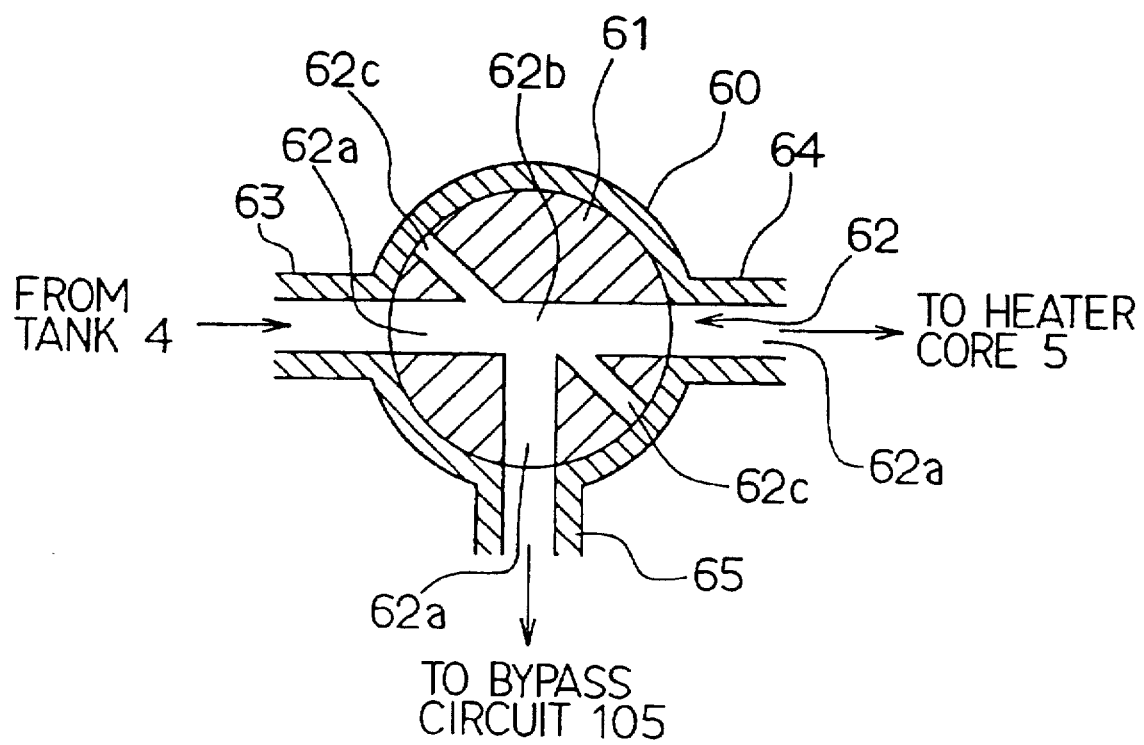
FIG. 45 shows the second flow control valve specifically in the seventh embodiment.

The above-described first flow control valve 24 will be described in detail. FIG. 45 shows a structure of the first flow control valve 24 specifically. In FIG. 45, a columnar valve element 61 made of resin is rotatably disposed in a valve housing 60 made of resin. In the columnar valve element (rotor) 61, there is formed a control passage 62 for controlling a flow amount. The valve housing 60 is integrally formed with an inlet pipe 63 into which the cooling water from the heat-accumulating tank 4 flows, a first outlet pipe 64 connected to an inlet side of the heater core 5, and a second outlet pipe 65 connected to an inlet side of the bypass circuit 105.

The control passage 62 adjusts an opening area of the inlet pipe 63 at one end side and adjusts each opening area of the first outlet pipe 64 and the second outlet pipe 65 at the other end side. The first flow control valve 24 is of the five-way valve type in which a T-shaped passage 62a and an orifice passage having extremely small cross section in flow passage thereof cross at a joining portion 62b of the T-shaped passage 62a. As shown in FIG. 45, a flow area in the orifice passage 62c is smaller than that of the T-shaped passage 62a.

At both end portions of the columnar valve element (rotor) in the axial direction, there are provided axis portions (not shown) for being rotated. A rotation of the actuator 25 is transmitted to the axis portions, so that the valve element 61 is rotated in the housing 60.

Figure 41:
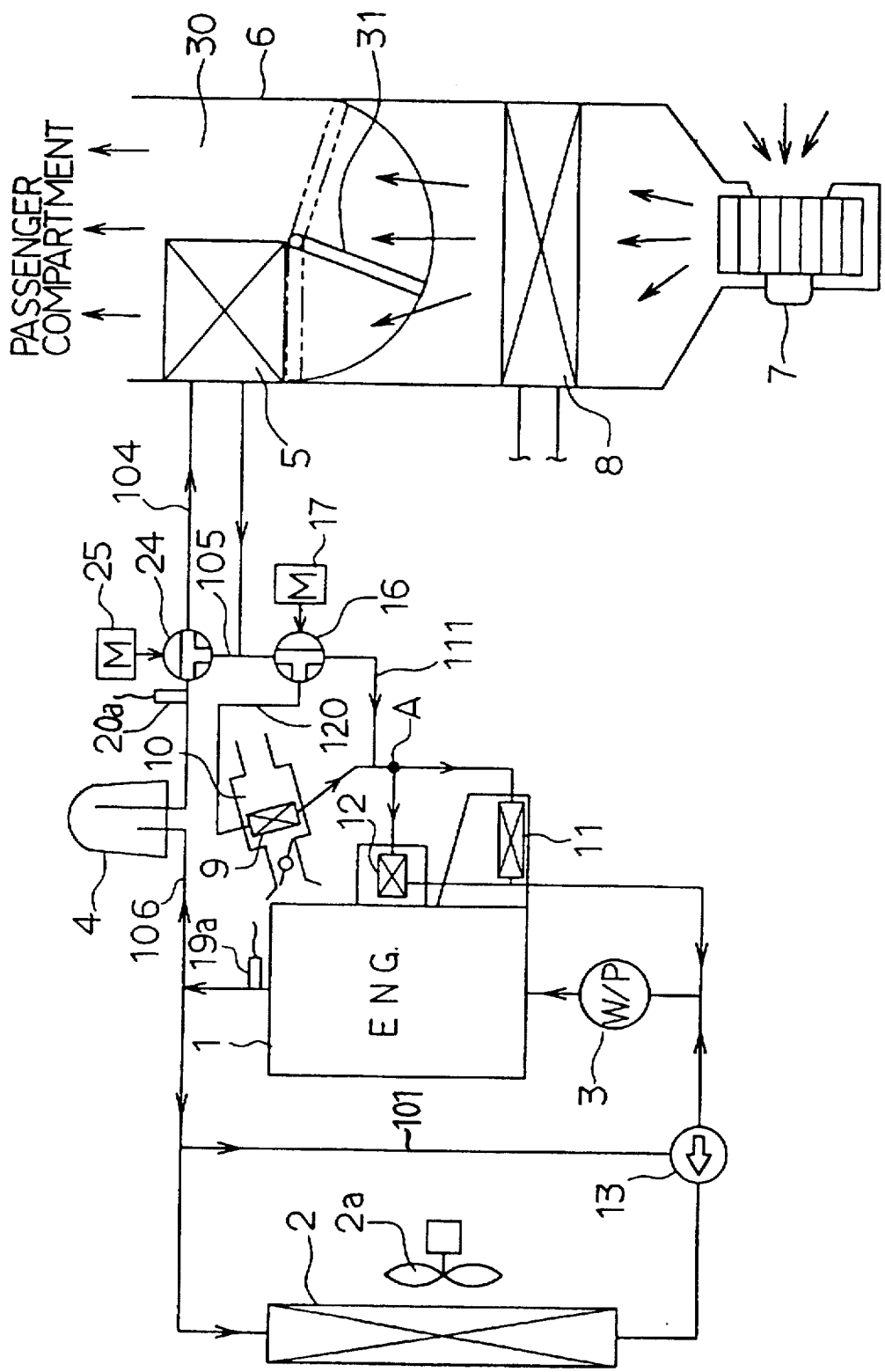
FIG. 41 shows a flow of cooling water in the cooling water circuit of a cooling apparatus according to a seventh embodiment of the present invention.

In FIG. 41, an air conditioning case 6 forms an air passage of an air conditioning apparatus for air-conditioning air in the passenger compartment. At an upstream end of the air-conditioning casing 6, there is provided the blower 7 for blowing air toward the passenger compartment. A downstream end of the air-conditioning casing 6 is communicated with an air outlet (not shown) for blowing air toward the passenger compartment.

Within the air conditioning casing 6, at a downstream side of the blower 7, there is provided the evaporator 8. Further, at a downstream side of the evaporator 8, there is provided the heater core 5 for performing heat-exchange between the cooling water and the air flowing in the air-conditioning casing 24.

In the air-conditioning casing 6, there is formed a bypass passage bypassing the heater core 5. Further, there is provided an air-mixing door 31 for adjusting a ratio of an amount of the air flowing through the bypass passage 30° C. and an amount of the air passing through the heater core 8.

An operation of the second flow control valve 16 will be described with reference to FIG. 43.

When an ignition switch (not shown) is turned on and the engine 1 starts, signals from the water temperature sensor 20a, the intake air temperature sensor 25, the pressure sensor 25a, and the cooling water temperature sensor 19a are read at step S100, and it is determined whether or not the temperature $T_E$ of the cooling water, detected by the cooling water temperature sensor 19a, is higher than 85° C. at step S110.

When the temperature $T_E$ of the cooling water is equal to or less than 85° C., it is determined whether or not the temperature Tw of the cooling water, detected by the water temperature sensor 20a, is higher than 60° C. at step S120. When the temperature Tw of the cooling water is higher than 60° C., the intake air heat exchanger water passage 130 is opened at step 130. Next, the temperature Tw of the cooling water is compared with the temperature $T_E$ of the cooling water at step S140. While the temperature Tw of the cooling water is higher than the temperature $T_E$ of the cooling water, the intake air heat exchanger water passage 130 is maintained open, whereas when the temperature Tw of the cooling water becomes lower than the temperature $T_E$ of the cooling water, the intake air heat exchanger water passage 130 is closed at step S150.

Next, it is determined whether or not the intake negative pressure $P_{IN}$ is less than –200 mmHg at step S160. When the intake negative pressure $P_{IN}$ is equal to or more than –200 mmHg, it is determined whether or not the temperature $T_{IN}$ of the intake air, detected by the intake air temperature sensor 25, is higher than 35° C. at step 170 and it is further determined whether or not the temperature Tw of the cooling water is lower than 35° C. at step S180. When both determinations at steps S170 and S180 are "YES", the intake air heat exchanger water passage 130 is opened at step S190.

When the intake negative pressure $P_{IN}$ is less than –200 mmHg, it is determined whether or not the temperature $T_{IN}$ of the intake air, detected by the intake air temperature sensor 25, is lower than 85° C. at step S200 and it is further determined whether or not the temperature Tw of the cooling water is higher than 85° C. at step S210. When both determinations at steps S200 and S210 are "YES", the intake air heat exchanger water passage 130 is opened at step S190.

When any one of the determinations at steps S170, S180, S200, and S210 is "NO", it returns to step S160, and steps S160 to S210 are performed repeatedly.

Figure 44:
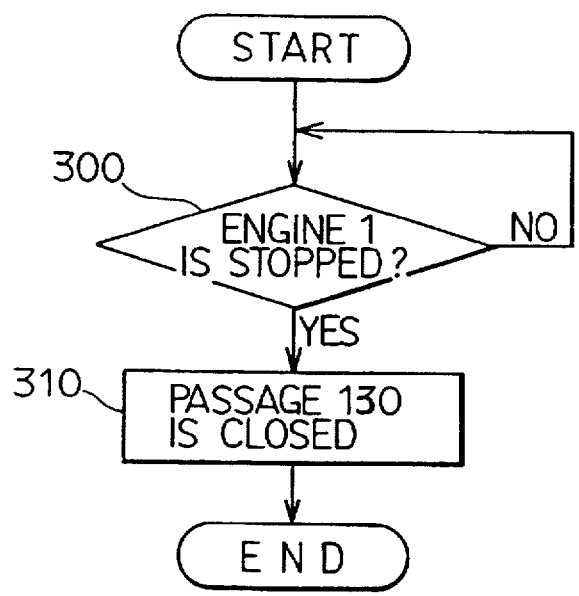
FIG. 44 is a flow chart (interruption routine) showing a control of the second flow control valve in the seventh embodiment.
Figure 43:
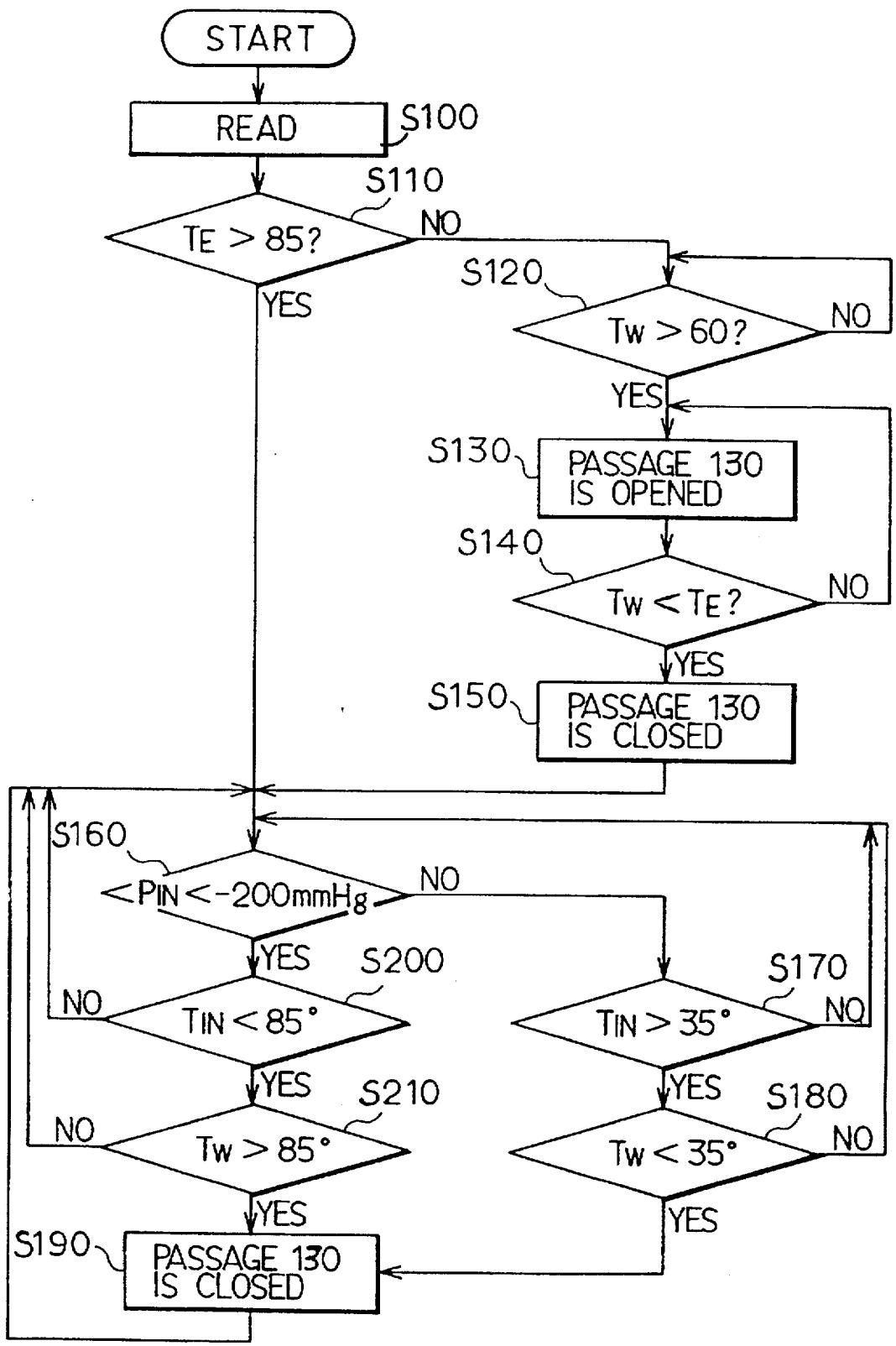
FIG. 43 is a flow chart (main routine) showing a control of a second flow control valve in the seventh embodiment.

In this embodiment, as shown in FIG. 44, when the engine 1 is stopped, an interruption control of an interruption routine for closing the intake air heat exchanger water passage 130 is performed against the main routine shown in FIG. 43 every a predetermined time (e.g., 3 seconds).

The first flow control valve 24 usually opens the heater water passage 104 and the heater bypass water passage 105 and closes the heater water passage 104 when the air-conditioning apparatus operates in the maximum cooling state (where the upstream side of the heater core 5 is closed by the air-mixing door 31).

As described above, according to this embodiment, in the warm-up operation where the temperature of the cooling water is low and the temperature of the intake air of the engine 1 is low immediately after the engine 1 starts, the intake air can be heated by using the high-temperature cooling water in the heat-accumulating tank 4. Therefore, it is possible to reduce the fuel consumption and to purify the exhaust gas in the warm-up operation.

When the temperature $T_E$ of the cooling water rises and becomes equal to the temperature Tw of the cooling water, it is regarded that the warm-up operation is finished, and the intake air heat exchanger water passage 130 is closed. Therefore, it is also possible to reduce the fuel consumption after the warm-up operation is finished.

The inventors of the present invention have experimentally obtained by a relationship between the fuel consumption and the temperature $T_{IN}$ of the intake air with the load of the engine 1 as a parameter. As a result, when the load of the engine 1 is equal to or higher than a predetermined value, the lower the temperature $T_{IN}$ is, the more the fuel consumption is improved. On the other hand, when the load of the engine 1 is lower than the predetermined value, the higher the temperature $T_{IN}$ is, the more the fuel consumption is improved.

According to this embodiment, the load of the engine 1 is detected by detecting the intake negative pressure $P_{IN}$, and the control of the temperature $T_{IN}$ of the intake air is performed; and therefore, it is possible to further improve the fuel consumption.

In this embodiment, the intake negative pressure $P_{IN}$ corresponding to the above-described value is set to –200 mmHg; however, the intake negative pressure $P_{IN}$ is not limited to this value but may be appropriately determined based on a size (the volume of the exhaust gas) of the engine 1, the characteristics of the engine 1, and the like.

Further, because the engine oil and the A/T oil can be heated by the high-temperature cooling water accumulated in the heat-accumulating tank 4 in the warm-up operation, the friction loss can be reduced, so that the fuel consumption can be further improved.

Figure 46:
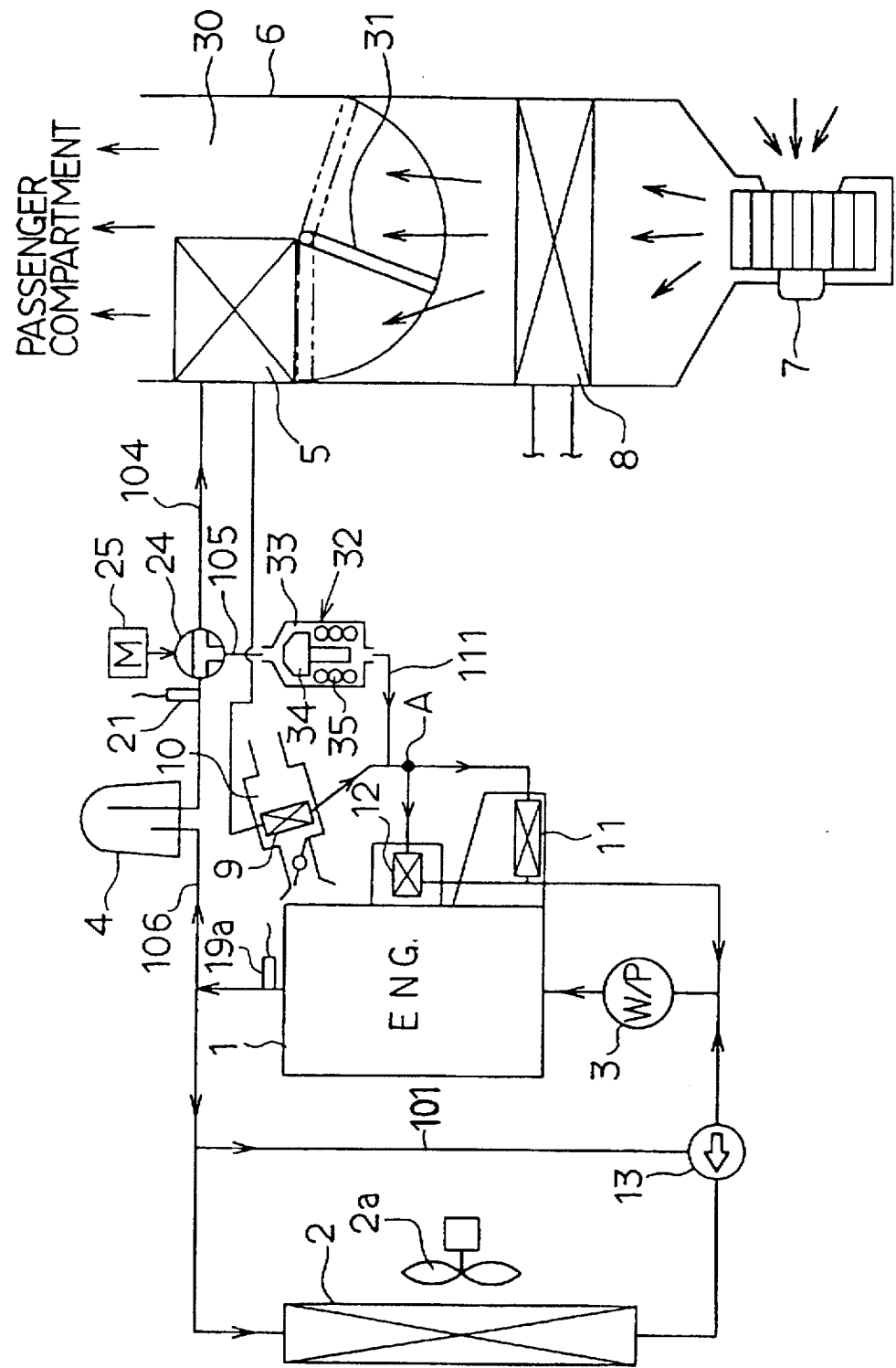
FIG. 46 shows a flow of cooling water in the cooling water circuit of a cooling apparatus according to an eighth embodiment of the present invention.

An eighth embodiment of the present invention will be described with reference to FIG. 46.

The eighth embodiment differs from the seventh embodiment in that the intake air heat exchanger 9 is disposed at a downstream side of the heater core 5, and the cooling water flowing out of the heater core 5 is introduced directly into the intake air heat exchanger 9. Further, the second flow control valve 16 in the seventh embodiment is omitted, and there is provided a flow control valve 32 for adjusting an amount of the cooling water flowing through the heater bypass water passage 105 according to an amount of the cooling water flowing into the heat-accumulating tank 4.

The flow control valve 32 is constructed by the valve element (dynamic pressure operation valve) 34 disposed in a housing 33, and an elastic member 35 such as a coil spring, for generating an elastic force resisting the dynamic pressure acting on the valve element 34.

When the load of the engine 1 is increased during the heating operation, for example, the thermostat 13 is opened. Since the amount of the cooling water flowing toward the radiator 2 is increased and the amount of the cooling water flowing through the heat-accumulating tank 4 may be decreased, the amount of the cooling water flowing through the heater core 5 may be lowered.

In contrast, according to this embodiment, when the amount of the cooling water flowing through the heat-accumulating tank 4 is decreased and the amount of the cooling water flowing into the heater bypass water passage 105 is decreased, the dynamic pressure acting on the valve element 34 is decreased and the valve element 34 is pushed toward the upstream side by elastic force of the elastic member 35 to close the heater bypass water passage 105. Therefore, since the heater bypass water passage 105 is closed when the amount of the cooling water flowing through the heat-accumulating tank 4 is decreased, the amount of the cooling water flowing through the heater core 5 can be prevented from decreasing excessively.

Figure 47:
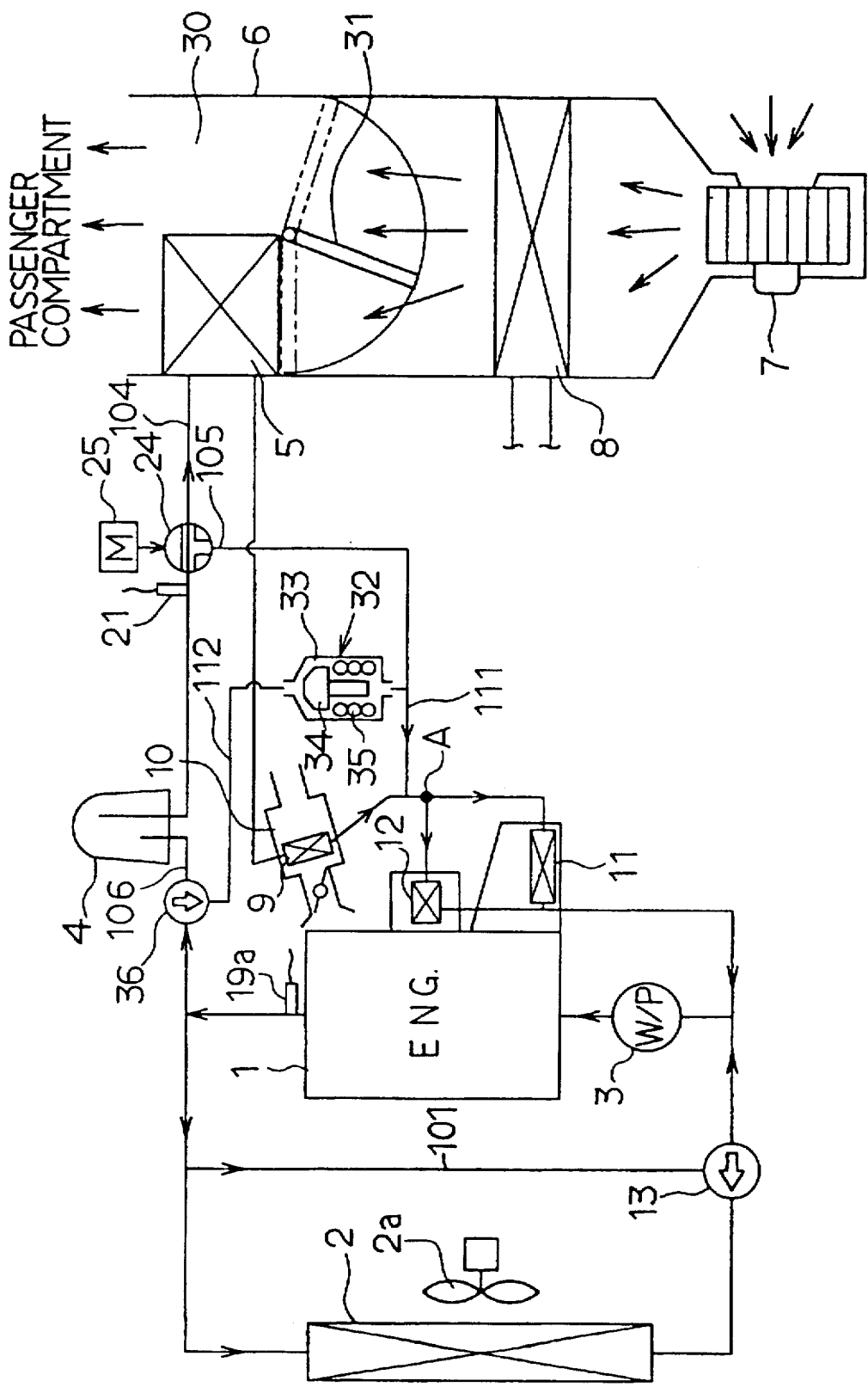
FIG. 47 shows a flow of cooling water in the cooling water circuit of a cooling apparatus according to a ninth embodiment of the present invention.

A ninth embodiment of the present invention will be described with reference to FIG. 47.

The ninth embodiment differs from the seventh embodiment in that the intake air heat exchanger 9 is disposed at a downstream side of the heater core 5 and the cooling water flowing out of the heater core 5 is introduced directly into the intake air heat exchanger 9.

Further, the second flow control valve 16 in the seventh embodiment is omitted. In FIG. 47, there is formed a tank bypass passage 112 connecting an inlet of the heat-accumulating tank 4 to the oil heat exchanger water passage 111, and a flow control valve 32 is disposed in the tank bypass water passage 112.

At a branch portion between the tank bypass water passage 112 and the cooling water passage at an inlet side of the heat-accumulating tank 4, there is provided a thermostat (temperature sensing operation valve) 36. The thermostat 36 opens the tank bypass water passage 112 when the temperature of the cooling water reaches or increases higher than a predetermined temperature (e.g., approximately 70° C.).

According to the above-described construction, when the temperature of the cooling water is low such as in the warm-up operation, the high-temperature cooling water in the heat-accumulating tank 4 flows through heater core 5, the intake air heat exchanger 9, and both oil heat exchangers 12 and 11. When the temperature of the cooling water becomes equal to or higher than the predetermined temperature and the warm-up operation is finished, the cooling water flows in the tank bypass water passage 112.

Further, since the flow control valve 32 is disposed in the tank bypass water passage 112, when the amount of the cooling water flowing through the heat-accumulating tank 4 is increased, the tank bypass water passage 112 is opened; and therefore, the amount of the cooling water flowing into the heat-accumulating tank 4 is decreased.

Accordingly, it is possible to prevent the water flow resistance from increasing excessively by the heat-accumulating tank 4 when the amount of the cooling water flowing into the heat-accumulating tank 4. As a result, it is possible to prevent the amount of the cooling water flowing through both oil heat exchangers 12 and 11 from decreasing excessively.

Figures 48, 49:
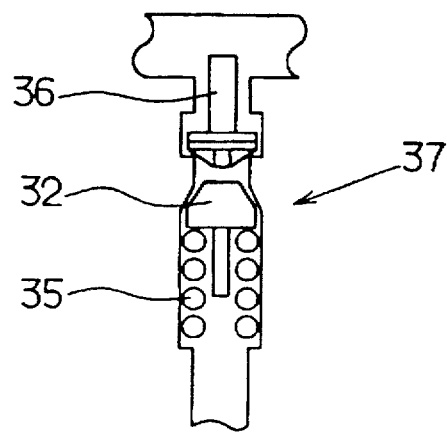
FIG. 48 schematically shows a control valve in which a thermostat and a second control valve are integrated in the ninth embodiment.
FIG. 49 schematically shows operation states of the control valve in the ninth embodiment.

FIG. 48 shows a control valve 37 in which the thermostat 36 and the flow control valve 32 are integrated, and FIG. 49 schematically shows operation states of the control valve 37.

A tenth embodiment of the present invention will be described. The tenth embodiment differs from the seventh embodiment only in the control process performed by the control unit 18; and therefore, only the control process will be described, and the other construction and operation similar to those in the seventh embodiment are omitted for description thereof.

Figure 50:
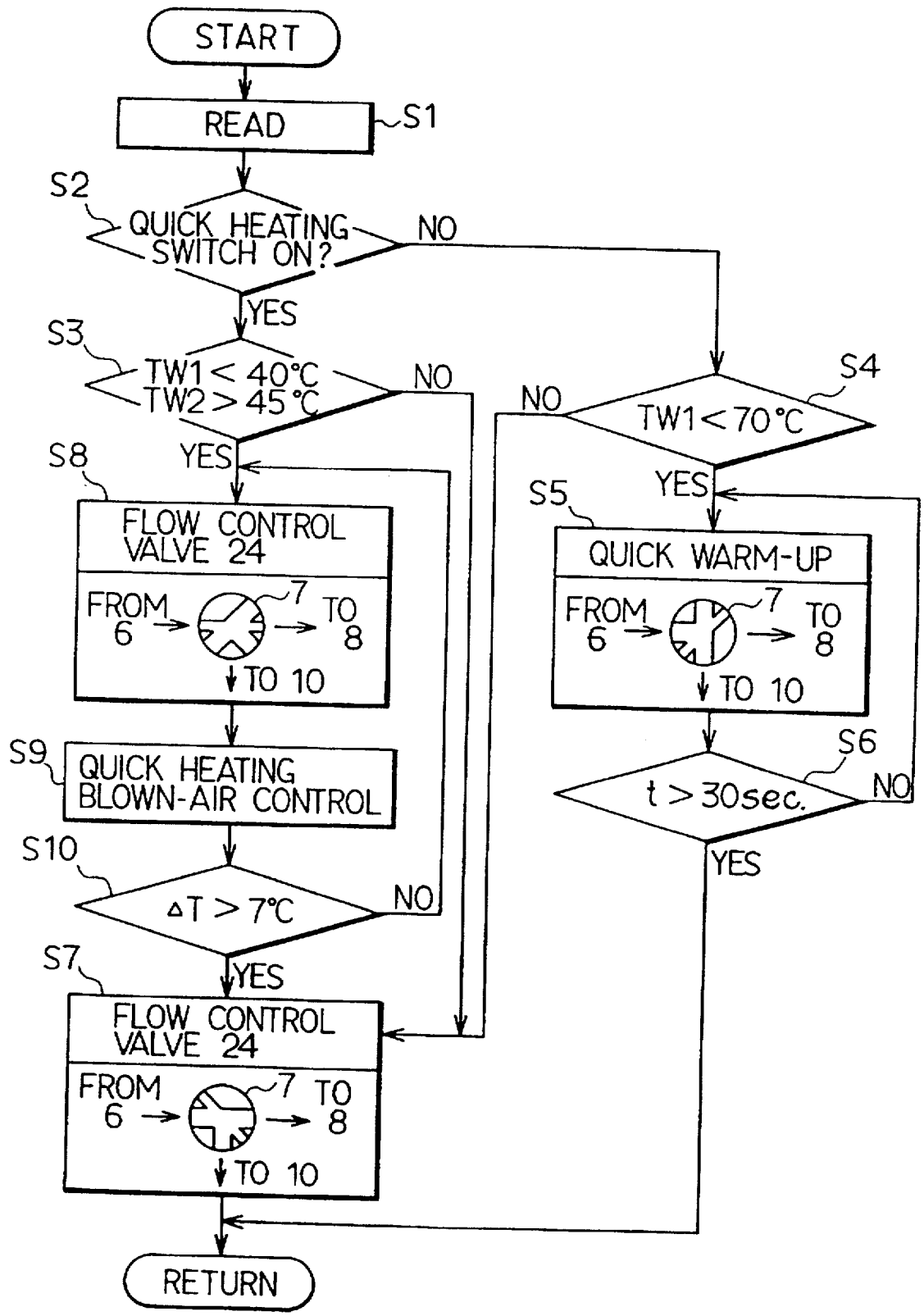
FIG. 50 is a flow chart showing a control of a flow control valve according to a tenth embodiment of the present invention.

FIG. 50 is a flow chart showing control process performed by the control unit 18.

When an ignition switch (not shown) of the vehicle is turned on and the engine 1 starts, electric current is supplied to the control unit 18, and the control routine shown in FIG. 50 is started. In this embodiment, when the ignition switch is set off, the flow control valve 24 is set such that the outlet pipe 107 of the heat-accumulating tank 6 communicates with both of the heater core 5 and the bypass circuit 105 by the T-shaped passage 62a.

Accordingly, when the engine 1 starts, the water pump 3 is actuated, so that the cooling water flowing out of the engine 1 flows into the heat-accumulating tank 6 and the cooling water in the heat-accumulating tank 4 is pushed out.

At step S1, signals from sensors 20a, 19a, 21, the quick heating switch 23, and air-conditioning switches (not shown) provided on a control panel (not shown) of the air-conditioning apparatus are read. At this time, the water temperature sensor 19a detects the temperature $Tw_1$ of the cooling water in the engine 1 before the engine 1 starts, and the water temperature sensor 20a detects the temperature $Tw_2$ of the cooling water pushed out of the heat-accumulating tank 4.

At next step S2, it is determined whether or not the quick heating switch 23 is set on. When the quick heating switch 23 is set on, it proceeds to step S3, and the quick heating operation for heating the passenger compartment quickly is performed. When the quick heating switch 23 is set off, it proceeds to step S4, and the warm-up operation of the engine 1 is performed.

At step S4, it is determined whether or not the temperature $Tw_1$ of the cooling water at the outlet side of the engine 1, detected by the water temperature sensor 19a, is equal to or less than a predetermined temperature (70° C. in this embodiment) in order to determine whether the engine 1 needs to be warmed up quickly.

Figure 51:
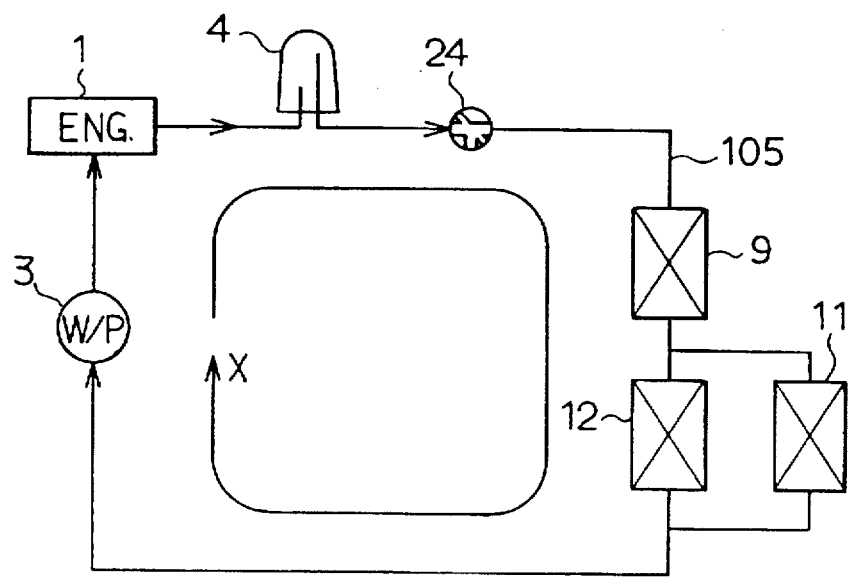
FIG. 51 schematically shows a flow of the cooling water in a quick warm-up operation mode in the tenth embodiment.

When the engine 1 is re-started after quite a long time has elapsed since the engine 1 was stopped last time, the temperature of the cooling water is lower than 70° C.; and therefore, the determination at step S4 is "YES", and it proceeds to step S5. At step S5, the valve opening degree of the flow control valve 24 is switched such that the cooling water pushed out of the heat-accumulating tank 4 is not introduced into the heater core 5 but only to the bypass circuit 105. FIG. 51 shows a flow of the cooling water schematically.

In this way, as shown by "X" in FIG. 51, the high-temperature cooling water in the heat-accumulating tank 4 flows in the bypass circuit 105 while passing through the intake air heat exchanger 9, the first oil heat exchanger 12, and the second heat exchanger 11. At this time, in this embodiment, the cooling water of approximately 6 liter/min. flows in the bypass circuit 105. Because the volume of the heat-accumulating tank 4 is approximately 3 liter, all of the high-temperature cooling water in the heat-accumulating tank 4 is completely pushed out into the bypass circuit 105 within approximately 30° C. seconds.

Next, it proceeds to step S6, and it is determined whether or not the elapsed time t after the engine 1 starts reaches a predetermined time (30° C. seconds in this embodiment). The determination is "NO", that is, within 30° C. seconds, the high-temperature cooling water in the heat-accumulating tank 4 is still being pushed out into the bypass circuit 105; and therefore, the valve opening degree of the flow control valve 24 is set to the one at step S5. Warm-up effects by the cooling water at this time will be described below.

The high-temperature cooling water heats the intake air of the engine 1 in the intake air heat exchanger 9. Therefore, the temperature of the intake air is increased, the necessary fuel amount in the warm-up operation can be reduced; and therefore, the fuel consumption can be reduced.

According to examinations by the inventors, when the temperature of the cooling water in the heat-accumulating tank 4 is 80° C. and the temperature of the intake air is 0° C., because the intake air has small thermal capacity, the temperature of the cooling water lowers in the intake air heat exchanger 9 by only approximately 2° C. Therefore, at the outlet of the intake air heat exchanger 9, the temperature of the cooling water is maintained high at approximately 78° C.

Next, the cooling water having passed through the intake air heat exchanger 9 flows into the first and second oil heat exchangers 12 and 11 to heat lubricating oil of the engine 1 and hydraulic oil of the transmission therein. In this way, the friction loss of the engine 1 and the transmission is reduced, and the fuel consumption can be reduced. Further, the temperature of the oil is increased so that the warm-up operation of the engine 1 is accelerated.

The temperature of the cooling water lowers to approximately 50° C. after passing through both oil heat exchangers 12 and 11. However, because this temperature of the cooling water is higher than the temperature of the cooling water in the engine 1, which lowers approximately to the outside air temperature, the cooling water of approximately 50° C. after passing through both oil heat exchangers 12 and 11 circulates in the engine 1, so that the warm-up operation of the engine 1 can be accelerated.

Accordingly, the temperature of the cooling water in the engine 1 increases up to approximately 35° C. within the above-described short time period of approximately 30 seconds, and the warm-up operation of the engine 1 can be finished quickly.

Therefore, the reduction of the fuel consumption and the purification of the exhaust gas in the warm-up operation can be obtained effectively. Simultaneously, since the temperature of the cooling water in the engine 1 increases quickly, the heating operation using hot water in the heater core 5 by radiated heat of the cooling water can be started within short time period after the engine starts. In this embodiment, the predetermined time at step S3 is set to 30 seconds; however, this time period may be appropriately increased or decreased according to the volume of the heat-accumulating tank 4, the exhaust gas volume of the engine 1, the cooling water volume of the engine 1, and the like. When it is determined that 30 seconds has elapsed at step S6, it goes out of the flow chart and returns.

On the other hand, when the determination at step S2 is "YES", the quick heating operation is performed. However, before the quick heating operation is performed, it is determined whether or not the temperature $Tw_1$ of the cooling water in the engine 1 before the ignition switch is turned on, detected by the water temperature sensor 19a, is lower than 40° C., for example, and the temperature $Tw_2$ of the cooling water in the heat-accumulating tank 4 is higher than 45° C. at step S3. When the determination is "YES", it proceeds to step S8, whereas when the determination is "NO", it proceeds to step S7.

That is, at step S8, when the temperature $Tw_2$ of the cooling water in the heat-accumulating tank 4 is higher than the temperature $Tw_1$ of the cooling water in the engine 1 and heating feeling can be supplied by using the cooling water in the heat-accumulating tank 4, the valve opening degree of the flow control valve 24 is set as shown in FIG. 50.

Figure 52:
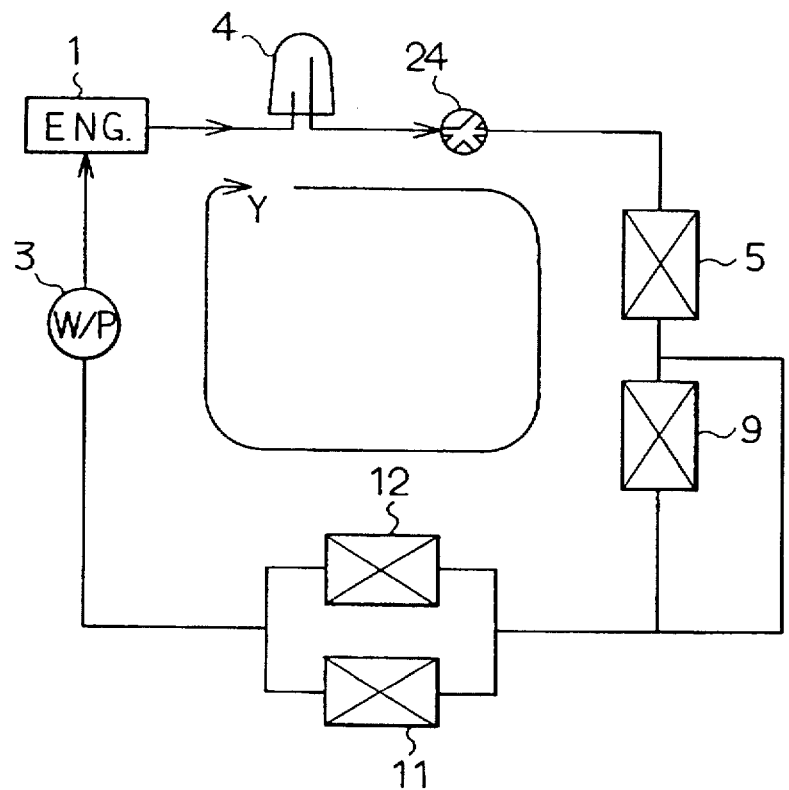
FIG. 52 schematically shows a flow of the cooling water in a quick heating mode in the tenth embodiment.

The valve opening degree of the flow control valve 24 is set such that the heat-accumulating tank 4 communicates with the heater core 5 through the orifice passage 62c and the bypass circuit 105 is closed by the valve element 61. As a result, the cooling water flows as shown by "Y" in FIG. 52. The high-temperature cooling water in the heat-accumulating tank 4 flows through the orifice passage 62c, flows into the heater core 5, and flows through the intake air heat exchanger 9, the first and second oil heat exchangers 12 and 11. In this embodiment, the amount of the cooling water flowing from the heat-accumulating tank 4 to the heater core 5 is restricted by the orifice passage 62c to 1 liter/min.

When the cooling water in the heat-accumulating tank 4 flows into the heater core 5 by 3 liter/min. for example, the heating operation for the passenger compartment can be performed only for approximately one minute, because the volume of the heat-accumulating tank 4 is 3 liter. Therefore, in this embodiment, to prolong the quick heating operation, the amount of the cooling water flowing from the heat-accumulating tank 4 into the heater core 5 is restricted by the orifice passage 62c to 1 liter/min., so that the quick heating operation can be performed for approximately three minutes.

Further, it proceeds to step S9. At step S9, as a control for blowing air in the quick heating operation, the blower 7 is started, and an amount of air blown by the blower 7 (a voltage applied to an electric motor 7a) is set according to the temperature $Tw_2$ of the cooling water, detected by the water temperature sensor 20a. For example, the amount of the air blown by the blower 7 is increased according to an increase of the temperature $Tw_2$ becomes. In this way, it is possible to heat the passenger compartment quickly according to the warmth feeling of the passenger.

Next, at step S10, as a determination for finishing the quick heating, it is determined whether or not the temperature $Tw_2$ of the cooling water, detected by the water temperature sensor 20a, is equal to or lower than the previous temperature detected last time by a predetermined value T (7 in this embodiment). That is, when the quick heating operation is performed, the high-temperature cooling water in the heat-accumulating tank 4 flows into the heater core 5; however, if all of the cooling water in the heat-accumulating tank 4 has flowed out, the low-temperature cooling water flowing from the engine 1 may be reserved in the heat-accumulating tank 4. Accordingly, after all of the high-temperature cooling water in the heat-accumulating tank 4 has flowed out, the temperature $Tw_2$ of the cooling water, detected by the water temperature sensor 20a, lowers. Therefore, it is determined whether the quick heating operation should be finished while monitoring the decreased temperature T.

When the quick heating operation is finished, it proceeds to step S7. As shown in FIG. 50, the valve opening degree of the flow control valve 24 is returned such that the outlet pipe 107 of the heat-accumulating tank 4 communicates with both of the heater core 5 and the bypass circuit 105 through the T-shaped passage 62a.

In the above-described air-conditioning apparatus for a vehicle, an opening degree of the air-mixing door 31 is automatically controlled based on detection values of the sensors 19a and 21 and set values of air-conditioning switches.

Contents of the control will be described below under the condition that the warm-up operation has been completed and the temperature of the cooling water in the cooling water circuit has increased sufficiently.

In winter season, the necessary heating capacity becomes large, and therefore, the air-mixing door 31 is generally operated in a region where the bypass passage 30 is fully closed. In this case, a large amount of the blown-air is heat-exchanged in the heater core 5, and the temperature of the cooling water at the outlet of the heater core 5 lowers to approximately 50–65° C. Therefore, by using the comparatively high-temperature cooling water, it is possible to heat the intake air of the engine 1 in the intake air heat exchanger 9 effectively and to improve the fuel consumption. Further, by using the cooling water having passed through the intake air heat exchanger 9, it is possible to cool the oil in the first and second oil heat exchangers 12 and 11.

Therefore, while the vehicle is running normally after the warm-up operation of the engine 1 has been finished, it is possible to control each temperature of the intake air and the oil. Accordingly, the reduction of the fuel consumption and the purification of the exhaust gas can be attained. As being known well, the cooling water is cooled in the radiator 2.

In the above-described embodiment, because the quick heating operation and the quick warm-up operation are switched by the valve (flow control valve 24) for intermitting the supply of the cooling water to the heater core 5 in the air-mixing type air-conditioning apparatus for a vehicle, the quick heating operation and the quick warm-up operation can be switched with less expense. Further, because the flow control valve 24 is formed with the orifice passage 62a, it is possible to perform the quick heating operation for a long time.

In the above-described embodiment, the present invention is employed in an air-mixing type air-conditioning apparatus; however, the present invention may be employed in a re-heat type air-conditioning apparatus for a vehicle. In this case, effects in the normal operation are different from those in the air-mixing type and will be described as below. The parts and components having functions similar to those in the air-mixing type are described with the same reference numerals.

In the re-heat type air-conditioning apparatus, there is no provided the air-mixing door 31, and almost all the blown-air having passed through the cooling evaporator 8 flows through the heater core 5. The temperature of the conditioned air is adjusted by adjusting an amount of the cooling water flowing through the heater core 5 with an adjusting valve. For example, the adjusting valve may be disposed between the flow control valve 24 and the heater core 5.

Between the intermediate seasons of spring and fall and summer, the adjusting valve is controlled to restrict the amount of the cooling water flowing into the heater core 5. Therefore, the small amount of the cooling water is heat-exchanged with the air blown by the blower 7 so that the temperature of the cooling water lowers to approximately 15–20° C. Accordingly, by using the low-temperature, it is possible to cool the intake air of the engine 1 in the intake air heat exchanger 9 effectively, with the result that the fuel consumption can be reduced.

In winter season, the necessary heating capacity becomes large, and therefore, the large amount of the cooling water flows into the heater core 5 by the adjusting valve.

Thus, since the amount of the cooling water is increased, even when the cooling water is heat-exchanged with the air blown by the blower 25 in the heater core 5, the temperature of the cooling water at the outlet of the heater core 5 lowers to approximately 50–65° C. at least. Therefore, by using the comparatively high-temperature cooling water it is possible to heat the intake air of the engine 1 in the intake air heat exchanger 9 effectively, with the result that the fuel consumption can be improved.

Further, since the intake air has small thermal capacity, by using the cooling water having passed through the intake air heat exchanger 9, it is possible to heat the oil in the first and second oil heat exchanger 12 and 11. Therefore, while the vehicle is running normally after the warm-up operation of the engine 1 has been finished, it is possible to control each temperature of the intake air and the oil satisfactorily through all seasons of the year. Accordingly, the reduction of the fuel consumption and the purification of the exhaust gas can be attained.

In the above-described embodiment, the first and second oil heat exchangers 12 and 11 are disposed in parallel between the joining portion A and the inlet-side cooling water circuit of the water pump 3; however, these oil heat exchangers 12 and 11 may be disposed in series. In this case, it is more advantageous to dispose the second oil heat exchanger 11 through which the hydraulic oil having a preferable operation temperature of approximately 80° C. on an upstream side with reference to a flow of the cooling water than the first oil heat exchanger 12 through which the lubricating oil of the engine 1 having a preferable operation temperature of approximately 110, so that the reduction of the fuel consumption by the reduction of the friction loss can be improved.

In the above-described embodiment, at step S6 of FIG. 50, it is determined whether or not the warm-up operation is fined by determining whether or not the elapsed time t after the engine 1 starts has reached the predetermined time; however, whether or not the warm-up operation of the engine 1 is finished may be determined by the other determination methods such as a method for determining whether or not the temperature of the cooling water at the outlet portion of the engine 1, detected by the water temperature sensor 19a, increases and reaches to the predetermined temperature.

In the above-described embodiment, the orifice passage 62a is formed with the flow control valve 24 to restrict the amount of the cooling water flowing into the heater core 5 in the quick heating operation; however, the function of the orifice passage 62c may be provided with a separate flow adjusting valve.

In the above-described embodiment, the engine 1 is warmed up in the quick heating operation by using the cooling water after passing through the intake air heat exchanger 9, and the first and second oil heat exchangers 12 and 11; however, the cooling water in the accumulating tank 4 may circulate between the heat-accumulating tank 4 and the engine 1 in the quick heating operation.

In each of the above-described embodiments, the heat of the cooling water is accumulated by reserving the high-temperature cooling water in the heat-accumulating tank 4; however, there may be employed a heat-accumulating tank made of latent-heat heat-accumulating material such as $CH_3COONa$, $Ba(OH)_2-8H_2O$.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A cooling water circuit system for a water-cooled internal combustion engine for a vehicle, comprising:

a pump for pumping cooling water circulating through said engine;

a heat-accumulating tank for thermally insulating and storing the cooling water having flowed out of said engine therein;

a heater core disposed at a downstream side of said heat-accumulating tank, for performing heat-exchange between the cooling water having flowed out of said heat-accumulating tank and air to be blown into a passenger compartment;

an oil heat exchanger disposed at a downstream side of said heater core, for performing heat-exchange between the cooling water having flowed out of said heat-accumulating tank and at least one of lubricating oil of said engine and hydraulic oil of a transmission of said engine;

means for forming a bypass water passage for introducing the cooling water at an upstream side of said heat-accumulating tank into an inflow side of said oil heat exchanger while bypassing said heater core;

a flow control valve for controlling an amount of the cooling water flowing in said bypass water passage; wherein, said flow control valve closes said bypass water passage during a warm-up operation of said engine and opens said bypass water passage after the warm-up operation of said engine is finished, and said flow control valve increases the amount of the cooling water flowing into said bypass water passage according to an increase of the amount of the cooling water flowing from said engine toward said heat-accumulating tank.

2. An air-conditioning apparatus for a vehicle having a cooling water circuit system for a water-cooled internal combustion engine, said cooling water circuit system including:

a pump for pumping cooling water circulating through said engine;

a heat-accumulating tank for thermally insulating and storing the cooling water having flowed out of said engine therein;

an intake air heat exchanger for performing heat-exchange between the cooling water having flowed out of said heat-accumulating tank and intake air to be sucked into said engine;

means for forming a bypass water passage in which the cooling water having flowed out of said heat-accumulating tank into said engine while by passing said intake air heat exchanger;

switching means for switching a flow of the cooling water having flowed out of said heat-accumulating tank, said switching means being controlled such that:

the cooling water having flowed out of said heat-accumulating tank flows into said intake air heat exchanger during a warm-up operation of said engine, and the cooling water having flowed out of said heat-accumulating tank flows into said bypass circuit after the warm-up operation of said engine is finished, said air-conditioning apparatus comprising:

an air-conditioning casing forming therein an air passage for blowing air into a passenger compartment, in which said heater core is disposed, and a bypass air passage bypassing said heater core; and an air-mixing door disposed in said air-conditioning casing, for adjusting a ratio between air passing through said bypass air passage and air passing through said heater core.

* * * * *